US012802537B2

(12) United States Patent
Carlin

(10) Patent No.: US 12,802,537 B2
(45) Date of Patent: Nov. 17, 2026

(54) COMBINATION LED LIGHTING AND DANGER DETECTION LAMP/FIXTURE APPARATUS HOST, WITH A PAIRED SUPPORTING SATELLITE, INCLUDING UTILITY ELEMENTS, AND METHOD THEREFORE

(71) Applicant: John A. Carlin, Amherst, NY (US)

(72) Inventor: John A. Carlin, Amherst, NY (US)

( * ) Notice: Subject to any disclaimer, the term of this patent is extended or adjusted under 35 U.S.C. 154(b) by 7 days.

(21) Appl. No.: 19/098,978

(22) Filed: Apr. 2, 2025

(65) Prior Publication Data

US 2025/0316151 A1 Oct. 9, 2025

Related U.S. Application Data

(60) Provisional application No. 63/574,416, filed on Apr. 4, 2024.

(51) Int. Cl.

| | |
|---|---|
| ***G08B 7/06*** | (2006.01) |
| ***G08B 17/10*** | (2006.01) |
| ***G08B 25/10*** | (2006.01) |
| ***H04W 4/90*** | (2018.01) |

(52) U.S. Cl.
CPC ............ *G08B 7/066* (2013.01); *G08B 17/10* (2013.01); *G08B 25/10* (2013.01); *H04W 4/90* (2018.02)

(58) Field of Classification Search
CPC ........ G08B 7/066; G08B 17/10; G08B 25/10; H04W 4/90
See application file for complete search history.

(56) References Cited

U.S. PATENT DOCUMENTS

| | | | |
|---|---|---|---|
| 4,649,376 A | 3/1987 | Frank | |
| 4,694,285 A | 9/1987 | Scripps | |
| 5,587,704 A | 12/1996 | Foster | |
| 6,194,994 B1 | 2/2001 | Curran et al. | |
| 6,369,696 B2 | 4/2002 | Curran et al. | |
| 6,545,608 B1 | 4/2003 | Kaufman | |
| 6,548,967 B1 | 4/2003 | Dowling et al. | |
| 6,756,998 B1 * | 6/2004 | Bilger | H04L 12/2803 715/767 |
| 6,906,616 B1 | 6/2005 | Curran et al. | |
| 7,309,965 B2 | 12/2007 | Dowling et al. | |
| 7,476,002 B2 | 1/2009 | Wolf et al. | |
| 7,786,879 B2 | 8/2010 | Lax | |
| 9,070,268 B2 * | 6/2015 | Monacos | G08B 25/009 |
| 9,325,827 B2 | 4/2016 | Mirza et al. | |

(Continued)

*Primary Examiner* — John A Tweel, Jr.
(74) *Attorney, Agent, or Firm* — Law Office of Vincent LoTempio PLLC; Vincent G. LoTempio; Robert L. Cerasa

(57) ABSTRACT

An improved combination lighting-danger detection apparatus and system comprises a host wirelessly paired to a series of remote sensing satellites and a series of remote utility/purpose satellites. The host receives signals from the remote sensing satellites and issues commands to the utility/purpose satellites, thereby extending monitoring range and creating a distributed network. The host includes audible and visual alarms and transmits alerts throughout the distributed network. A base-station manages settings and controls operations via an application. Networked throughout a building, the system provides a whole-house complement to security, accessibility, and efficiency, providing greater danger protection, hazard warning, utility operations, and convenience functionality.

20 Claims, 17 Drawing Sheets

(56) References Cited

U.S. PATENT DOCUMENTS

| | | | |
|---|---|---|---|
| 9,654,678 | B1 | 5/2017 | Fu et al. |
| 9,666,049 | B2 | 5/2017 | Aebersold |
| 9,747,763 | B1 | 8/2017 | Scordato et al. |
| 10,028,357 | B2 | 7/2018 | Scordato et al. |
| 10,176,805 | B2 | 1/2019 | Carlin et al. |
| 10,262,525 | B2 | 4/2019 | Carlin et al. |
| 2002/0101345 | A1 | 8/2002 | Pattok et al. |
| 2009/0237260 | A1 | 9/2009 | Bradley et al. |
| 2010/0103664 | A1 | 4/2010 | Simon et al. |
| 2010/0271802 | A1 | 10/2010 | Recker et al. |
| 2010/0327766 | A1 | 12/2010 | Recker et al. |
| 2011/0145746 | A1 | 6/2011 | Malnati et al. |
| 2014/0042909 | A1 | 2/2014 | Chan |
| 2014/0266747 | A1 | 9/2014 | Prendergast |
| 2015/0187194 | A1 | 7/2015 | Keanu et al. |
| 2015/0259078 | A1 | 9/2015 | Filipovic et al. |
| 2015/0312394 | A1 | 10/2015 | Dowling et al. |
| 2016/0284176 | A1 | 9/2016 | Harrington et al. |
| 2017/0177815 | A1 | 6/2017 | Sundararajan et al. |
| 2018/0160510 | A1 | 6/2018 | Ramer et al. |

* cited by examiner

COMBINATION LED LIGHTING AND DANGER DETECTION LAMP/FIXTURE APPARATUS HOST, WITH A PAIRED SUPPORTING SATELLITE, INCLUDING UTILITY ELEMENTS, AND METHOD THEREFORE

CROSS REFERENCE TO RELATED APPLICATION

This application claims the benefit of U.S. Provisional Application of John A. Carlin, application No. 63/574,416, filed 4 Apr. 2024, having the title for AN IMPROVED COMBINATION DANGER DETECTION, LED LIGHTING LAMP, AND OTHER GENERAL UTILITY HOST APPARATUS, WITH SATELLITE SUPPORTING ELEMENT, AND METHOD THEREFORE, which is incorporated herein by reference in its entirety.

FIELD OF INVENTION

The present invention relates to the field of illuminating light bulbs that further function as a danger detection and general utility apparatus device, in combination with an augmenting satellite device that when combined, provides a whole-house blank of coverage, and more particularly to providing a service of usefulness or efficacy functions.

BACKGROUND

In the field of typical utility functions in a household, such as monitoring cameras, doorbells, or general ON/OFF controls, etc., there are many devices available to give a service or helpfulness. These devices are either battery-operated or hard-wired and may be found in many areas of a home. It is without question that all such utility devices can and do offer great convenience and functionality to a homeowner; for example, capturing video from a burglar at the front door stealing a delivered package.

As more individuals become aware of the benefits of utility convenience devices, many are opting to install items like doorbells, video cameras, motion-detect lighting, and similar gadgets in and around their homes. The market offers a wide array of these devices, which mostly require installation. They are either battery-operated, necessitating periodic replacement or recharging, or they are hard-wired with battery backup. Many of these devices are also connected to cellphones via a Wi-Fi network.

Even with advanced technology for utility convenience devices, there is still a need for greater functionality, communication, and purpose. Enhanced utility can increase the efficiency of these devices. In numerous applications, there is no crossover of functionality. For example, an illuminating light bulb could also serve as a signal for a deadly element present in the immediate environment, producing both audible and visual alarms. This could be monitored at a base station that provides a whole-house overview of any situation. The need to expand their utility exists.

It is clear that the improved present invention of an intelligent lighting lamp/fixture paired with sensing satellite devices and a utility satellite device can autonomously add greater convenience and functionality to utility apparatuses; while identifying, notifying, and showing the way out from a danger or hazard.

SUMMARY OF THE INVENTION

The present invention generally comprises an improved combination of danger detection and LED lighting lamp/fixture apparatus. This apparatus serves as a host when paired with satellite unit(s) devices, forming a comprehensive system and process. The host, being a lighting-danger detection lamp/fixture, works in tandem with remote sensing satellite units or remote utility/purpose satellite units.

A general objective is to provide an RF communication mechanism that enables the satellite unit(s) to communicate with the host lighting-danger detection lamp/fixture.

Another objective is to provide the communication with the host for receiving signals from a remote sensing satellite type, and may also, command (issue) signals to a remote utility/purpose satellite type.

Another objective is to provide a lighting-danger detection lamp/fixture, combined with a means for sensing danger or hazards to give alarms and alerting, the receiving signals from a remote sensing satellite type, thus adding monitoring range to the host apparatus, gives greater coverage of a danger or hazard; effectively creating a distributed network of danger detection sensing, of control, and of convenience, depending on the type of satellite used.

Another objective is to provide an improved lighting-danger detection lamp/fixture apparatus acting as a host, having danger and hazard sensing incorporated and will support the pairing with at least one or more remote 'satellite' sensor units, for detecting, alerting, and networking.

Another objective is to provide a lighting-danger detection lamp/fixture host as a 'general utility' apparatus, paired with a remote satellite. This pairing allows for activation, control, or information relayed within the network parameters. Communications could be directed to a doorbell, sound system, camera, or a mechanical service such as operating a valve, selecting a feature, or signaling an event, to name a few.

An object of the present invention is to provide an improved lighting-danger detection lamp/fixture apparatus host paired with a remote satellite sensor for smoke and/or fire (heat) detection.

Another object of the present invention is to provide an improved lighting-danger detection lamp/fixture apparatus host paired with a remote satellite sensor for carbon monoxide (CO) detection.

A further objective of the present invention is to provide an improved lighting-danger detection lamp/fixture apparatus host paired with a remote satellite sensor for gas detection. The gas sensor could be for natural gas, propane, radon, refrigerant gases, or similar substances.

Another objective of the present invention is to provide an improved lighting-danger detection lamp/fixture apparatus host paired with a remote satellite sensor for testing the device's fitness, battery life, and status. This remote method eliminates the need for physically handling the apparatus, thus avoiding the necessity of climbing ladders.

A further objective of the present invention is to provide an improved lighting-danger detection lamp/fixture apparatus host paired with a remote satellite sensor. The 10-year-life battery-powered satellite unit can be mounted virtually anywhere and typically does not require commercial 120/230 VAC power. The remote satellite unit can be mounted on a wall, ceiling, or object using screw mounts, double-sided sticky tape, or simply sitting on a shelf, object, or floor as needed. In some applications, a commercial 120 VAC wall plug-in power transformer with a low-voltage six-foot cord would power the satellite unit or recharge the battery as necessary.

Another objective of the present invention is to provide an improved lighting-danger detection lamp/fixture host apparatus paired with remote satellite sensors. These satellite units are small and unobtrusive, seamlessly blending into their surroundings.

Yet another objective of the present invention is to provide an improved lighting-danger detection lamp/fixture host apparatus paired with a distributed network of remote satellite sensors. This setup aims to achieve 'whole-house' security, covering every corner of every room as desired.

Another objective of the present invention is to provide an improved lighting-danger detection lamp/fixture host apparatus with a paired remote satellite sensor is to communicate via radio frequency (RF) communication techniques affording a separate channel between the lighting-danger detection lamp/fixture host and the remote satellite sensor unit, and, the lighting-danger detection lamp/fixture host and the remaining network system of lighting-danger detection apparatuses, and/or a base-station for monitoring and system testing (which can be any computing device with a display, such as a compatible 'mobile device' cellphone, and/or computer, and/or tablet therein for visual display of information, control, and status, and/or other 'base-stations' (including the Amazon ALEXA, Apple HomePOD (Siri), Google-HOME, or the alike) for non-visual information, control, and status.

Another objective of the present invention is to provide an improved lighting-danger detection lamp/fixture host apparatus with a paired remote satellite sensor. All pairing interfaces, preset and night light level intensities, light color temperature, category, zone, and other settings, monitoring and system testing, are accomplished via an application (APP) on a cellphone and/or a base-station.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims.

DETAIL DESCRIPTION OF THE INVENTION

Figure 1A:
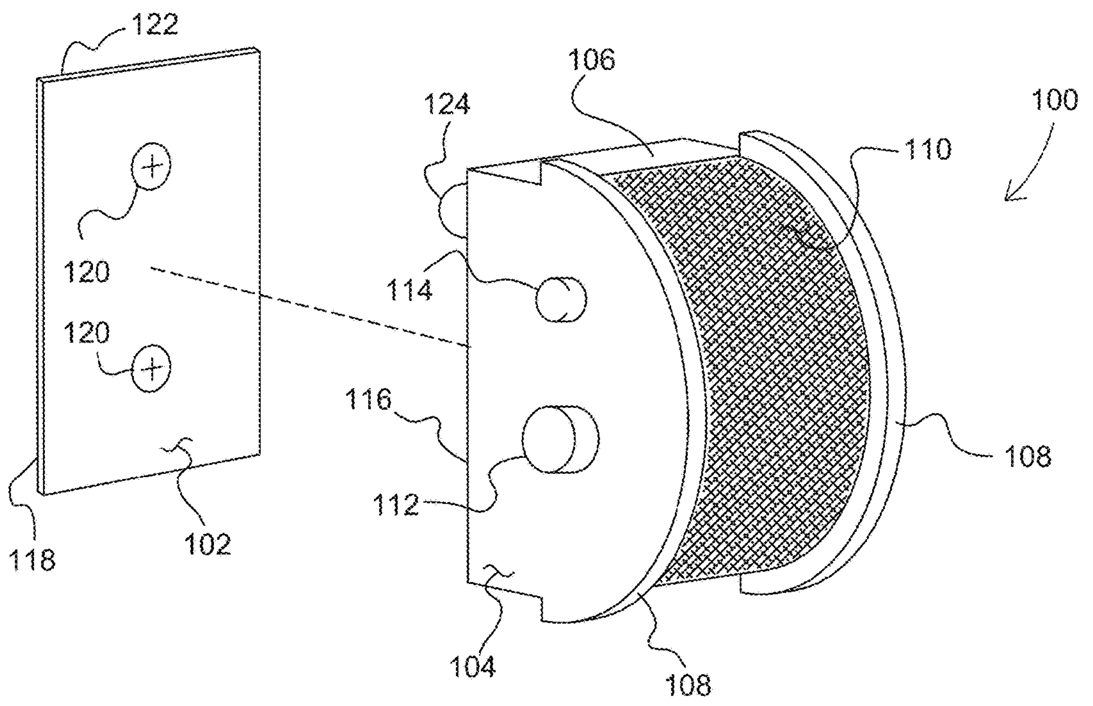
FIG. 1*a* is an isometric illustration of a satellite unit(s) 700 of the present invention configured as a remote satellite sensor 100 unit component, and depicts a mounting method, in accordance with an embodiment of the present disclosure.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary, or the following detailed description. It is also to be understood that the specific devices and processes illustrated in the attached drawings, and described in the following specification, are simply exemplary embodiments of the inventive concepts defined in the appended claims. Specific housing designs, menu layouts, or placements of detection devices used to illustrate the implementation for disclosure purposes, etc., relating to the embodiments disclosed herein are therefore not to be considered as limiting unless the claims expressly state otherwise. Reference numerals that are like, refer to like indications throughout the various views of the drawings.

The improved combination lighting-danger detection apparatus and system generally comprises a host device wirelessly paired with a network of remote sensing and utility satellites, where the host receives signals from the sensing satellites to extend its monitoring range, creates a distributed network by issuing commands to the utility satellites, includes audible and visual alarms, and transmits alerts across the network, and a base station that enables users to configure preferences, manage settings, test features and control operations through an application. With a series of such devices, networked throughout a building structure, provides a 'whole-house' complement to security, accessibility, and efficiency providing greater, danger protection, hazard warning, and utility operations, convenience functionality.

The present invention is designed to directly replace a conventional light bulb, regardless of its usual style or shape, with an enhanced lighting-danger detection lamp/fixture. This fixture acts as a host and can pair with one or more remote satellite sensors capable of detecting various hazards such as smoke/fire, carbon monoxide, and gases (including natural gas, propane, radon, or refrigerant gases). Pairing supports multiple satellite sensors to monitor and report potential dangers or hazards from all corners of a home, offering comprehensive coverage as desired. This setup provides a 'whole-house' network of protection, ensuring early warnings through audible alerts and distinct colored strobe alarm lights: RED for smoke/fire, AMBER for carbon monoxide, BLUE for gases, and GREEN strobing to visually indicate a safe way out when a hazard is near. Additionally, alternating high-intensity green and white strobing lights enhance safety by marking the evacuation route (green) and providing illumination (white) for clear visibility.

The present disclosure is designed to integrate seamlessly with existing lighting lamp styles and configurations, allowing easy replacement of conventional lighting fixtures. This enables straightforward upgrades for homes or buildings, enhancing safety and self-assurance. Additionally, lighting-danger detection lamp/fixture apparatuses equipped with remote satellite sensors can be monitored via optional base-stations positioned in user-convenient locations, such as the master bedroom, kitchen, or family room. These base-stations provide detailed displays of alarm locations and their specific types or categories upon activation.

The inclusion of cost-effective remote satellite sensor units, forming a distributed network, paired with their controlling lighting-danger detection lamp/fixture host apparatus, establishes a comprehensive 'blanket' of coverage. This creates a 'dome' of security and a 'whole-house' solution for protection and convenience. The system effectively detects hazards, issues alarms, and provides visual and audible guidance for the safest exit routes during extreme emergencies.

The user of the present system and apparatus can remove older independent smoke and carbon monoxide alarming devices that require constant replacing of batteries, and are subject to annoying false triggering of the alarm, which cannot be silenced conveniently, or easily tested, e.g., they need to remove the battery to silence, and, do not alarm with visible 'colored-strobing' LED lighting means. Even the newer conventional so-called 10-year battery smoke and CO detection devices, even when networked, have shortcomings, with respect to the improved combination of lighting-danger detection lamp/fixture host apparatuses paired with at least one or more remote satellite sensor devices. These conventional prior art devices cannot be practically everywhere and therefore the danger hazard needs to migrate to their location before it is sensed and alarm given.

The improved lighting-danger detection lamp/fixture, coupled with remote satellite sensor unit(s), as described in this disclosure, offers robust danger and hazard alerting capabilities in the first embodiment. It is designed to identify hazards, notify users, and guide them to safety. Additionally, in the second embodiment, it incorporates 'other' general utility functions, enabling activation, control, or information relay through communication within the network parameters. These communications may involve devices such as a doorbell, sound system, camera, or mechanical service, facilitating the execution of commands or responses to specific actions or events.

To improve on these devices, a remote 'satellite' danger sensor is to be coupled by means to pair exclusively to the aforementioned lighting-danger detection lamp/fixture, light bulb as the host, thus incorporating a danger detection means both locally and remotely. These supporting element remote satellites afford added coverage by remotely placing such distinct sensing detection at places when a conventional danger detection device is not practical. The wireless communications between the host lighting-danger detection lamp/fixture and all paired remote satellites are on one channel (considered as local and is exclusive to its host), and the host lighting-danger detection lamp to a network (considered as global and shares data with peer units and a base-station if any) communications on another channel. Thus, making a practical means to monitor the whole house. The exclusive pairing of a satellite to a single host is not a limitation but is considered a benefit to limit network communication chatter.

An example of such a match-up of devices would be, a table lamp having installed one or more sensor means of a lamp-detection light bulb/fixture host (comprising at least one of a smoke detector, carbon monoxide (CO) detector, a gas detector such as natural gas, propane, radon, or other hazard detection means), paired with one or more remote satellite sensors. In a scenario, a remote satellite sensor for carbon monoxide is placed at the discharge vent from the heating, ventilation, and air conditioning (HVAC). Perhaps a second CO detector at the return vent of the HVAC and a third at an entrance to a stairway would provide even greater danger protection. The single lamp-detecting light bulb/fixture is part of a network of other danger lamp-detecting lighting devices throughout the home. The remote satellite CO sensors in this scenario provide the greatest possible coverage for the chosen hazard detection giving more distant signaling of a danger. If any one of these satellites, or the main lamp-detection host lighting bulb/fixture should detect CO, the result is immediately transmitted throughout the network and the audible and visual effects begin their strobing of AMBER light of carbon monoxide, while other lighting lamp-detection devices strobe GREEN light indicating a danger nearby and a safe-way-out.

This scenario shows a single room for the ideal protection from the hazard of CO. In like manner, other remote satellite sensors, having other hazard means are also paired with lighting lamp-detection host bulbs/fixtures that are networked. The criteria are that the lighting lamp-detector host may or may not have a like sensor to be paired with a remote satellite sensor. In the preferred embodiment, RED and WHITE alternating strobe light is for smoke/fire. While AMBER and WHITE alternating strobe light is for carbon monoxide (CO). And, BLUE and WHITE alternating strobe light is for gases (gases being natural gas, propane, radon, refrigerant gases, methane, etc.). Other hazard detection sensor means could be other colors. But the GREEN and WHITE alternating strobe light is to indicate SAFE-WAY-OUT. That is, never exit or go to the colored strobing light, go to the green to exit. Green always means . . . DANGER NEARBY, EXIT NOW TO THE GREEN.

Another improvement with the paired lamp-detection and remote satellite sensor devices is the process testing thereof. Traditionally the user of danger detection devices had to press buttons, and even climb ladders to access. Manufacturers suggest testing twice a year, or even once a month. Most people never do so because of the difficulty and the instruction is forgotten. The present invention provides a practical means to test and a means to remind when maintenance is necessary. Once a remote satellite is paired with a host lamp-detector, all test, status, and battery information is available for easy review by the user of the networked whole-home security.

The present disclosure provides structure to affect a more efficient means to illuminate rooms in any home or building, alerting of danger and hazards providing smoke and/or carbon monoxide and/or gas detection (gases being natural gas, propane, radon, refrigerants, etc.) to signal alarm; all in one direct replaceable package, configured to any conventional lighting-danger detection bulb/fixture of any technology. The lighting-danger detection host device has means to pair with supporting remote satellite sensors of 'like' detection methods. The result of this unique approach reduces the risky guesswork of prior art (in its inability to cover whole areas effectively) and gives full control to the user as to the creation of a whole-house security, a blanket of coverage via a distributed network; with respect to danger alerting and a means to exit by knowing visually a safe-way-out, especially when a danger is nearby.

In the context of this disclosure, the pairing of a 'host' and 'supporting element' enables configuration as a 'general utility' set of appliances. For instance, the host lighting lamp/fixture could pair with a motorized valve acting as a remote satellite unit. When integrated with a garden water faucet, the system network could command the valve to activate and water the garden. Another example includes a satellite 'water' sensor placed at the base of a hot water tank. Should the sensor detect water from a burst caused by rust erosion, it would communicate this to the host lighting lamp/fixture. In turn, the host could command a water shut-off valve to close, preventing extensive water damage to the property. This highlights the flexibility and functionality of the paired system in addressing practical utility needs.

The improved combination lighting-danger detection apparatus and system generally comprises a host device wirelessly paired with a network of remote sensing and utility satellites, where the host receives signals from the sensing satellites to extend its monitoring range, creates a distributed network by issuing commands to the utility satellites, includes audible and visual alarms, and transmits alerts across the network, and a base station to monitor and system test, that enables users to configure preferences, manage settings, and control operations through an application.

Depicted in FIG. 1*a*, is an isometric illustration of a remote satellite sensor 100 unit, of a possible 'field' of satellite unit(s) 700 in an embodiment of the present invention, (one of many conceivable remote sensing satellite type 101), and depicts an optional mounting means 102. The remote satellite sensor unit comprises a housing 104, with a battery compartment 106, a wall structure 108, a vent meshing 110, a function button 112, an indicating LED 114, a snap-on clip structure 116, a backplate 118, optional mounting screws 120, an optional mounting double-sided tape 122, and a battery activation pull-tab 124. The satellite unit(s) 700 and remote sensing satellite type 101 descriptions will become apparent in FIGS. 2 and 3.

In a manner, the optional mounting means 102 would be fixed to a surface (wall, ceiling, floor, or object) by either of two means; the optional mounting screws 120 or optional mounting double-sided tape 122. Or, would simply be placed, for example, on an object, such as a shelf. The battery activation pull-tab 124 would be removed, putting the battery in contact with the circuitry powering the unit. The indicating LED 114 would flash, for example, ¼ second every 2 seconds, indicating the remote satellite sensor 100 unit is ready to be paired with a host lighting-danger detection lamp/fixture 10 (disclosed in detail in FIG. 2). The pairing process will be disclosed in FIG. 4. The remote satellite sensor 100 unit is now set to be disposed to its backplate 118 (if used), whereby there are conventional coupling clips suitable to receive the snap-on clip structure 116 (not shown) to the housing 104. These clips are simple structures within the plastic housing that allow two objects to fasten together in a secure manner and attach the two objects.

After the remote satellite sensor 100 unit is fully assembled, secured to a surface, and paired with its host (as will be discussed in FIG. 4 later), the function button 112 can be depressed to test the communication with its host. The indication LED will also flash signaling a test response. The sensing means (that will be disclosed in FIG. 2), is just beneath vent meshing 110, and allows whatever type of smoke, carbon monoxide, gases, etc., to enter. More of this operation will be fully discussed in later sections.

Figure 1B:
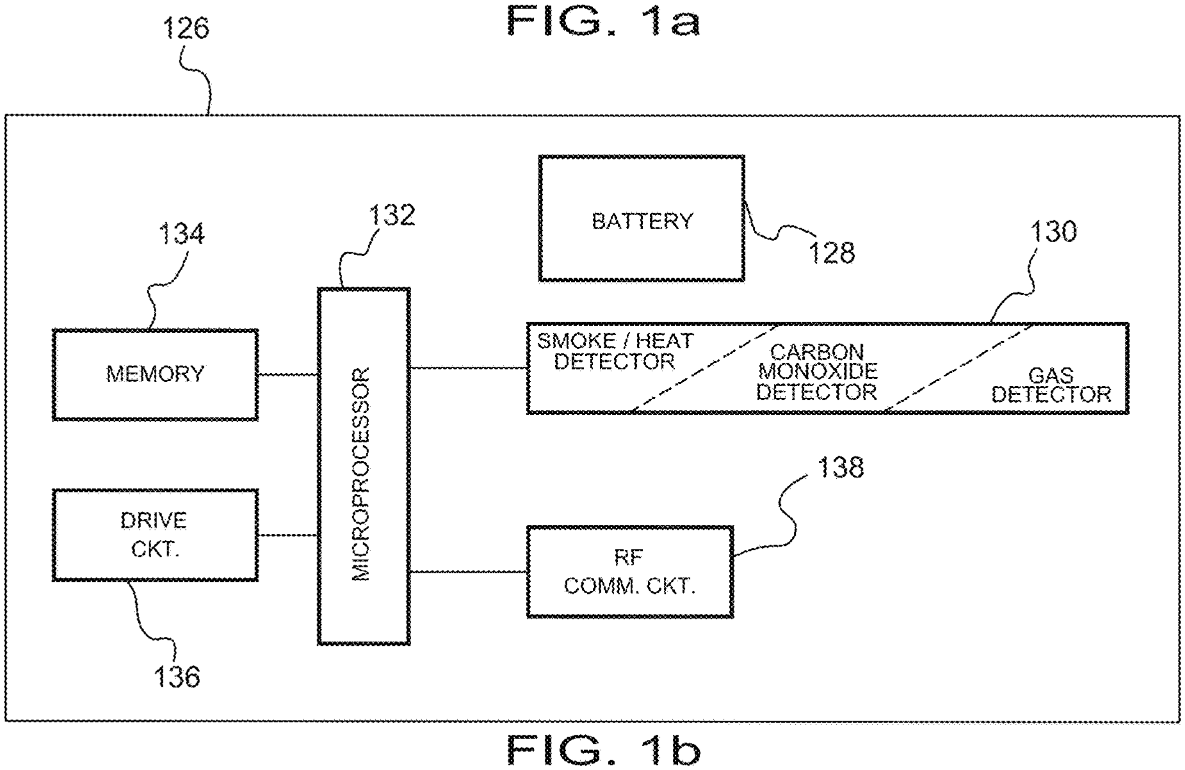
FIG. 1*b* is a block diagram of the present invention of remote satellite sensor showing one possible layout of electronics.

Turning to FIG. 1*b*, this block diagram illustrates the remote satellite sensor 100 unit circuitry, as described in FIG. 1*a*, with one possible layout detailed in electronic diagram 126. This layout includes a battery 128, a sensor 130 (capable of detecting at least one of smoke, fire/heat, carbon monoxide, or gas), a microprocessor 132, a memory 134, drive circuitry 136, and a local RF communication circuit 138. The battery, microprocessor, memory, and peripheral controlling circuitry (drive circuitry 136) function as conventional microprocessor systems running routines for specific purposes.

In the preferred embodiment, the sensor 130 can fulfill various detection roles, such as a smoke detector, fire (heat) detector, carbon monoxide detector, or gas detector. The gas detector can identify gases like natural gas, propane, radon, refrigerant, or others. It is essential to recognize that the remote satellite sensor 100 unit is highly versatile, with its functionality determined by the specific sensor incorporated. Once configured, it integrates with the lighting-danger detection host lamp/fixture, serving as a remote 'input.' Additional features and configurations for this system are further detailed in FIG. 3, while the improved lighting-danger detection lamp/fixture 10 is elaborated on in FIG. 2.

Figure 1C:
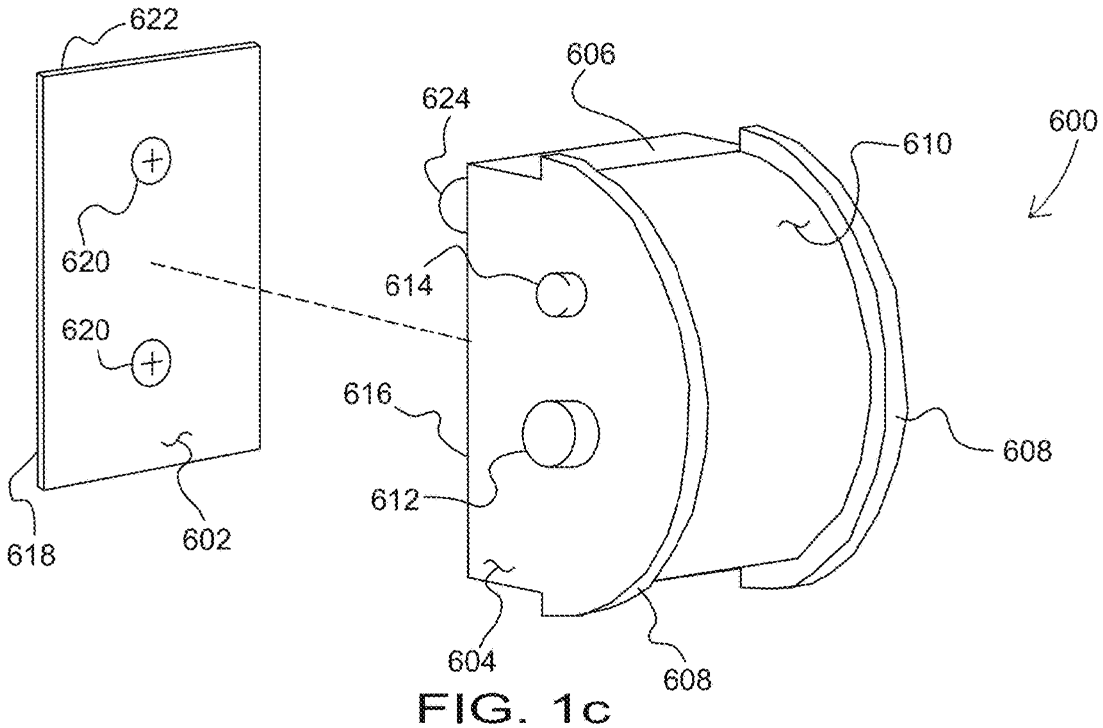
FIG. 1*c* is another isometric illustration of a satellite unit(s) 700 of the present invention configured as a remote satellite universal sensor 600 unit component, in accordance with an embodiment of the present disclosure.

FIG. 1*c*, is an isometric illustration of a remote satellite universal sensor 600 unit, of a possible 'field' of satellite unit(s) 700 in an embodiment of the present invention, (one of many conceivable remote sensing satellite type 101). The component is depicted with an optional mounting means 602. The remote satellite universal sensor unit 600 comprises a housing 604, with a battery compartment 606, a function button 612, an indicating LED 614, a coupling clip structure 616, a backplate 618, optional mounting screws 620, an optional mounting double-sided tape 622, and a battery activation pull-tab 624. The satellite unit(s) 700 and remote sensing satellite type 101 descriptions will become apparent in FIGS. 2 and 3.

In a manner, the optional mounting means 602 would be fixed to a surface (wall, ceiling, floor, or object) by either of two means; the optional mounting screws 620 or optional mounting double-sided tape 622. Or, would simply be placed, for example, on an object, such as a shelf or table. The battery activation pull-tab 624 would be removed, putting the battery in contact with the circuitry powering the unit. The indicating LED 614 would flash, for example, ¼ second every 2 seconds, indicating the remote satellite universal sensor 600 unit is ready to be paired with a host lighting-danger detection lamp/fixture 10 (disclosed in detail in FIG. 2). The pairing process will be disclosed in FIG. 4. The remote satellite universal sensor 600 unit is now set to be disposed to its backplate 618 (if used), whereby there are coupling clips suitable to receive the snap-on clip structure 616 to the housing 604 (not shown). These clips are simple structures within the plastic housing that allow two objects to fasten together in a secure manner and attach the two objects.

After the remote satellite universal sensor 600 unit is fully assembled, secured to a surface, and paired with its host (as will be discussed in FIG. 4 later), the function button 612 can be depressed to test the communication with its host. The indication LED will also flash signaling a test response. The sensing means (that will be disclosed in FIG. 2), is just beneath sensing area 610, and allows whatever type of general sensor to function; for example, a motion sensor, a sound detector sensor, a temperature sensor, a pressure sensor, a moisture sensor, a touch sensor, etc., making the unit 'multi-functional' depending on which type of sensor is present beneath sensing area 610. More of this operation will be fully discussed in later sections.

Figure 1D:
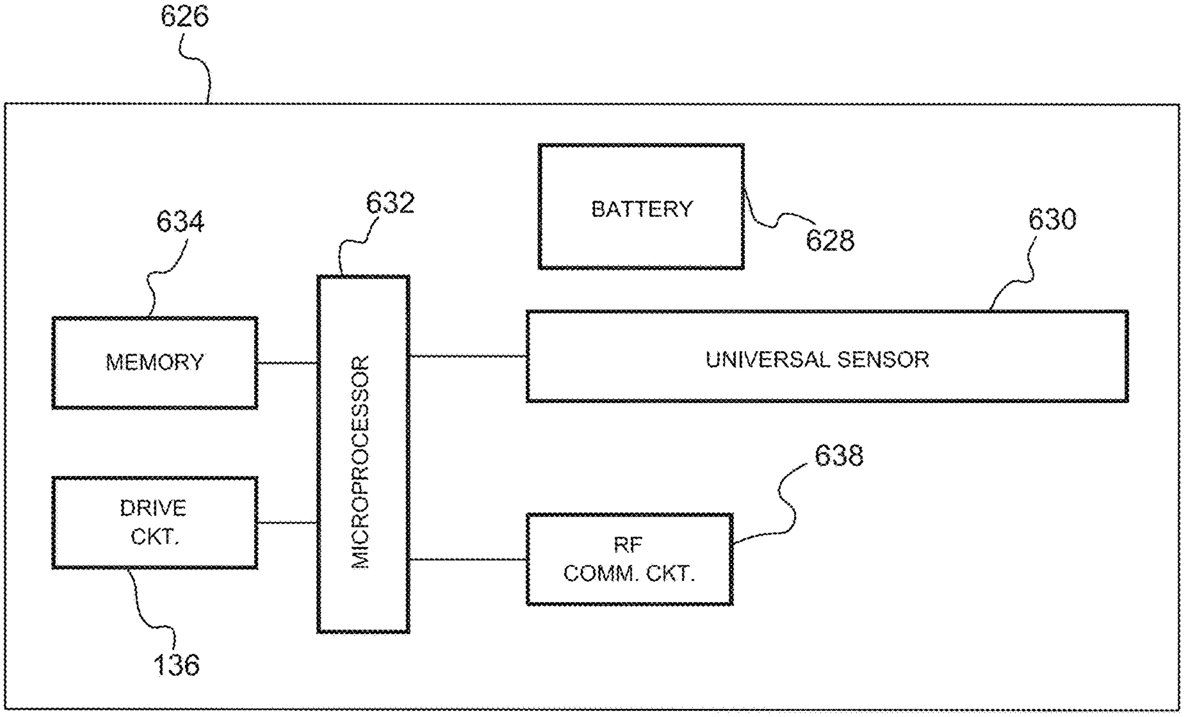
FIG. 1*d* is a block diagram of the present invention of a remote satellite universal sensor showing one possible layout of electronics.

Referring to FIG. 1*d*, this block diagram illustrates the remote satellite universal sensor 600 unit circuitry as described in FIG. 1*c*. A possible layout is depicted in electronic diagram 626, featuring components including a battery 628, a universal sensor 630, a microprocessor 632, a memory 634, drive circuitry 636, and local RF communication circuitry 638. The battery, microprocessor, memory, and drive circuitry operate as conventional microprocessor systems running routines designed for specific functionalities.

In the preferred embodiment, the universal sensor 630 can perform various roles depending on its type, such as motion sensing, sound detection, temperature measurement, pressure detection, moisture sensing, or touch detection, among others. As mentioned in FIG. 1*b*, the remote satellite universal sensor 600 unit is inherently versatile, its functionality defined by the type of sensor integrated. Once paired, it becomes part of the lighting-danger detection host lamp/fixture 10 system, serving as a remote 'input.' Both the remote satellite universal sensor 600 unit and the remote satellite sensor 100 unit function as remote 'inputs,' with additional features and configurations detailed in FIG. 3, as well as in FIGS. 2 and 4.

Figure 1E:
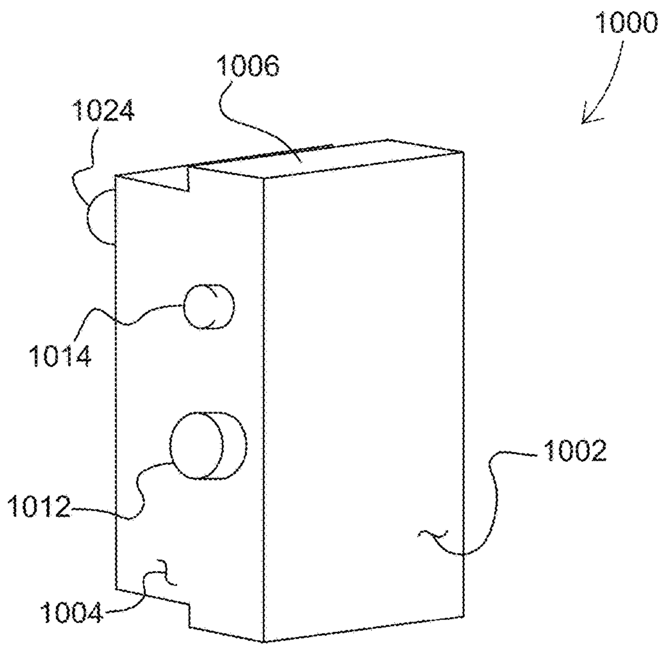
FIG. 1*e* is an isometric illustration of a satellite unit(s) 700 of the present invention configured as a remote satellite general-utility 1000 (general-purpose element) unit component, in accordance with an embodiment of the present disclosure.

FIG. 1*e*, is an isometric illustration of a remote satellite general-utility 1000 unit, of a possible 'field' of satellite unit(s) 700 in an embodiment of the present invention, (one of many conceivable, a remote utility/purpose satellite type 1001) represents any given apparatus that can perform a function. In this disclosure, there are many specific function examples; that will be detailed in the following FIGS. 1*g*, 1*h*, 1*j*, and 1*k*. But the example of remote satellite general-utility 1000 unit is meant to cover other functioning remote satellites and to reduce the redundancy of examples. It is important to understand that all the remote satellite general-purpose element units serve as remote 'outputs' to perform a function; either with or without the benefit of the remote satellite sensor 100 unit or remote satellite universal sensor 600 as 'inputs' (these features will be disclosed in FIGS. 2 and 3 as will the descriptions of satellite unit(s) 700 and remote sensing satellite type 1001).

The remote satellite remote satellite general-utility 1000 unit, having a general structure 1002 within a housing 1004, a battery compartment 1006, a function button 1012, an indicating LED 1014, and a battery activation pull-tab 1024. The general structure 1002 is dependent on the 'type' of function the apparatus may provide. For example, if its purpose is to function as a temperature control, it would have a structure to perform changing the temperature of a given device. Likewise, if the remote satellite general-utility 1000 unit was a sound-emitting device, or an entry door locking/unlocking mechanism, or a valve actuator, as examples, would have the structure to perform such tasks. It is obvious that the general structure 1002 in this illustration, is meant to be 'multi-functional', depending on what type of operational purpose it is intended to perform.

The remote satellite general-utility 1000 unit will be paired with an improved host lighting-danger detection lamp/fixture 10 (disclosed in detail in FIG. 2), and will receive commands to perform to its purpose on demand.

Figure 1F:
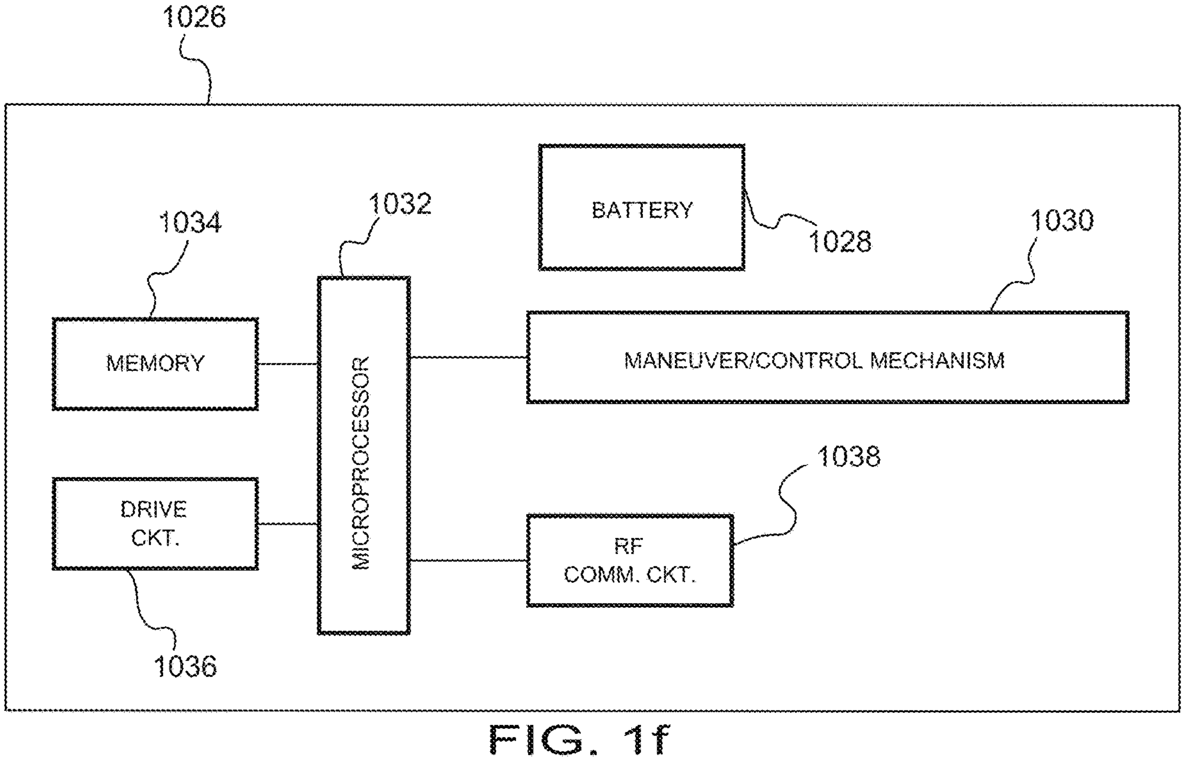
FIG. 1*f* is a block diagram of the present invention of a remote satellite general-utility (general-purpose element) unit showing one possible layout of electronics.

FIG. 1*f* is a block diagram of an embodiment of the present invention of the remote satellite general-utility 1000 unit circuitry, of the apparatus described in FIG. 1*e*, and one possible layout of such circuitry is shown in electronic diagram 1026. Having a battery 1028, a maneuver/control mechanism 1030, a microprocessor 1032, a memory 1034, a drive circuitry 1036, and a radio frequency circuit, local RF communication 1038. The battery 1028, microprocessor 1032, memory 1034, any peripheral controlling circuitry referenced as drive circuitry 1036, and a radio frequency circuit, local RF communication 1038, all operate as conventional microprocessor systems running routines to function for a purpose. As in the case of the remote satellite general-utility 1000 embodiment, the maneuver/control mechanism 1030 can be any one of a variety of controlling devices to perform a specific purpose; such as to change a temperature, create a sound, actuate a door to lock or unlock, to cause a valve to open or close, etc., as examples.

Figure 1G:
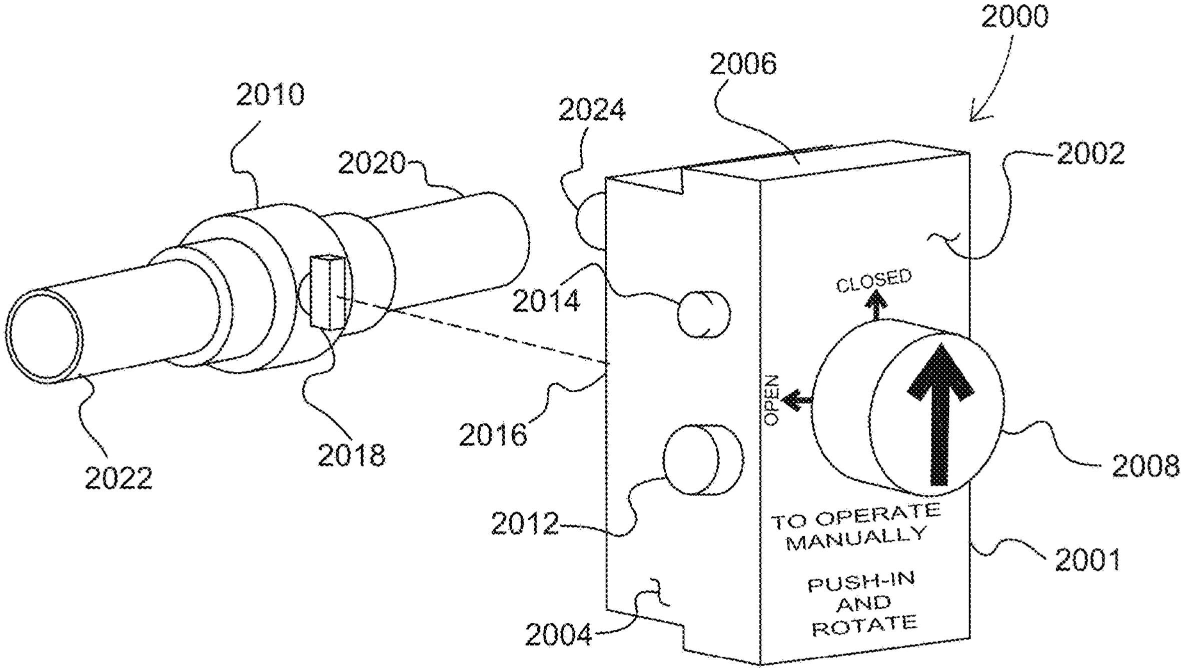
FIG. 1*g* is an isometric illustration of a satellite unit(s) 700 of the present invention configured as a remote satellite specific-purpose unit component of FIG. 1*e*, whereby its function is a valve and actuator 2000, in accordance with an embodiment of the present disclosure.

FIG. 1*g*, is an isometric illustration of a remote satellite specific-purpose 2000 unit, of an embodiment of the present invention of a possible 'field' of satellite unit(s) 700 (one of the many conceivable remote utility/purpose satellite type 1001), and having a pipe valve mechanism 2010. A general structure, actuator-pipe valve module 2002 is dependent on the 'type & size' of the pipe valve mechanism 2010. The remote satellite specific-purpose 2000 unit further comprises a housing 2004, with a battery compartment 2006, an electric motor/rotation knob 2008, a function button 2012, an indicating LED 2014, a coupling structure 2016, and a battery activation pull-tab 2024. The pipe valve mechanism 2010 additionally comprises a valve rotation grip 2018 (stem and handle), a supply-side connection 2020, and an isolation-side connection 2022. The satellite unit(s) 700 and remote sensing satellite type 1001 descriptions will become apparent in FIGS. 2 and 3.

In a method, the remote satellite specific-purpose 2000 unit, comprising a pipe valve module 2001, having both the general structure, actuator-pipe valve module 2002 and the pipe valve mechanism 2010 is joined via the coupling structure 2016 (not shown) with the valve rotation grip 2018; making an electronically operated pipe valve assembly. The battery activation pull-tab 2024 would be removed, putting the battery in contact with the circuitry powering the unit. The indicating LED 2014 would flash, for example, ¼ second every 2 seconds, indicating the remote satellite specific-purpose 2000 unit is ready to be paired with an improved host lighting-danger detection lamp/fixture 10 (disclosed in detail in FIG. 2). The pairing process will be disclosed in FIG. 4. The remote satellite specific-purpose 2000 unit is now ready to receive commands to turn the valve flow either OPEN or CLOSE (via the electric motor/rotation knob 2008 rotating the valve rotation grip 2018 (stem and handle) of the pipe valve mechanism 2010), as the application case may require with respect to a valve size and purpose of the control of flow.

After the remote satellite specific-purpose 2000 unit is fully assembled, fitted to the supply-side connection 2020 and an isolation-side connection 2022, and paired with its host (as will be discussed in FIG. 4 later), the function button 2012 can be depressed to test the communication with its host. The indication LED 2014 will also flash signaling a test response. An example of an application of such pairing of a remote satellite specific-purpose 2000 unit and an improved host lighting-danger detection lamp/fixture 10, is to voice command a pipe valve mechanism 2010 to CLOSE. Such ability would be useful for those who want to isolate water flow in pipes when they go on vacation, for example. Another use would be a water sensor (placed on the floor below a hot water tank) as described in FIGS. 1*c* & 1*d*, to signal to the same host when water was detected. In this scenario, host lighting-danger detection lamp/fixture 10 would automatically command (issue) the paired remote satellite specific-purpose 2000 unit to CLOSE its pipe valve mechanism 2010; thus CLOSE and stopping the flow of water and the resulting water damage.

It should be explicitly understood that the remote satellite specific-purpose 2000 unit and the pipe valve mechanism 2010 can be manufactured into a single unit, or, the remote satellite specific purpose 2000 unit can be retrofittable to any conventional pipe valve mechanism 2010. Further, it should be noted that the electric motor/rotation knob 2008 can have 'limit' switches to provide feedback as to the exact state of the pipe valve mechanism 2010. Still further, the electric motor/rotation knob 2008 (within the general structure, actuator-pipe valve module 2002) can be manually operated; in the event of a power or battery failure. One example of performing a manual positioning of the pipe valve mechanism 2010, would be to 'push-in' the rotating knob, to disengage the drive motor, then manually position the valve to a desired OPEN or CLOSED. More will be discussed on these functions later in the disclosure.

Figure 1H:
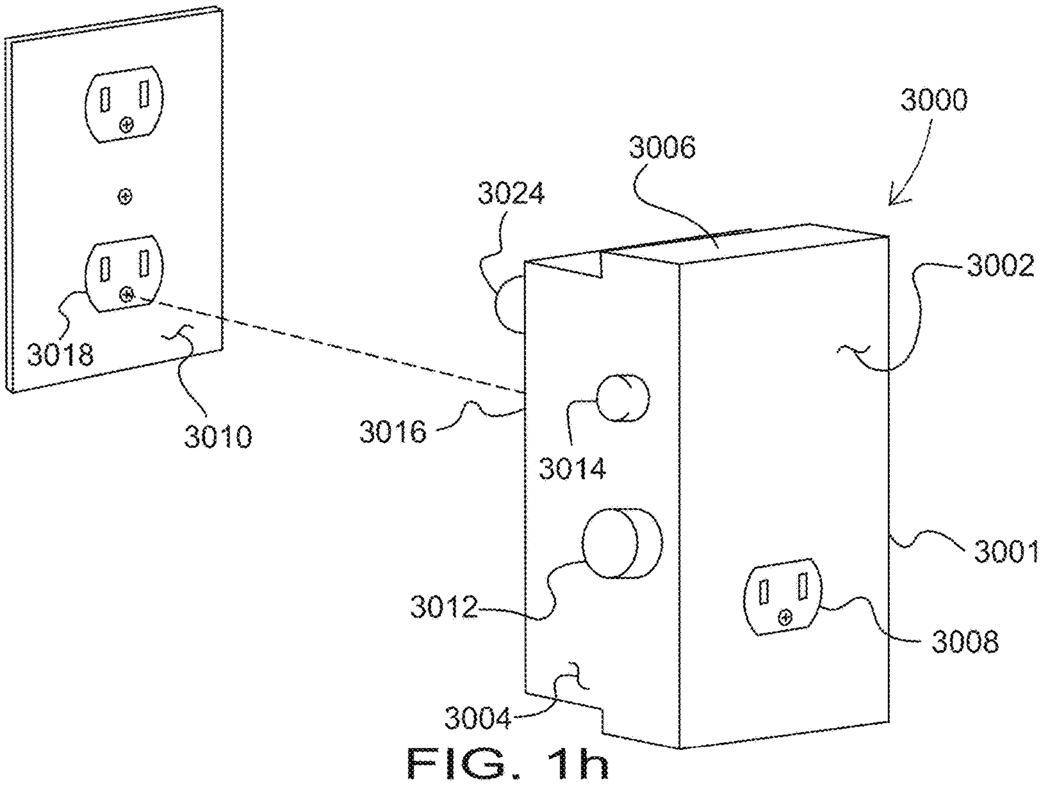
FIG. 1*h* is an isometric illustration of a satellite unit(s) 700 of the present invention configured as a remote satellite specific-purpose unit component of FIG. 1*e*, whereby its function is a 'plug-in' module 3000 that will provide a 120 VAC power source, in accordance with an embodiment of the present disclosure.

FIG. 1*h* illustrates an isometric view of a remote satellite specific-purpose 3000 unit, of the 'field' of satellite unit(s) 700 in an embodiment of the present invention, (one of the many conceivable remote utility/purpose satellite type 1001), of FIG. 1*e*. Whereby its function is a 'plug-in' module 3001 that will provide a 120/230 VAC power source, in accordance with an embodiment of the present disclosure. The remote satellite specific-purpose 3000 'plug-in' module 3001 comprises a general structure, 120 VAC plug-in module 3002, a housing 3004, a battery compartment 3006, a controlled output plug 3008, a function button 3012, an indicating LED 3014, and a coupling structure 3016. The satellite unit(s) 700 and remote sensing satellite type 1001 descriptions will become apparent in FIGS. 2 and 3.

In this setup, the remote satellite specific-purpose 3000, 'plug-in' module 3001 connects to a conventional wall receptacle 3010 using the 3-prong coupling structure 3016 (not illustrated) and receives AC power from the 120 VAC source 3018. Removing the battery activation pull-tab 3024 completes the circuit, energizing the module's electronics. The indicating LED 3014 then flashes, such as for ¼ second every 2 seconds, signaling that the module is ready for pairing with a host lighting-danger detection lamp/fixture 10 (detailed in FIG. 2). The pairing process itself is explained in FIG. 4.

Once paired, the remote satellite specific-purpose, 'plug-in' module 3001 is capable of receiving commands to switch the controlled output plug 3008 ON or OFF, depending on the application requirements. Various devices can be connected to the controlled output plug 3008, such as backyard decorative lights, security lighting, a portable heater, or a coffee maker, among others. This setup provides versatile and convenient functionality for a wide range of practical uses.

After the remote satellite specific-purpose 3000, 'plug-in' module 3001 is fully installed, and paired with its host (as will be discussed in FIG. 4 later), the function button 3012 can be depressed to test the communication with its host. The indication LED 3014 will also flash signaling a test response. More will be discussed on these functions later in the disclosure.

Figure 1J:
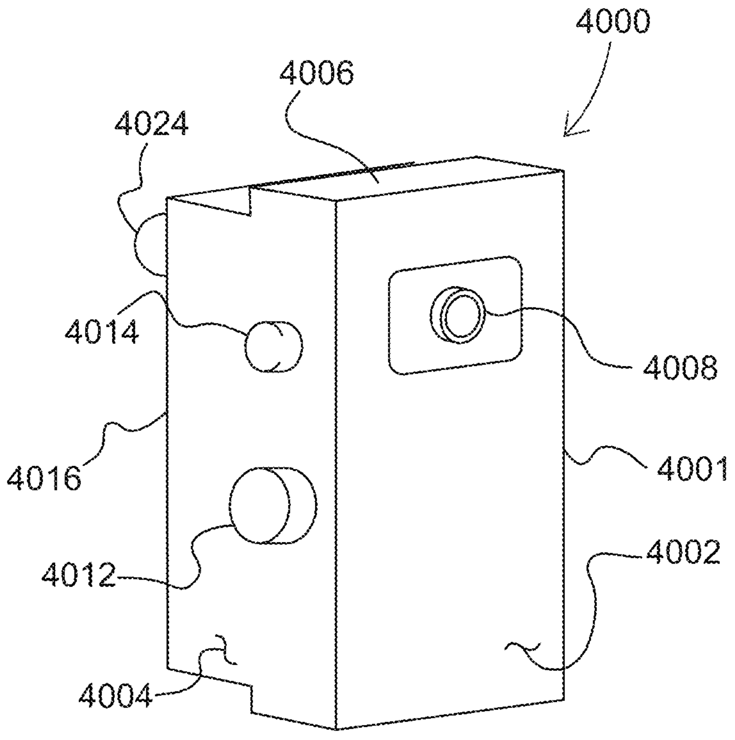
FIG. 1*j* is an isometric illustration of a satellite unit(s) 700 of the present invention configured as a remote satellite specific-purpose unit component of FIG. 1*e*, whereby its function is a video camera module 4000, in accordance with an embodiment of the present disclosure.

FIG. 1*j* is an isometric illustration view of a remote satellite specific-purpose 4000 unit, of the 'field' of satellite unit(s) 700 in an embodiment of the present invention (one of the many conceivable remote utility/purpose satellite type 1001), of FIG. 1*e*. Whereby its function is a video camera module 4001, in accordance with an embodiment of the present disclosure; The remote satellite specific-purpose 4000 video camera module 4001 comprises a general structure, video camera module 4002, a housing 4004, a battery compartment 4006, a video camera lens 4008, a function button 4012, an indicating LED 4014, and an optional mounting structure 4016. The satellite unit(s) 700 and remote sensing satellite type 1001 descriptions will become apparent in FIGS. 2 and 3.

In process, the remote satellite specific-purpose 4000, video camera module 4001, may be attached via an optional mounting structure 4016 (not shown). The battery activation pull-tab 4024 would be removed, putting the battery in contact with the circuitry powering the electronics of the unit. The indicating LED 4014 would flash, for example, ¼ second every 2 seconds, indicating the remote satellite specific-purpose, video camera module 4001 is ready to be paired with a host lighting-danger detection lamp/fixture 10 (disclosed in detail in FIG. 2). The pairing process will be disclosed in FIG. 4. The remote satellite specific-purpose 4000, configured video camera module 4001 is now ready to receive commands to turn it either ON or OFF, as the application case may require. One application for such apparatus could be to assist in the eldercare of a parent; by providing necessary observation, for example, of someone's dad prone to falling. Such observation would allow the caregiver to oversee the accident-prone elderly person in real time remotely, etc. by commanding (issuing) instructions to a host lighting-danger detection lamp/fixture 10.

After the remote satellite specific-purpose, video camera module 4001 is fully installed, and paired with its host (as will be discussed in FIG. 4 later), the function button 4012 can be depressed to test the communication with its host. The indication LED 4014 will also flash signaling a test response. The video camera module 4001 can produce both 'still-frame' or 'streaming-video' and transmit via RF communications to a number of appropriate display devices. More will be discussed on these functions later in the disclosure.

Figure 1K:
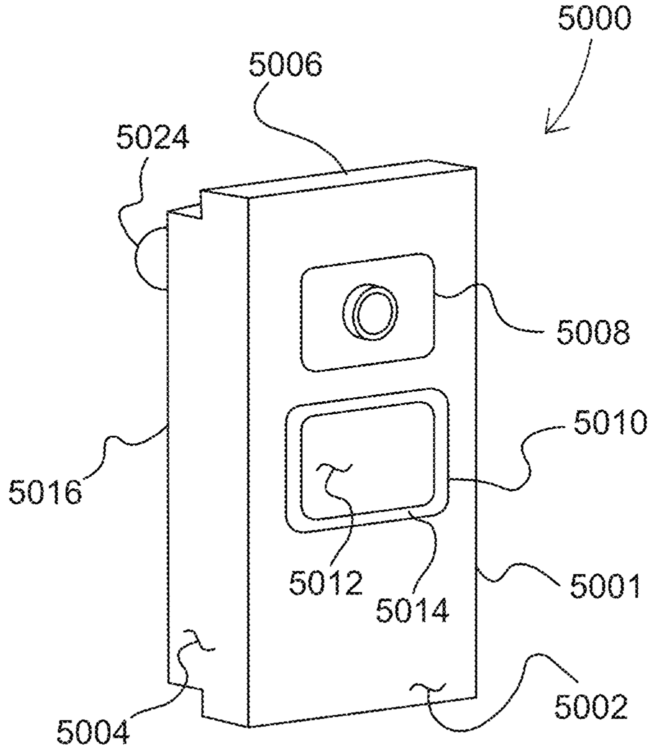
FIG. 1*k* is an isometric illustration of a satellite unit(s) 700 of the present invention configured as a remote satellite specific-purpose unit component of FIG. 1*e*, whereby its function is a doorbell module 5000, in accordance with an embodiment of the present disclosure.

FIG. 1*k* is a view of a remote satellite specific-purpose 5000 unit, of the 'field' of satellite unit(s) 700 in an embodiment of the present invention (one of the many conceivable remote utility/purpose satellite type 1001), of FIG. 1*e*. Whereby its function is a doorbell module 5001, in accordance with an embodiment of the present disclosure. The remote satellite specific-purpose 5000 doorbell module 5001 comprises a general structure, doorbell module 5002, a housing 5004, a battery compartment 5006, a video camera section 5008, a ring section 5010 having a function button 5012, an indicating LED 5014, and a mounting structure 5016. The satellite unit(s) 700 and remote sensing satellite type 1001 descriptions will become apparent in FIGS. 2 and 3.

The remote satellite specific-purpose doorbell module 5001 is designed to be mounted like a conventional doorbell using a mounting structure 5016 (not shown). The battery activation pull-tab 5024 must be removed to power the unit's electronics, with the option for additional power supplied through a conventional doorbell low voltage source (not illustrated). The ring section 5010 includes an indicating LED 5014, which flashes (e.g., for ¼ second every 2 seconds) to signal that the doorbell module is ready for pairing with a host lighting-danger detection lamp/fixture 10 (explained in detail in FIG. 2). The pairing process is described in FIG. 4.

Once paired, the remote satellite specific-purpose doorbell module 5001 is operational as a doorbell. When the function button 5012 is pressed, the indicating LED 5014 lights up, and the video camera initiates a predetermined photo sequence (details provided later). This action notifies the host lighting-danger detection lamp/fixture 10 of a visitor's presence. The host then communicates with the network of host systems, broadcasting a 'ringtone' to make the entire house aware that someone is at the door.

The convenience of having a ringtone announce someone's presence at the door throughout the entire house structure is immediately apparent-wherever an improved host lighting-danger detection lamp/fixture 10 is located. A user could utilize the intercom command within the local host lighting-danger detection lamp/fixture 10 to inquire who is at the door (as detailed in the inventor's earlier disclosure on intercom functionality). For instance, the user could ask this question hands-free from the kitchen while washing dishes.

Expanding on this example, if the home network includes a remote satellite general-utility 1000, such as the one described in FIG. 1*e*, configured as a door lock/unlock mechanism, the user could command the door to unlock, allowing the guest to enter-all through voice commands issued via any host lighting-danger detection lamp/fixture 10 in the network. Additionally, the video camera in the remote satellite doorbell module 5001 has the capability to generate both still-frame images and streaming video, which can be transmitted via RF communications to various compatible display devices. Further discussion of these functions and additional examples of their practical applications will be presented later in this disclosure.

Figure 2:
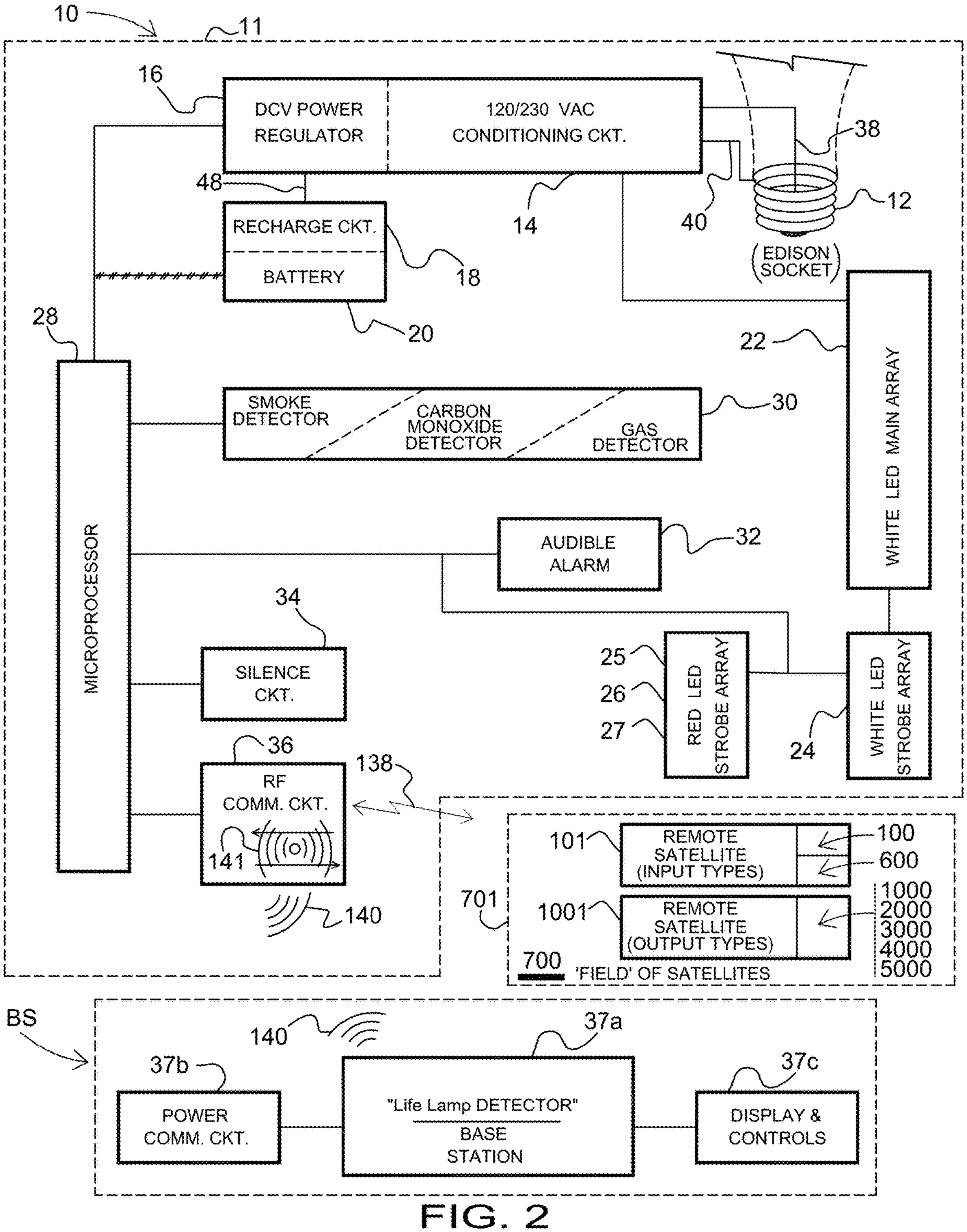
FIG. 2 is a block diagram 10 of the host lighting-danger detection lamp/fixture possible layout of electronics that also shows communications to remote satellite(s) and other network devices.

FIG. 2 illustrates block diagram 11 depicting one possible layout of a host lighting-danger detection lamp/fixture apparatus 10, of a possible electronics layout. Shown in block diagram 11, having an electrical connection means 12 (depicted here as the familiar Edison lamp with an E26 (refers to measurement “26 mm” style screw base, ‘A-19’ socket) represents a ‘host’ lighting device. A 120/230 VAC conditioning circuit 14, a DCV power regulator 16, a recharge circuit 18 and a rechargeable battery 20. Further is shown, a white LED main array 22, a white LED strobe array 24 and a colored LED strobe array green 25, red 26, and ~,~ amber/blue 27 as they relate to the conditioning circuit 14, and, a control microprocessor 28, as it relates to the DCV power regulator 16. The control microprocessor 28 directly controls one or more of a smoke/carbon monoxide/gas detector(s) 30, an audible alarm circuit 32, a silence circuit 34, and a communication circuit 36. The communication circuit can be present to incorporate networking features that will be disclosed in a later section. Lines 38 and 40 show 120 VAC power connections via the aforementioned conventional Edison E26 style socket providing interconnection to blocks within the diagram.

Conditioning circuit 14 supplies 120/230 VAC power to DCV power regulator 16 and white LED main array 22, white LED strobe array 24, and a colored LED strobe array green 25, red 26, and amber/blue 27. The DCV power regulator provides commercial power for charging the rechargeable battery 20 by the recharge circuit 18, and all of the other control components 28, 30, 32, 34, 36. In operation, when 120/230 VAC (Line Voltage) is available and present at the electrical connection means 12, the apparatus functions as follows: Conditioning circuit 14 steps-down and rectifies the VAC Line Voltage first, to the high intensity light emitting diodes (LED's) in the white LED main array 22 and white LED strobe array 24, providing visible light, and second, provide power to the DCV power regulator 16 that supplies control power and the recharging of the battery as needed. Should the Line Voltage be OFF, or not present, the battery 20 will supply all necessary power to circuits 28, 30, 32, 34, 36 and the two LED strobe arrays 25, 26 & 27, and 24 when in the alarm state. It is important to understand that the white LED's in the strobe array 24 function with, and exactly the same as, white LED's in the main array 22. The white LED strobe array activates only during an alarm situation when the system operates in battery mode.

Also illustrated in FIG. 2, is a brief description of a base-station BS (and/or a base-station application, APP), for the present invention to communicate via a global RF communications 140 with the individual, improved lighting-danger detection lamp/fixture 10 host devices (that will be discussed in FIG. 9) and is illustrated in block diagram 11 above. Further, there is a local RF communication 138 that provides a reserved network between the RF communications 36 and the remote satellite sensor 100 unit(s) and/or remote satellite universal sensor 600 (as earlier discussed in FIG. 1*a* through 1*k* and will be further discussed in FIG. 3) provide signal ‘input’ to the lighting-danger detection lamp/fixture 10 host. Likewise, the reserved network between the local RF communications 36 provides signal connections to the remote satellite process modules, as the remote satellite general-utility 1000 unit, and the remote satellite specific-purpose 2000, 3000, 4000, and 5000 units (generally known as the remote utility/purpose satellite type 1001, and when all are networked, become part of the ‘field’ of satellite unit(s) 700).

The preferred embodiment of RF communication for the present disclosure utilizes Bluetooth Low Energy (Bluetooth SIG, Inc., Kirkland, WA 98033, USA). Wi-Fi protocols may also be employed for specific video functionalities, such as in the remote satellite video camera module 4001 and the remote satellite doorbell module 5001 units. While particular communication protocols are referenced, any common communication method can be applied effectively. Examples of other protocols include Zigbee, Z-Wave, Thread, Matter, and Ethernet, among others.

A key goal of the disclosure is to enable adaptive communication with various ‘smart home’ devices, even those that may not be inherently compatible. This is achieved through the adaptive interoperability communications 141 system (as indicated by RF communications ckt 36 and further detailed in FIG. 9*b*). The aim is to facilitate seamless integration with the user's existing smart home devices. The advantages of adaptive interoperability communications will be further explored later in this disclosure.

It should be understood to one skilled in the art that the remote satellite sensor units function as ‘INPUT’ signals directed to the improved lighting-danger detection lamp/fixture 10 host, as depicted in FIGS. 1*a* through 1*d*. In contrast, the remote satellite general-utility 1000 unit, along with specific-purpose units 2000, 3000, 4000, and 5000, within the dashed-line box 701, operate based on ‘OUTPUT’ signals emitted by the improved lighting-danger detection lamp/fixture 10 host. These general-purpose and specific-purpose units carry out distinct physical functions, as demonstrated in FIGS. 1*e* through 1*k*.

Figure 3:
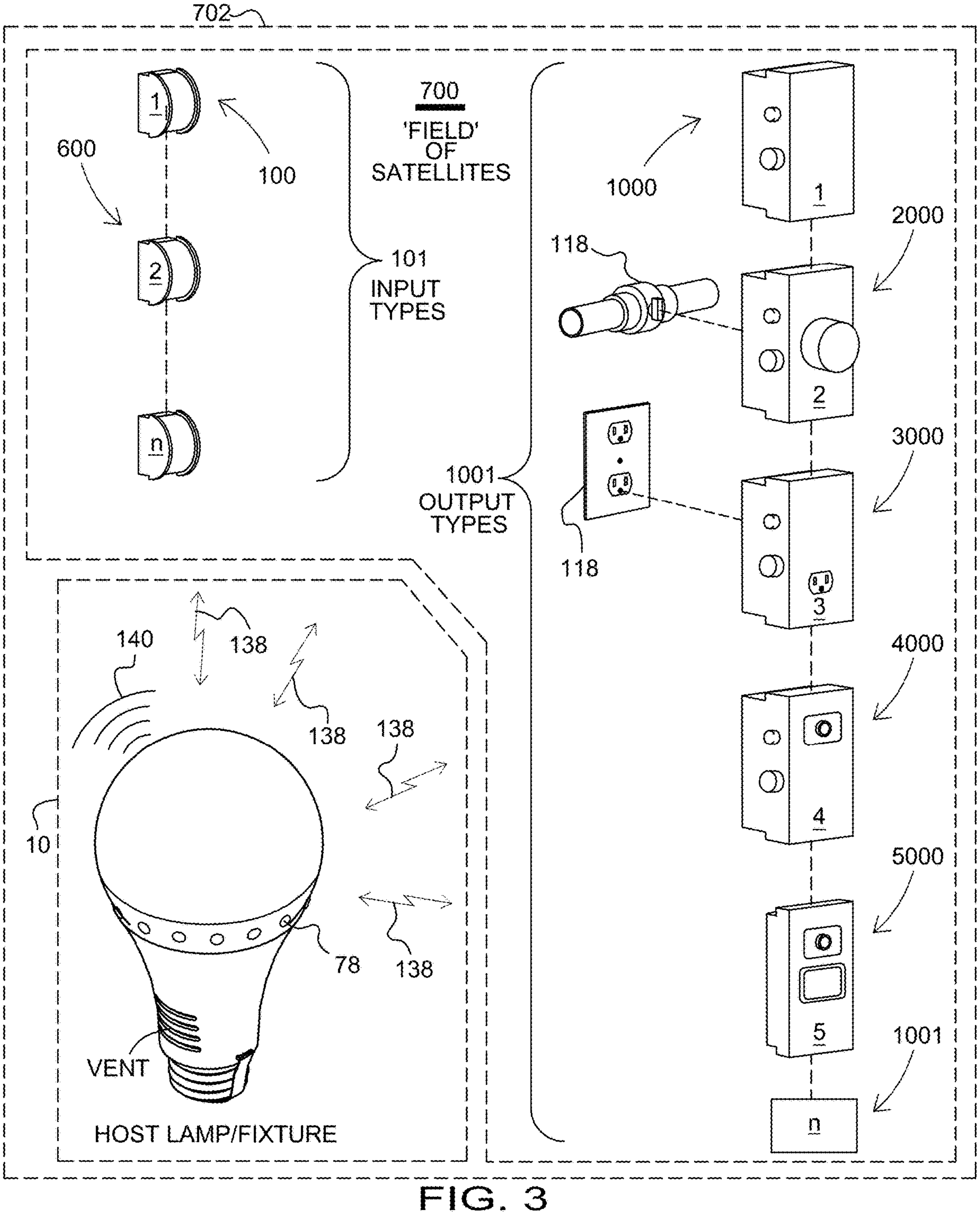
FIG. 3 is a perspective view showing an illustration of the present invention of a lighting-danger detection lamp/fixture host 10 apparatus being paired with a plurality of satellite unit(s) 700, both the remote sensing satellite type 101 units, and remote utility/purpose satellite type 1001 units, in accordance with an embodiment of the present disclosure.

FIG. 3 is a perspective view showing an illustration of an embodiment of the present invention of an improved lighting-danger detection lamp/fixture host 10 apparatus being paired with a plurality (a field) of satellite unit(s) 700, both the remote sensing satellite type 101 units and remote utility/purpose satellite type 1001 units, in accordance with an embodiment of the present disclosure. The lighting-danger detection lamp/fixture 10 is shown communicating with satellite unit(s) 700 via the radio frequency so-called as a local RF communication 138. Further, the lighting-danger detection lamp/fixture host 10 apparatus is additionally communicating with the so-called global RF communications 140, network of lighting-danger detection lamp/fixture host 10 apparatuses. Note that a speaker & vent holes 78, and a VENT area, allow sound, smoke, and gases to enter and exit the enclosure of the lighting-danger detection lamp/fixture host 10.

The two RF communications means aforementioned utilize the same radio frequency resources but have two protocols. The first is considered private and just between the host lighting-danger detection lamp/fixture 10 and any individual paired remote satellite sensor 100 unit and/or remote satellite universal sensor 600 unit as signal ‘inputs’, and, any remote satellite general-utility 1000 and/or any remote satellite specific-purpose 2000, 3000, 4000, or 5000; as signal ‘outputs’. A second communication is global (and considered interacted), between the host lighting-danger detection lamp/fixture 10 and the network; comprising all of the lighting-danger detection lamp/fixture 10 in the system as well as any base-station(s) and/or other like devices (as will be discussed later).

It is important to understand, that there can be any practical number in the field of satellite unit(s) 700 being paired to a single lighting-danger detection lamp/fixture 10 host, for example, one, five, or ten. The pairing provides a greater ‘depth’ of coverage; be it danger or hazard detection, security, monitoring, convenience, or utility. That is, such coverage affords a ‘whole-house’ blanket of coverage; of well-being (danger detection, utility/service of usefulness, and convenience).

It is important to emphasize that a network system can include any number of improved host lighting-danger detection lamp/fixture 10 units. These units may be paired with their own remote satellite sensor 100 units or function as stand-alone lighting-danger detection lamp/fixture 10 units. All units within the network communicate interactively.

When a danger or hazard is detected, such as smoke identified by a remote satellite sensor 100, the alarm is transmitted to the paired lighting-danger detection lamp/fixture 10 unit. That specific unit initiates an audible alert and activates WHITE LED strobing combined with RED LED strobing. Additionally, the unit transmits the alert to the entire network, ensuring all areas are notified-regardless of the location, such as an attic, basement, or garage, whether doors are open or closed.

All other lighting-danger detection lamp/fixture 10 units in the system respond by repeating the alarm using WHITE LED strobing combined with GREEN LED strobing, signifying a nearby danger and providing a safe-way-out. Using the example of smoke or fire detection, the associated color for such hazards is WHITE with RED strobing LEDs. For carbon monoxide (CO), the color would be WHITE with AMBER strobing LEDs, and for gas detection, the color would be WHITE with BLUE strobing LEDs. This configuration ensures clear, immediate, and coordinated alerts throughout the system.

And finally, it should also be noted, that in all areas of the network, where the WHITE with GREEN strobing light is present (indicating the danger is nearby and a safe-way-out), there is a sequence to the strobing light. That is and for example, the danger detection 'color of light' will flash a one-half-second signal of colored light (RED, AMBER, or BLUE) depending on which alert type is detected nearby, every three seconds; to indicate to the occupant which type of danger is being alerted. The remaining three seconds in the sequence is the WHITE with GREEN strobing LED light and will remain so if and until the danger has migrated to any given lighting-danger detection lamp/fixture 10 unit strobing WHITE with GREEN, to then change to the corresponding danger color of light.

In a remote satellite sensor 100 unit, and/or paired a remote satellite universal sensor 600 unit embodiments; that may optionally use other colors employed for signaling alerting in such alternate embodiments. The alternate embodiment does not necessarily need any sensor at all in the host lighting-danger detection lamp/fixture 10, for example, in the case where the remote satellite universal sensor 600 unit is a water sensor (for obvious reasons).

One other option is the ability to make adjustments to user preferences. An example of such adjustments would be to 'TURN-OFF or ON' a feature of operation, or 'ADJUST SETTINGS' certain detection means or sensing means; according to designed-in user preferences. One practical example would be a lighting-danger detection lamp/fixture 10 host with a smoke/fire configuration and/or a remote satellite sensor 100 smoke/fire configured unit installed in a kitchen. The user may want to disable the 'smoke' portion of the detection and just have the 'fire' portion active; to prevent false alarms due to cooking smoke or burning toast. A second example area where it is problematic for false alarms is a bathroom; where 'steam' may trigger an alarm and therefore a user may wish to disable that portion of the smoke/fire detector. In this manner, the fire detection (a heat detecting means) is the alerting mechanism of the remote satellite sensor 100, or its host lighting-danger detection lamp/fixture 10 units. Such turning off/on or adjusting features in either the host or satellite are easily accomplished via the cellphone APP routine process 220 or base-station BS (as will be discussed later in this disclosure) during setup or adjusted at any time to a user's preferences. Likewise, to view the status or monitor a configured component, within the system, can be queried via the same.

A dashed-line box 702 illustrates the many pluralities in a 'field' of a satellite unit(s) 700. Both a remote sensing satellite type 101 (providing INPUT signals), and the remote utility/purpose satellite type 1001 (providing OUTPUT signals) are illustrated in the satellite unit(s) 700 grouping. The illustration in the dashed-line box 702 shows one each of the input types remote satellite sensor 100 unit embodiment, as disclosed in FIGS. 1*a* and 1*b*, and remote satellite universal sensor 600 unit embodiment, as shown in FIGS. 1*c* and 1*d*. Also, in FIG. 1*e* through 1*k*, are examples of output types, remote satellite general-utility 1000 unit embodiment, and the remote satellite specific-purpose 2000, 3000, 4000, and 5000 embodiments. The 'n' meaning in boxes, represents any number (representing a 'field') of satellite unit(s) 700 that can be added to a system network of units; in their respective 'type' categories.

One note on the expression of providing 'INPUT' and 'OUTPUT' signals, is that the input or output reference is with respect to their contribution to the system. That is, 'INPUT' refers to a signal to the host lighting-danger detection lamp/fixture 10 apparatus that an event has happened, and 'OUTPUT' refers to a command given from, the host lighting-danger detection lamp/fixture 10 apparatus to execute a process or function. For example, smoke detected by a remote satellite sensor 100 unit, or water detected by a remote satellite universal sensor 600, are both inputs to the host lighting-danger detection lamp/fixture 10 apparatus of the present invention. The improved host lighting-danger detection lamp/fixture 10 apparatus would then respond accordingly; alarming that there is a fire or alerting of a water leak, in this example, respective to the remote sensing satellite type 101, throughout the entire network.

Further, in the case of the water-detected situation example, the host lighting-danger detection lamp/fixture 10 apparatus could issue an output command to a suitable water pipe isolation valve apparatus (like that disclosed in FIG. 1*g*, the remote satellite specific-purpose 2000 unit turning closed the pipe valve mechanism 2012) and thus stopping water damage. It should be obvious that some remote specific-purpose utility units can also provide info/data, etc., feedback to the host lighting-danger detection lamp/fixture 10 apparatus; for example, a limit switch on the aforementioned water pipe isolation valve apparatus, or, the video camera that is disclosed in FIG. 1*j* can give feedback in still-frame or streaming video. In such a case, the output command still exists. That is, the remote satellite specific-purpose 4000, video camera module 4001 apparatus is commanded to turn ON or OFF, and when ON gives the feedback info (via video) to the host lighting-danger detection lamp/fixture 10 apparatus which can relay it to an appropriate display means (such as a TV or computer screen), or if configured with Wi-Fi, directly to such displays.

FIG. 3 further illustrates the two types of communications, whereby the local RF communication 138 is exclusive to a paired individual lighting-danger detection lamp/fixture 10 host and any of the field of satellite unit(s) 700 apparatuses identified within dashed-line box 702. This exclusive communication is reserved only for its paired satellite units; to receive signals for the input-type remote satellites, and to direct command signals as an output for its paired output-type remote satellites. The exclusive pairing of a satellite to a single host is not a limitation but is considered a benefit to limit network communication chatter. The global RF communications 140 is a network communication between any other lighting-danger detection lamp/fixture 10 host in the system as well as any base-station(s) that are optional to connect to the network.

The preferred communication method for the disclosed invention is Bluetooth, utilized for both local communication 138 (as demonstrated in FIGS. 1*b*, 1*d* [as 638], 1*f* [as 1038], 2, 3, 4*a*, 5, 6*a*, 6*b*, 9*a*, and 9*b*) and global communication 140 (shown in FIGS. 2, 3, 4*a*, 5, 6*a*, 6*b*, 7*a*, 9*a*, and 9*b*). However, alternative RF radio transceiver types or protocol communications may be employed effectively. For instance, Wi-Fi protocols can be used for remote satellite specific-purpose modules like the video camera module 4001 and the doorbell module 5001, enabling these devices to produce both still-frame and streaming video, which can then be transmitted via RF communication to various appropriate display devices.

The key takeaway is that the system represents a distributed network, providing a comprehensive blanket of coverage across the entire home. This encompasses distributed sensing detection (covering dangers, hazards, or other concerns), distributed control, and distributed convenience—all integrated into a single cohesive system. Further elaboration on communication methods and their applications will follow in subsequent sections of the disclosure.

Figure 4A:
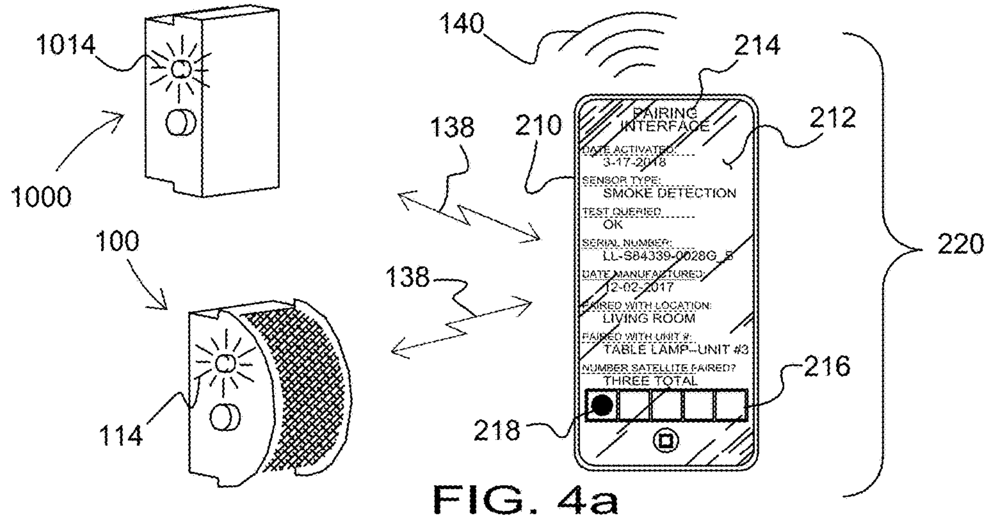
FIG. 4*a* is an illustration to detail the present invention as it functions in a pairing process utilizing a cellphone application (APP) to pair a given host lighting-danger detection lamp/fixture with a remote satellite sensor unit and or remote utility module.

Looking now at FIG. 4*a*, which shows an illustration to detail the remote satellite sensor 100 unit and the remote satellite general-utility 1000 of the present invention is set up and paired. The pairing process here utilizes a cellphone application (APP) that will pair any given host lighting-danger detection lamp/fixture 10 apparatus (as shown previously in FIG. 3) with a selected remote satellite of either the input or output types. A simplified self-pairing process (not using an APP) is disclosed later.

A cellphone 210 is running a menu-driven application 'APP' routine 220. The routine 220, having an application menu 212 with a chosen pairing interface 214 routine, is being displayed via a taskbar selection 216 with a selection key 218. The indicator LED 114 illuminates on the remote satellite sensor 100 unit or remote satellite general-utility 1000, (indicator LED 1014) as earlier disclosed in FIG. 1*e*, indicating the acceptance of a successful pairing process with a selected individual host lighting-danger detection lamp/fixture 10 apparatus. It is important to understand that once these units are paired, they only communicate with each other; no other host lighting-danger detection lamp/fixture 10 apparatus will respond to any remote satellite that is not assigned to it.

Figure 4B:
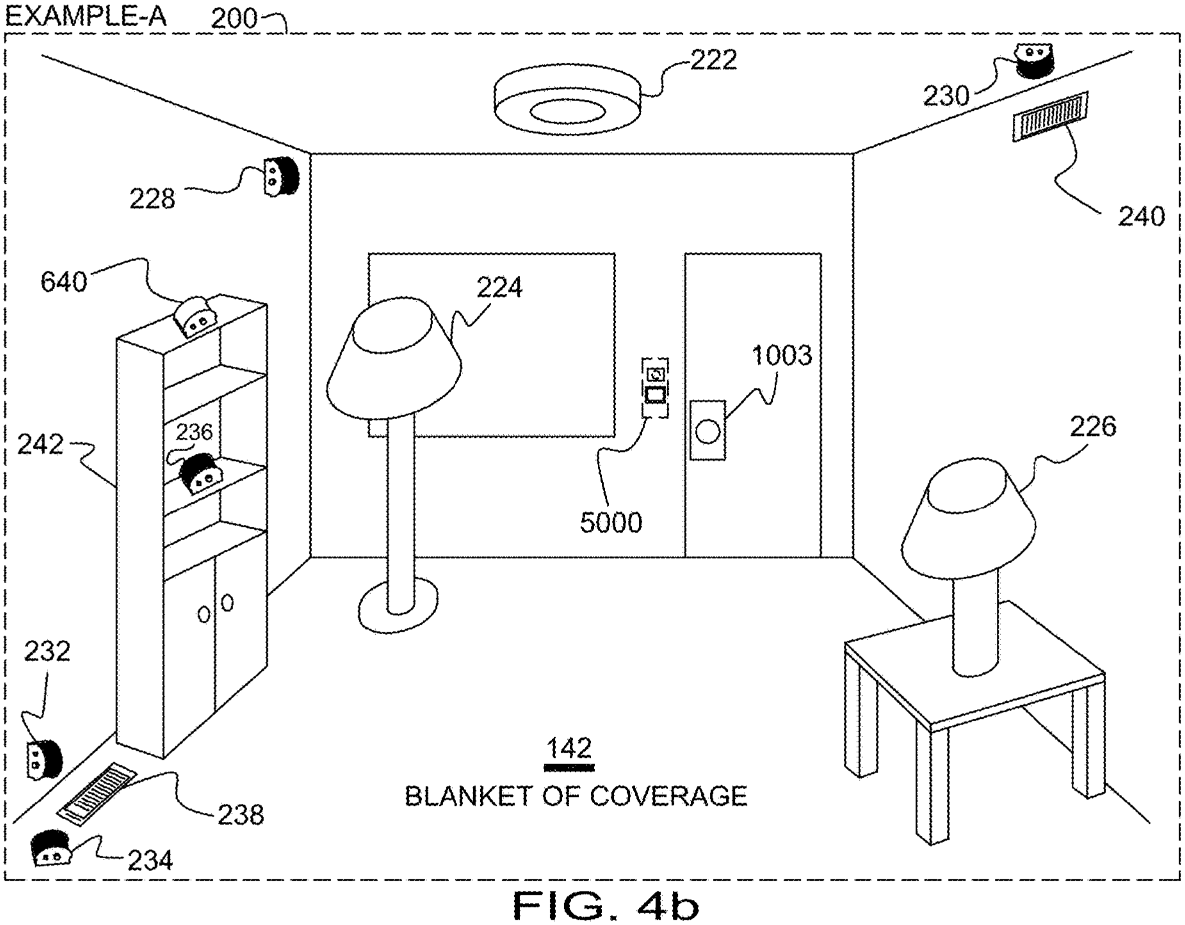
FIG. 4*b* is an illustration of the present invention of FIG. 3 showing an example implementation of several lighting-danger detection lamp/fixtures in a single room and being paired each with their own remote satellite sensor unit(s) and/or remote utility module(s)

Moving on to FIG. 4*b*, which illustrates an implementation arrangement, of the present invention shown in FIG. 3, whereby an installation example 200 is put into effect, using several of the improved host lighting-danger detection lamp/fixtures 10 in a single room location and being paired, each with their own remote satellite sensor 100 unit(s), remote satellite universal sensor 600 unit, or remote satellite general-utility 1000 (comprising a field of satellite unit(s) 700 as was discussed in FIG. 3). The installation example-A 200 shows a ceiling lamp fixture 222, a floor lamp 224, and a table lamp 226; each having a lighting-danger detection lamp/fixture 10 host. Paired with these host lighting-danger detection lamp/fixtures 10 installed in 222, 224, and 226, are a series of remote satellites; a wall-mounted unit 228 (mounted high), a ceiling-mounted unit 230, a wall-mounted unit 232 (mounted low), a floor-mounted unit 234, and a surface-placed unit 236 positioned on a shelf 242.

Included is a remote satellite universal sensor unit, configured as a motion sensor 640 placed on top of the shelf. A remote satellite specific-purpose 5000 unit, configured as a doorbell module 5001, is indicated with dashed lines to represent its position on the other side of the wall. A remote satellite general-utility 1000 unit, configured as a door lock/unlock mechanism 1003, is also part of the setup. The illustration highlights 'room features,' including a floor vent 238 and a wall vent 240, which are integral to the HVAC ventilation system of the building structure.

All of the five 'danger detection' remote satellite sensor units 228, 230, 232, 234, and 236 in this example are paired with the three host lighting-danger detection lamp/fixture 10 apparatuses that are installed in 222, 224, and 226. Further, the motion sensing 640 unit, doorbell module 5001, and door lock/unlock mechanism 1003 are paired with the host lighting-danger detection lamp/fixture 10 apparatuses. The following are scenarios of possible arrangements (comprising a field of satellite unit(s) 700 as was discussed in FIG. 3):

Scenario-1 a) Smoke detection from 226 with 228, 230 & 236, and motion sensing 640.
b) Carbon monoxide detection from 222 with 232, doorbell module 5001, and door lock/unlock mechanism 1003.
c) Refrigerant detection from 224 with 234

Scenario-2 d) Smoke detection from 224 with 228 & 232, motion sensing 640, doorbell module 5001, and door lock/unlock mechanism 1003.
e) Carbon monoxide detection from 226 with 230 & 236
f) Gas detection from 222 with 234

Scenario-3 g) Smoke detection from 226 with 228, 230, 232 & 236, doorbell module 5001, and door lock/unlock mechanism 1003.
h) Carbon monoxide detection from 224 with 234 and motion sensing 640

In each of these example scenarios, a planned arrangement was achieved with the present disclosure. In Scenario-1c, the remote satellite sensor unit 234, being a 'refrigerant' sensor located near, in, or around, the HVAC ventilation system discharge floor vent 238, and, paired with lighting-danger detection lamp fixture in the floor lamp 224 as the host, gave protection from a refrigerant leak being detected, in the evaporator coil in the air conditioning system. That is, the refrigerant-sensing type remote satellite sensor unit 234 affixed near, in, or around surfaces or objects, such as floor or wall ventilation vents, and in this case, is disposed near the discharge floor vent 238 could easily detect refrigerant gas as it passes through and into the living space of the room whenever the ventilation system is ON. Likewise (in scenario 1a), the smoke-sensing type remote satellite sensor unit 230 (and paired with the lighting-danger detection lamp/fixture 10 in the table lamp 226) disposed near the return wall vent 240 could easily detect smoke as it is drawn to and passes through from the living space of the room and into the ventilation system.

What is demonstrated in these scenarios, the arrangement can be in many combinations illustrating the flexibility of installation. In the Scenario-3 case, the ceiling lamp fixture is not even mentioned. It could have a lighting-danger detection lamp/fixture 10 in it or just a conventional lighting bulb. The purpose of illustrating the installation 'example-A' 200 (showing the many possible user pairing arrangements scenarios 'a' through 'h'), is to show there are many exemplary arrangements to give a 'whole-house' blanket of coverage 142 providing protection from danger or hazards and to show that the remote satellite sensor 100 unit can be paired with a single host lighting-danger detection lamp/fixture 10, or the lighting-danger detection lamp/fixture 10 can support multiple remote satellite sensor units of either matching types or not; all in many configurations to suit the need of the user, affording flexibility.

On the utility side of remote satellites, the same lighting-danger detection lamp/fixture 10 hosts can equally facilitate being paired with any variety of featured remote satellites. Here in FIG. 4*b*, there is a motion-sensing remote satellite sitting on a shelf that can notify, via, the lighting-danger detection lamp/fixture 10, the network that there is someone in the room. The doorbell remote satellite would make known that someone is at the door and the remote satellite lock/unlock mechanism can allow someone to enter by unlocking the door via voice command through the lighting-danger detection lamp/fixture 10; all from any location within the network (or external when a base-station BS is present in the network, as will be disclosed later). The result is not only a 'whole-house' blanket of coverage 142 for danger detection and safe-way-out indications but also for utility convenience functionality in the house structure.

Figure 5:
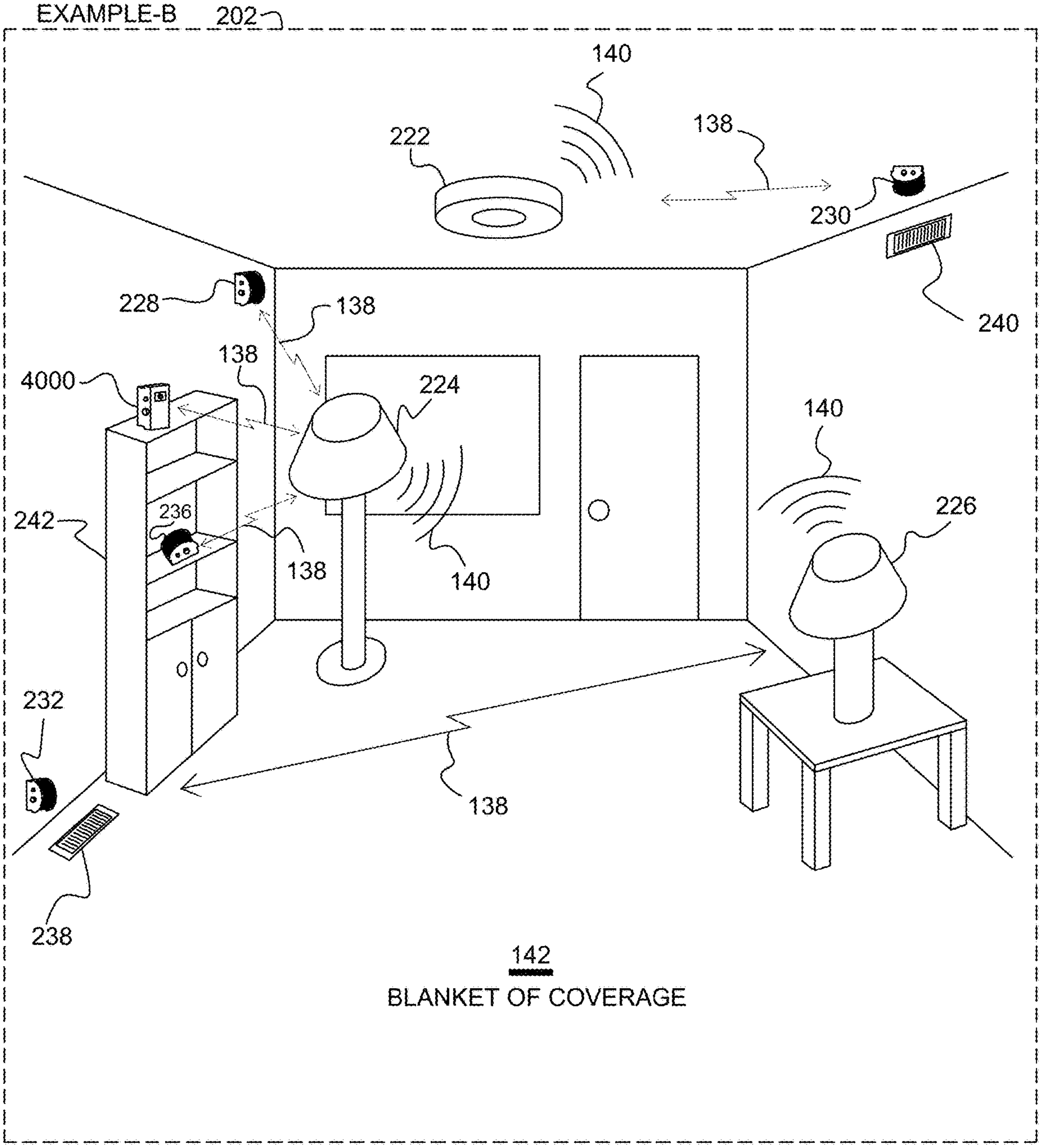
FIG. 5 illustrates the pairing example shown in FIGS. 4*a* & 4*b*, whereby the operations are dependent on each lighting-danger detection host lamp/fixture's communications between their specific remote satellite sensor unit(s), or remote satellite utility module(s), each on their own data channel.

FIG. 5 illustrates the pairing, shown in FIGS. 4*a* & 4*b*, whereby the operations are independent of each of the improved lighting-danger detection host lamp/fixture 10 and communications between their specific remote satellite, each only responding to their own pairing group. The installation 'example-B' 202, details the importance of communications within these groups. Reflected in this scenario the local communication 138 between host apparatuses installed in ceiling lamp fixture 222, floor lamp 224, and table lamp 226 to their respective remote satellite sensor units 230, 228 & 236, 232, and to a (remote satellite specific-purpose 4000) configured to a remote satellite video camera module 4001 (placed on top of shelf 242). These remote satellites only communicate with their paired host and ignore all other communications.

Whereas the global communications 140, as is depicted between all the lighting-danger detection lamp/fixture 10, and any other such lighting-danger detection lamp/fixture 10 in the network of the home (building, etc. to include base-stations BS or other smart home assistant devices like Alexa) that are not shown, share data. The process of these two communication 'types' is to limit chatter in the remote satellite sensor units. These remote satellite sensor units mostly only have battery power and therefore need to limit unnecessary data transmissions (the utility type remote satellites can also have a low-voltage power source not shown). This is accomplished by having a 'header' within a data transmission that is specific to a singular pairing between any given remote satellite sensor 100 unit, remote satellite universal, sensor 600 unit, the remote satellite general-utility 1000 or any of the remote satellite specific-purpose 2000, 3000, 4000, and 5000 units and its host lighting-danger detection lamp/fixture 10 at the time the pairing was created; as was disclosed in FIG. 4*a*, depicting the pairing interface 214.

Therefore all communications, both local communication 138 and global communications 140, in the sphere around any given remote satellite unit are totally ignored, except for such communications with a specific header owned by that specific unit and directed from its host. An example of why a host needs to communicate with a satellite would be to query a 'test' to check the fitness of the sensor or to get the status of the battery in the remote satellite sensor unit. And of course, should a danger be detected by a remote satellite sensor unit, its singular function is to transmit to its host lighting-danger detection lamp/fixture 10, the specific sensed danger/hazard. Whereby the notified host signals the alarm (audible and visual alerting that is described elsewhere in the disclosure) and then further passes the alarm to the global communication 140 network for 'whole-house' blanket of coverage 142, alerting and "save-way-out" indicating. And further to communicate to any base-stations and/or other systems for transfer to cellphone notification of an alerting event (which will be disclosed later).

With respect to the remote satellite video camera module 4000 in this example scenario, it can be activated (turned ON or OFF) via verbal commands from any lighting-danger detection lamp/fixture 10 in the network. Such command is (issued) transmitted through the global communications 140 network, whereby the video camera's host lighting-danger detection lamp/fixture 10 then instructs the (remote satellite specific-purpose 4000) configured remote satellite video camera module 4001 accordingly. In like manner, the streaming video captured is passed on to the network where a base-station, or computer, TV, etc., is set up to receive such video and display. Be mindful that such video can optionally be transmitted via the network Wi-Fi if available (as shown in FIG. 3 and elsewhere). A use for observing a video in this example scenario may be to watch an infant or an elder parent.

Figure 6A:
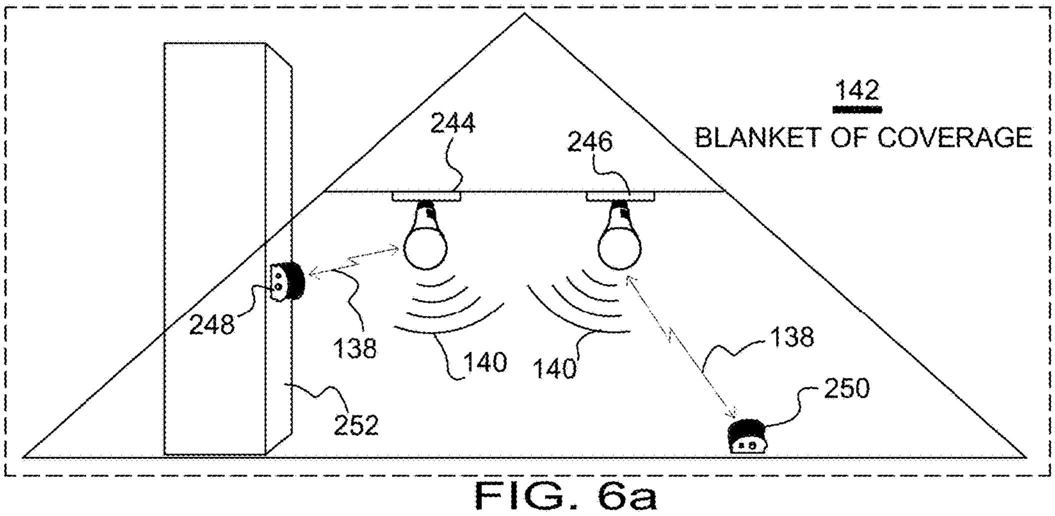
FIG. 6*a* further illustrates placement arrangements, where danger detection devices are often overlooked, the attic.

FIG. 6*a* is an illustration of placement and arrangement, where danger detection devices are often overlooked; the attic. In this scenario arrangement, is shown ceiling fixtures 244 and 246. They are paired with a wall-mounted unit 248 and floor-mounted unit 250 respectively. The communications are the same as was discussed in FIG. 5 above. The danger detection example here could be the remote satellite sensor 100 unit of the wall-mounted unit 248 and disposed on the house chimney 252 is a carbon monoxide 'type' sensing. Chimneys could leak gases (CO) and such in an attic adds to hazards in a home; especially in older homes with the chimney mortar is loose. The other remote satellite sensor unit, floor-mounted unit 250, could be a smoke 'type' sensing, and complement the danger protection of the home attic.

Figure 6B:
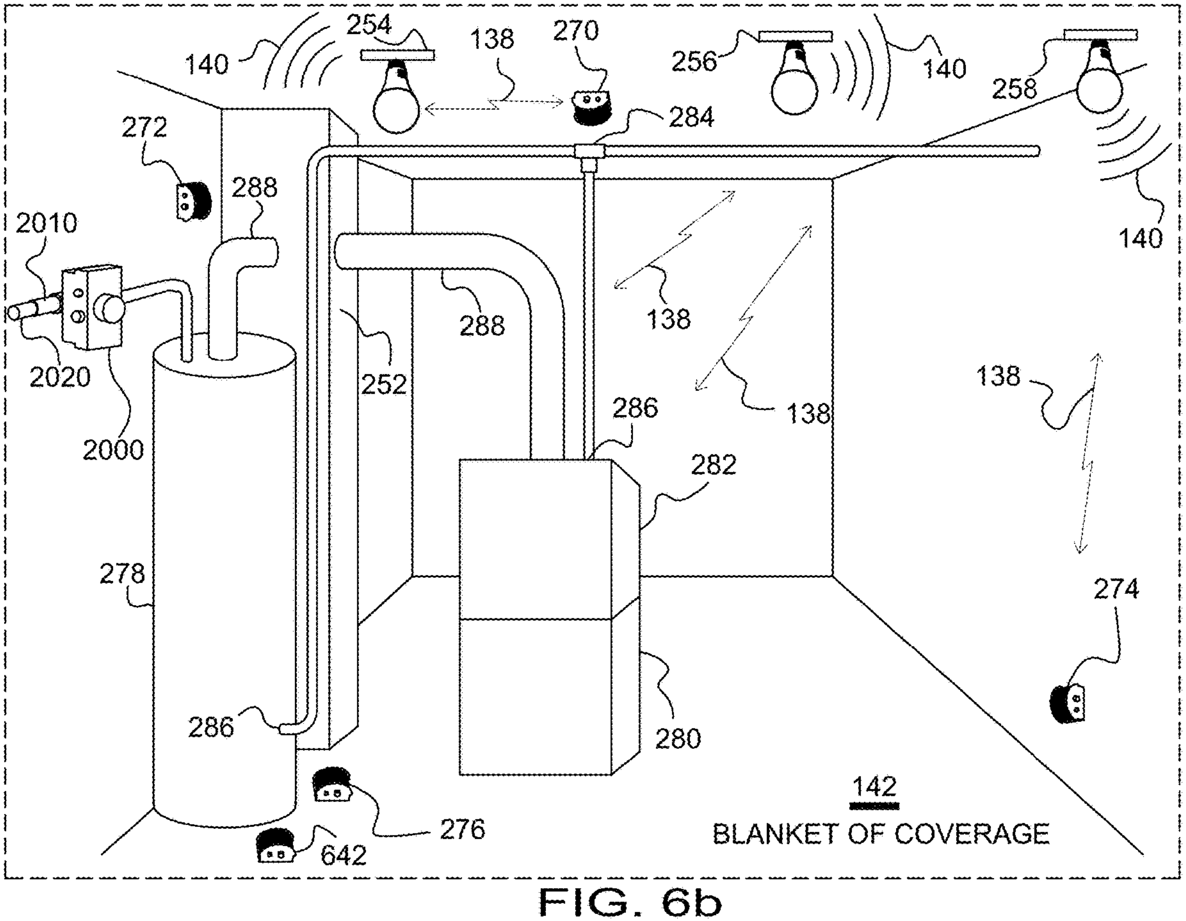
FIG. 6*b* is another illustration sketch arrangement, where the example placement of lighting-danger detection host lamp/fixtures examples along with their paired remote satellite sensor unit(s), and remote satellite utility module(s) is in a basement.

FIG. 6*b* is another illustration sketch arrangement, where the example placement of the improved host lighting-danger detection lamp/fixtures 10, are examples along with their paired remote satellite sensor 100 unit, remote satellite universal sensor (configured as a water sensor) along with a remote satellite specific-purpose 2000 unit, are in a basement of a home. The ceiling fixtures 254, 256, and 258, all having host lighting-danger detection lamp/fixture 10 apparatuses installed, are paired with remote satellite sensor 100 units; as ceiling-mounted unit 270, wall-mounted unit 272, wall-mounted unit 274, floor-mounted unit 276, and floor-mounted remote satellite universal sensor, configured as a water sensing 642 unit; representing the many conceivable remote satellite unit(s) 700 types as indicated in FIG. 3.

In this example arrangement, the pairing of the 254 with 270 could be of the carbon monoxide sensing 'type' detectors. Here these CO sensing devices cover the home HVAC furnace-section 280 unit as well as the gas-fueled water tank 278 and all of the associated appliance exhaust piping 288 to the chimney and the home chimney 252 itself.

The ceiling fixtures 256 with 272 and 276 could be of the natural gas 'type' sensing detectors all placed ideally; above, around, and below, where a natural gas leak could be sensed if it occurred, either from gas pipe fittings 284 or from the appliance gas connection 286; that such leaking of dangerous natural gas can be easily detected.

Further, the ceiling fixtures 258 with 274 could be 'type' smoke sensing detectors, covering the space both high and low. This is an ideal arrangement of hazard and danger-detecting devices but certainly other arrangements and pairing could be achieved. For example, a water-sensing remote satellite universal sensor 642 unit paired with lighting-danger detection sensor lamp/fixture 10 host in ceiling fixture 256, and the remote satellite specific-purpose 2000 unit. In this scenario, the water sensing 642 unit could signal to its paired host if the water tank 278 should develop a leak. The improved lighting-danger detection sensor lamp/fixture 10 host would then command (issue) the remote satellite specific-purpose 2000 unit to turn its connected water pipe valve mechanism 2010 to a CLOSED position; saving untold water damage to a finished basement. Water tanks do fail when they age, and in a finished basement particularly could cause significant damage. The motorized water valve isolates the supply side connection 2020 line to the water tank. Importantly, to have a 'whole-house' blanket of coverage 142 protection; a basement, and an attic cannot be ignored.

Figure 7A:
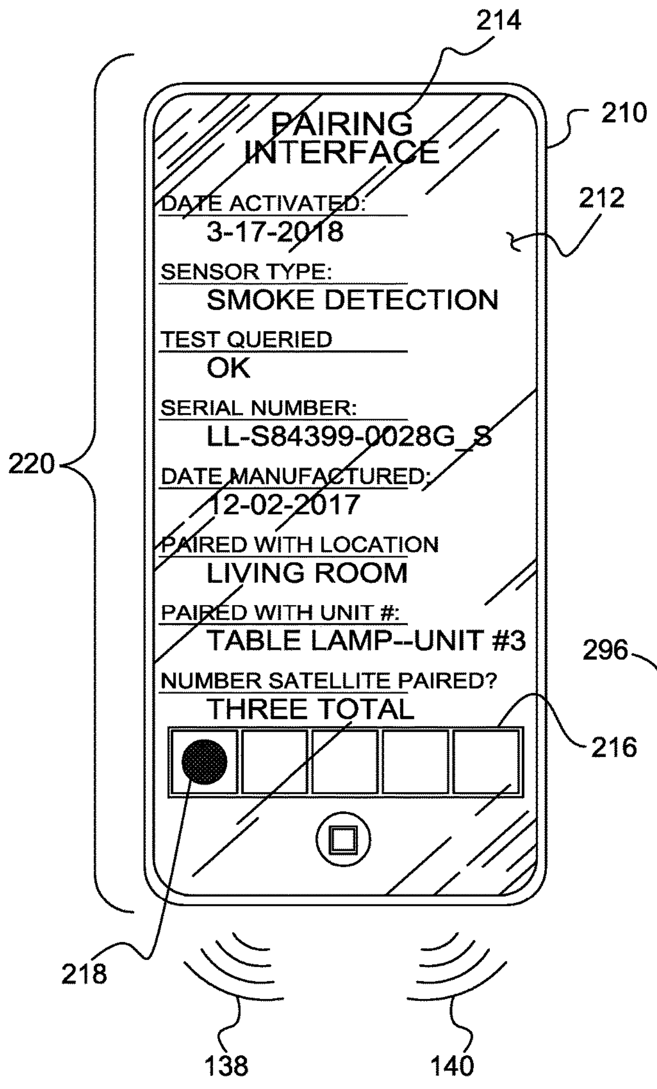
FIG. 7*a* is a depiction of an example menu of a cellphone running an application showing the PAIRING INTERFACE selections of the present invention that is referenced in FIG. 4, in accordance with an embodiment of the present disclosure.

FIG. 7*a* is a depiction of an example menu of a cellphone running an application showing the PAIRING INTERFACE 214 selections of the present invention that is referenced in FIG. 4*a*; refers to reference application process 220 routines (see FIG. 4*a* to see the description made in the FIG. 7*a* disclosure). Pairing is integral to an improved lighting-danger detection lamp fixture 10 host and any satellite unit(s) 700 assigned to it, as well as any configuration and options settings that may be to any given unit depending on its particular function; to include the examples detailed in FIGS. 7*b*, 8*a*, 8*b*, 8*c*, & 8*d* that will follow.

Figure 7B:
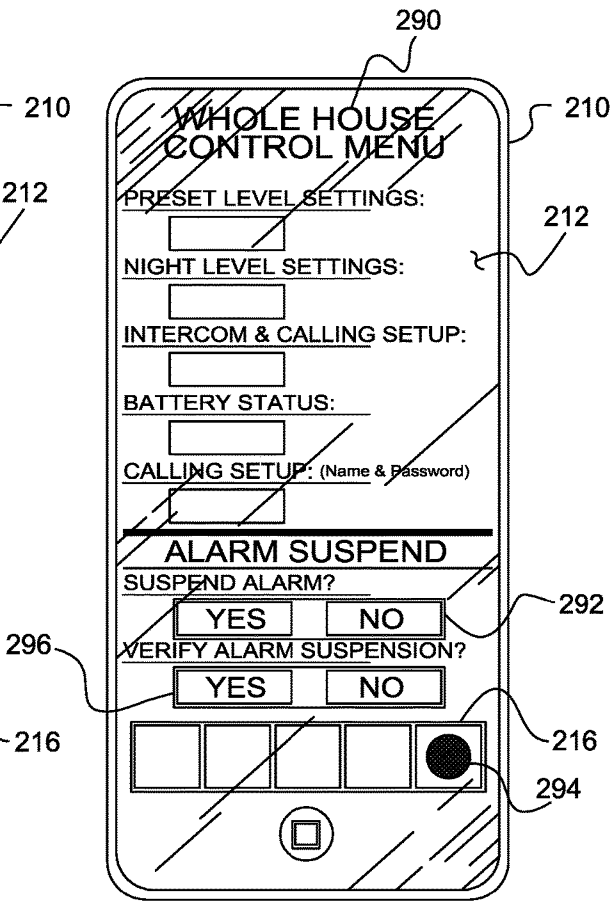
FIG. 7*b* is a depiction of an example menu of a cellphone running an application showing the WHOLE HOUSE CONTROL MENU selections, in accordance with an embodiment of the present disclosure.

FIG. 7*b* is a depiction of an example menu for the cellphone 210, running an application menu 212 showing the WHOLE HOUSE CONTROL MENU 290 routine selections of the present invention. The taskbar 216 selects the whole house control menu 290 by pressing the selection key 294. In this routine ALARM SUSPEND control can be accessed via SUSPEND ALARM YES/NO 292 keys, and is verified via VERIFY ALARM SUSPENSION? YES/NO 296. These routines are used in the case of a false alarm such as from burning toast accidentally. The alarm will stop the audible sounding throughout the whole network during the suspension period; after which if the smoke has not 'cleared' the sensing detector (either the lighting-danger detection lamp fixture 10 or one of its supporting remote satellite sensor 100 units) the alarm will reinstate. The suspend time for an alarm, in the preferred embodiment is one to two minutes as a default, but this time can be user-personalized within the setup routine, any longer or shorter times.

The whole-house control menu 290 routines do other functions, for example:

PRESET SETTINGS
NIGHT LEVEL SETTINGS
LIGHT COLOR TEMPERATURE SETUP
INTERCOM SETUP.
CALLING SETUP.
BATTERY STATUS

These are examples of routines that the cellphone application can perform in the application's whole-house control menu 290. There is no limitation to viewing and fine-tuning any given setup of other fields of control.

Figure 8A:
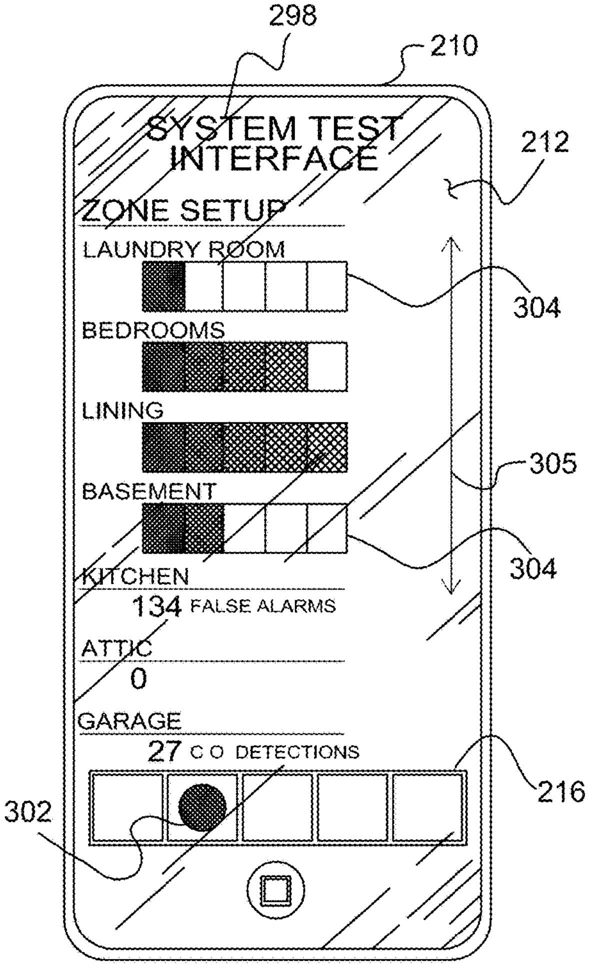
FIG. 8*a* is a depiction of an example menu of a cellphone running an application showing the SYSTEM TEST INTERFACE selections, in accordance with an embodiment of the present disclosure.

FIG. 8*a* is a depiction of another example menu of a cellphone running an application, the SYSTEM TEST INTERFACE selections of the present invention. A selection key 302, on the taskbar 216 of the cellphone 210 running a SYSTEM TEST INTERFACE 298 routine. In this application menu 212, there are depicted several zone functions 304 routines. A scroll control 305 allows other system locations to be brought into view on this screen. This illustration is listed:

LAUNDRY ROOM
BEDROOMS
LIVING ROOM.
KITCHEN
ATTIC
GARAGE

Here whole-house parameters can be viewed and modified if desired. The application menu 212 in this case shows the 'level' of usage in each zone is in effect via zone functions 304. The 'metering' shows that the living room is using the greatest amount of lighting energy, whereas the laundry room is showing the least amount and the attic is using no energy in the example. Also, the kitchen is showing 134 FALSE ALARMS and the garage is indicating 27 CO DETECTIONS.

All of the selections shown on the application menu 212 are examples that reflect just a few features of the system test interface 298. The screen can be 'scrolled' via scroll control 305 to show other features, for example, whole-house testing or zone-by-zone testing and status that allows a user to go from room-to-room performing a test of the improved lighting-danger detection lamp/fixtures 10 and the supporting remote satellite sensor 100 units. Importantly, this testing allows for full house testing information status without having to physically push a button on each unit; as is the case in prior art. Further, the location selections, are more zones than are displayed and can be viewed by scrolling; for example, family room, basement, front porch, driveway, perimeter, etc.

Figure 8B:
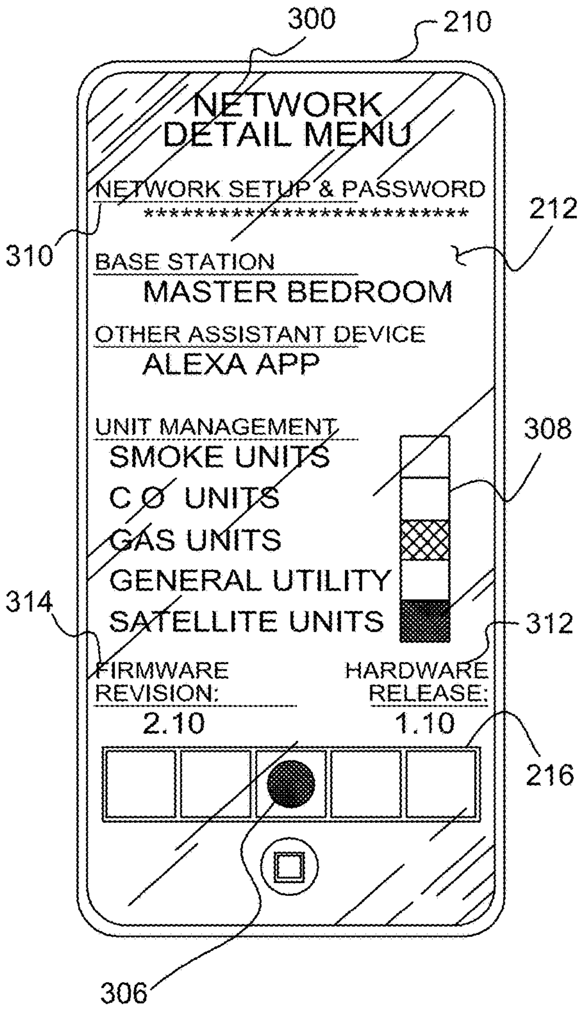
FIG. 8*b* is a depiction of an example menu of a cellphone running an application showing the NETWORK DETAIL MENU selections, in accordance with an embodiment of the present disclosure.

FIG. 8*b* is a depiction of an example menu where the cellphone 210 is running an application showing the NETWORK DETAIL MENU 300 after a selection key 306 is pressed, of the present invention. Here the whole-house network is detailed, starting from a network setup and password 310 to a hardware release 312 version, and a firmware revision 314 are all displayed. A unit management overview 308 displays specific 'types' of lighting-danger detection lamp/fixture 10 apparatuses and remote satellite sensor 100 units in the network, as they relate to network particulars; a means to reassign or make rank more or less prominent for example.

Figure 8C:
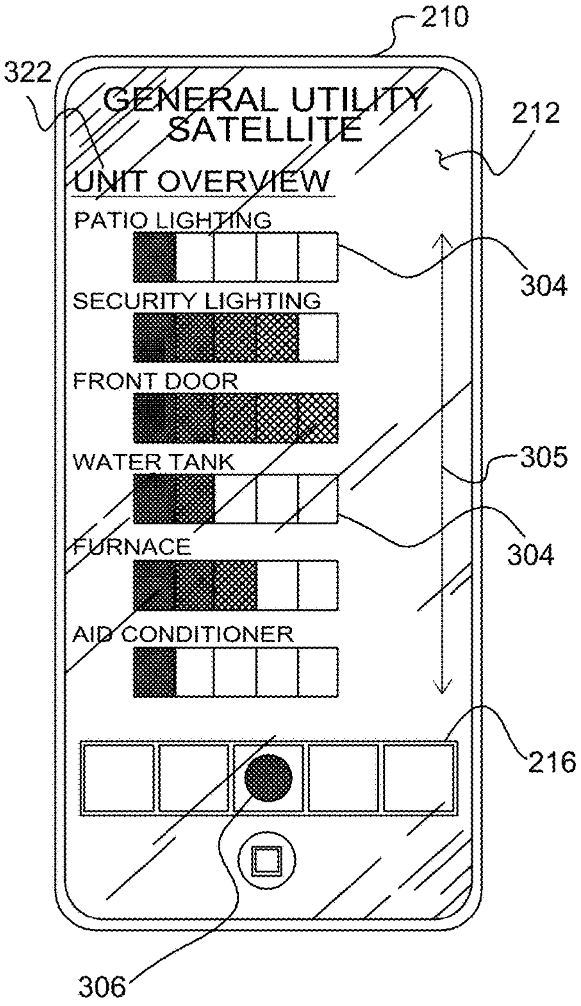
FIG. 8*c* is another depiction of an example menu of a cellphone running an application showing the GENERAL UTILITY SATELLITE selections, in accordance with an embodiment of the present disclosure.
Figure 8D:
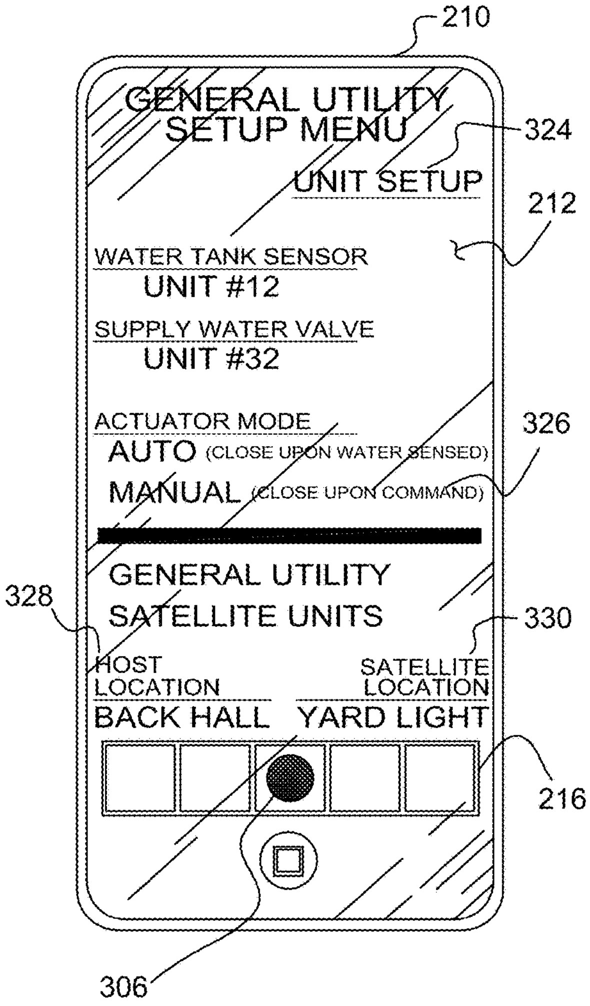
FIG. 8*d* is a further depiction of an example menu of a cellphone running an application showing the GENERAL UTILITY SETUP MENU selections, in accordance with an embodiment of the present disclosure.

In FIG. 8*c* and FIG. 8*d* are specifically the general utility screens on the application (APP) showing details in which of the remote satellites provide INPUT signals and commanding OUTPUT signals as was disclosed in FIG. 3 earlier. The unit overview menu 322 shows a scrolling control 305 displayed and the current general utility satellite activity. In FIG. 8*d*, the unit setup menu 324 shows details of the general utility satellite's installation within the network; unit number, host pairing, location 328, satellite location 330, operational features 326, etc.

Also, the pairing of non-compatible devices, as will be described later, to accommodate a user's existing so-called smart home devices, may utilize selectable applications that are downloaded via the cellphone 210 and uploaded to the subject improved lighting-danger detection lamp/fixture 10 unit, to communicate with such non-compatible user devices. The process will facilitate adaptive 'interoperability' communications and make these non-compatible devices compatible; for both input to the system or to give a signal to output to perform a function.

The application menus 212, as depicted in FIGS. 7*a*, 7*b*, 8*a*, 8*b*, 8*c*, and 8*d*, serve as examples of what can be displayed and their functionality within a cellphone or computer application program. These menus are not confined to the features shown but represent a broad range of potential options and capabilities. They relate to the system and network of whole-house lighting-danger detection lamp/fixture 10 apparatuses acting as hosts. These hosts support a variety of configurations for satellite unit(s) 700, including remote satellite sensor 100 units, remote satellite universal sensor 600 units, remote satellite general-utility 1000 units, or remote satellite specific-purpose units such as 2000, 3000, 4000, and 5000. This encompasses remote sensing satellite type 101 and/or remote utility/purpose satellite type 1001.

Additionally, the optional cellphone 210 and the operating application menu 212 collaborate with the base-station BS (or other smart devices such as tablet computers). Further details on their integration and operation within the system are provided in FIG. 9.

Figure 9A:
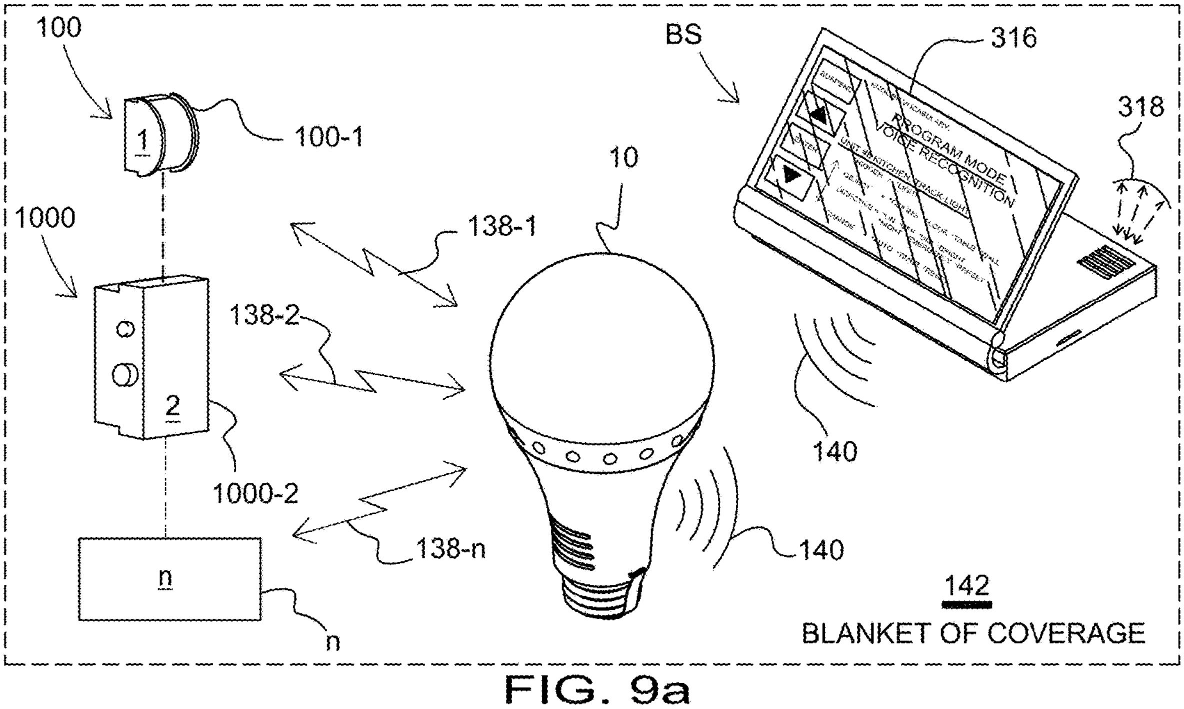
FIG. 9*a* is an additional illustration showing the inclusion of a base-station interacting with a lighting-danger detection lamp/fixture host, the lighting-danger detection host lamp further communicates with its paired remote satellite sensor unit(s) and/or remote satellite utility module(s), in accordance with an embodiment of the present disclosure.

FIG. 9*a* is an illustration showing the inclusion of a base-station BS interacting with an improved lighting-danger detection lamp/fixture 10 host, the lighting-danger detection lamp/fixture host further communicates, via local RF communication 138, with its paired remote satellite sensor 100 unit #1 (could also be any of the remote satellite universal sensor 600 units not shown) for INPUT signals to process, and, with a remote satellite general-utility 1000 unit #2 (could also be any of the remote satellite specific-purpose 2000, 3000, 4000, or 5000 units) to OUTPUT signals to execute a function. The remote satellite unit #n represents that there can be any number of the many conceivable other remote satellite unit(s) 700 (as described in FIG. 3), either INPUT or OUTPUT types, that can be paired that are practically accommodated.

The lighting-danger detection lamp/fixture 10 host communicates to a base station BS via wireless global RF communications 140. Note with the local communication 138, there is a 138-1, a 138-2, and a 138-*n* signifying these are 'private channels' (meaning that communications is exclusive to its paired host), whereas the global communications 140 is open to all improved lighting-danger detection lamp/fixture 10 units and base-stations BS in the network system of devices. For communications from the base-station BS or cellphone 210, as is disclosed in FIGS. 4*a*, 7*a* & 7*b*, 8*a*, 8*b*, 8*c* & 8*d*, to query a remote satellite sensor unit, such communications would need to pass through a paired host apparatus lighting-danger detection lamp/fixture 10 host first. It is explicitly understood that the base-station BS, can be any computing device; including but not limited to, a 'mobile device' cellphone, a computer, a tablet, all running an application routine, or a dedicated, specifically designed discrete unit with a display.

Although all the devices depicted in FIG. 9*a* use the same type RF wireless electronics, they act differently to reserve power consumption for the devices that are on battery power only; specifically the remote satellite sensor 100 units and the remote satellite universal sensor 600 units. Because wireless RF communication can be 'power hogs', the chatter to respond to queries must be limited. This is the reason why exclusive pairing to a specific host is imperative. One way to limit unnecessary chatter (the busy work of turning ON and OFF communications) is, for example, to have a 'HEADER' acting as a mediator of traffic. In one communications example, only a specific 1-satellite 100-1 would respond when a 'HEADER', in the RF exclusive 1-code 138-1 was present. Such exclusive code pairing would be accomplished by a routine during the setup between the host and satellite at the time of pairing. All other communications (that may be in the RF range of any given satellite unit) are completely ignored.

A second example means to limit unnecessary communications chatter, would be to use the 'unit serial number as the' RF communications 'HEADER' that gets the attention of the remote satellite unit. Or to use a second channel, such as one of a stereo setup arrangement, where the global communications is one channel and the local communications is the other. There could be other means, methods, and techniques that are as well suitable to limit communication chatter and the ones here described are exemplary and do not limit the teachings of the present disclosure in any way. Of course, one such other communication technique could simply be a 'single direction' transmission from the remote satellite to the host; thereby eliminating all unnecessary chatter altogether for the satellite unit. In such a configuration, status info (battery life, self-testing, etc.) could be regularly transmitted to the host and stored for any network inquiry that may occur.

The base-station BS has a display screen 316 which looks and functions almost like the menu screen on the cellphone application menu 212, except here there are real-time displays of whole-house monitoring status. Examples of these displays in general are:

ALL SYSTEMS OK
SMOKE-FIRE DETECTED (LAUNDRY ROOM—UNIT #12).
CO DETECTED (GARAGE—UNIT #17)
NATURAL GAS DETECTED (BASEMENT WATER TANK—UNIT #8)
REFRIGERANT LEAK DETECTED (LIVING FLOOR VENT—UNIT #3)
WATER LEAK DETECTED (BASEMENT WATER TANK—UNIT #10)
WATER SUPPLY LINE SHUT-OFF VALVE (WATER LINE—UNIT #33).
WATER VALVE OPEN (GARDEN HOSE—UNIT #18)
CAMERA MONITORING (DAD'S ROOM—UNIT #21).
CAMERA MONITORING (LOWER ENTRANCE HALL—UNIT #22).
CAMERA MONITORING (BACK DOOR—UNIT #23)
CAMERA MONITORING (GARAGE DRIVEWAY—UNIT #24)
CAMERA MONITORING (PERIMETER FENCE—UNIT #25)

An audio 318 speech recognition and voice feature afford a two-way human interface between the system and the user, as events and managing are needed. These and other improved lighting-danger detection lamp fixtures 10 and any of the many conceivable field of satellite unit(s) 700 (that are disclosed in FIG. 3), e.g., remote satellite sensor 100 unit #1 (could also be any of the remote satellite universal sensor 600 units not shown) for INPUT signals to process, and, with a remote satellite general-utility 1000 unit #2 (could also be any of the remote satellite specific-purpose 2000, 3000, 4000, or 5000 units) to OUTPUT signals to execute a function, can be configured to arrange a full, 'whole-house' blanket of coverage 142 (as referenced in FIGS. 4*b* 5, 6*a* & 6*b*, and 9*a* and 9*b*) providing security, danger protection, hazard warning, and utility operations, convenience functionality. The names of these units are assigned during the pairing process and are generic selections or custom-named by the user.

It is important to clarify that the base-station referenced in this disclosure can be a conventional personal computer or tablet, functioning to handle monitoring, networking, and system displays. It operates using an application (APP) similar to the one designed for the previously described mobile cellphone 210. Alternatively, a conventional desktop computer can serve the same purpose. However, the preferred choice is a dedicated base-station BS, tailored specifically for 24/7 whole-house monitoring.

For optimal utility, a base-station BS is ideally positioned in key locations such as the master bedroom and a central activity hub like the kitchen counter. This setup not only enhances convenience but also plays a critical role in rapidly alerting users to dangers or hazards, enabling swift responses to life-threatening alarms. The system also offers detailed information to determine the safest evacuation route during emergencies.

Notably, a base-station BS located in the master bedroom features a selectable NIGHT MODE, allowing the display to remain OFF during nighttime hours while maintaining uninterrupted monitoring. In the event of an alarm or emergency, the display automatically activates, providing precise details about the incident. Further examples and functionality of such displays will be discussed in FIG. 11.

FIG. 9*a* shows how an individual improved lighting-danger detection lamp/fixture 10 host apparatus can stand alone with no supporting remote satellite sensor 100 unit, a single supporting remote satellite sensor 100 unit, or a plurality of supporting remote satellite sensor 100 unit can be all of a single 'type' sensing, for example, a smoke detection sensor capability. Or each supporting remote satellite sensor 100 unit can be of a different 'type' of sensing (the host can support any of the 'alarm-types' associated with any conceivable remote sensing satellite type 101), via colored LEDs to the given hazard or sensing purpose.

Still further, and would be more practically depicted in this general utility purpose category, for the INPUT type of the supporting remote satellite universal sensor 600 units (not shown in FIGS. 9*a* and 9*b* but are alluded to as the 'n' block), could be of any 'type' of sensing element; such as water/moisture, pressure, temperature, camera, motion, flow, sound, speech, etc. Or, in the case of an OUTPUT type function (as described as any of the remote satellite general-utility 1000 type units), having the ability to activate, control, or perform a function; as described as the remote satellite specific-purpose 2000, 3000, 4000, and 5000 units. Importantly, there is only one sensor (or general function) in the preferred embodiment, in each remote satellite sensor unit to keep the unit physically as small as possible. This is for practical reasons and intentional; being the device is battery powered (for most units), and, the intent is to keep the purchase price as low as possible so a user could employ more satellites to achieve the 'whole-house' blanket of coverage 142 protection (versus the conventional danger protection of prior art of just one sensor means per floor, generally in a hallway, in a structure).

Another example of such an application using these general utilities, the ability to activate, control, or perform a function, with physical connections would be having a supporting remote satellite specific-purpose 2000 unit with an actuation electrically operated water valve (pipe valve mechanism 2010) OPEN or CLOSED, as its operating feature. Such a device could be fitted to the house's outside water faucet spout, a garden hose, and a sprinkler disposed thereon. When paired to a lighting-danger detection lamp/fixture 10 host, upon command (given to any lighting-danger detection lamp/fixture 10 in the network) through the host device, controlling the water valve would open and the lawn sprinkler would disperse water. The possibilities could be automatically timed via the base-station BS, and/or the cellphone 210. These special remote satellite specific-purpose 2000, (or any of the other specific purpose 3000, 4000, and 5000, or the remote satellite general-utility 1000 units) would have a more robust battery and physical structure to support its form and function. Alternatively, such heavy power consumption special remote satellite units could have optionally, a wall plug-in to commercial 120 VAC, via a power transformer to low voltage and a six-foot cord (for example) to recharge or provide continuous power to the apparatus. A use for such an alternatively powered satellite unit would be a water tank supply-line shut-off valve, having a higher need for operation power, as was disclosed in FIGS. 1*g* and 6*b*.

Another example of such an application using these general utility physical connections and the ability to activate, control, or perform a function, would be having a supporting remote satellite specific-purpose 4000 unit with a camera as its operational feature, as is disclosed in FIG. 1*j*. Such an arrangement would afford the camera to turn ON/OFF as desired, perhaps to watch a pet, an infant, or an invalid/crippled loved one. Understand the importance of such a feature. Anyone, simply by replacing a conventional light bulb, such as in a table lamp with an Edison-style screw-base, with an improved lighting-danger detection lamp/fixture 10 host of the present invention, and, then place the remote satellite specific-purpose 4000 unit (configured as a video camera with the general structure, video camera module 4002), as its operation feature, would give significant ability and freedom to a caregiver.

One very important application would be for a loved one with Alzheimer's disease. Such individuals do not have the capability to depress a button on the " . . . I've fallen and can't get up" devices-they are nearly useless in these types of scenarios. The caregiver can, via a cellphone 210 with an application menu 212, communicate to a lighting-danger detection lamp/fixture 10 unit and activate the remote satellite specific-purpose 4000 unit (with camera) and in real-time see, hear, and talk to their loved one. The 'hear and talk' feature could be inclusive to the camera assembly, or via the host lighting-danger detection lamp/fixture apparatus.

Figure 9B:
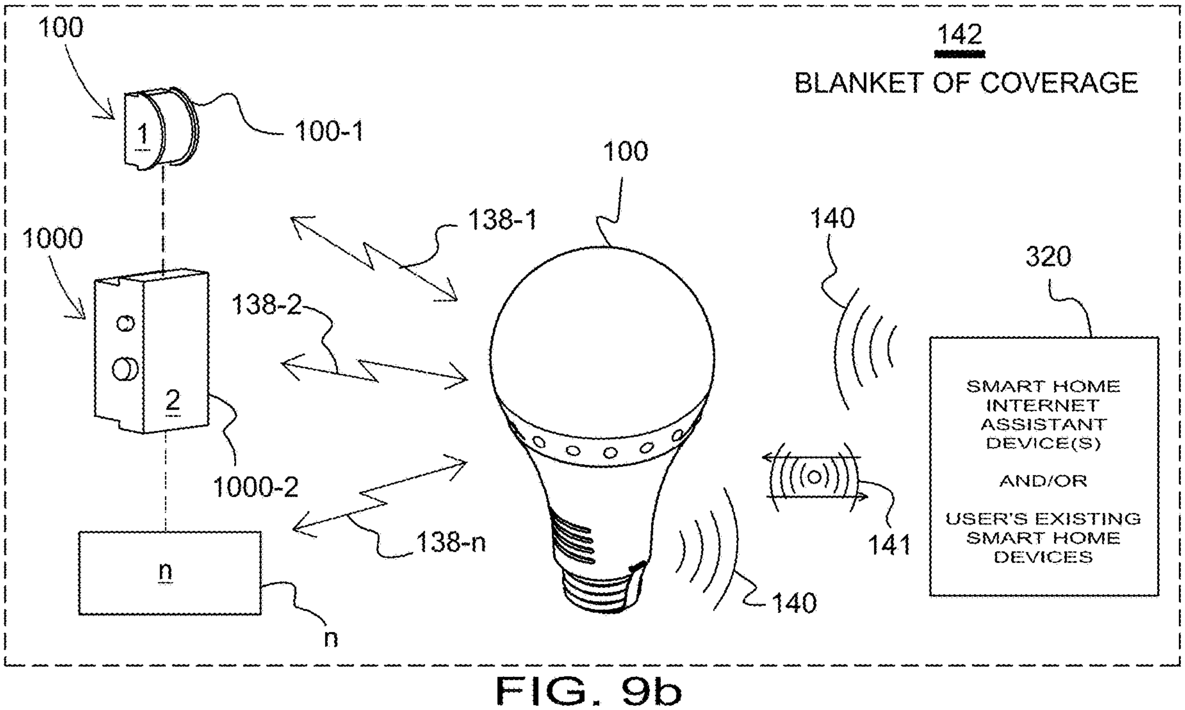
FIG. 9*b* is another illustration showing the inclusion of other smart home/internet/assistant devices and/or user-existing devices interacting with a lighting-danger detection host lamp/fixture, the lighting-danger detection host lamp further communicates with its paired remote satellite sensor unit(s), and/or remote satellite utility module(s), in accordance with an embodiment of the present disclosure.

The caregiver in this scenario has a significant advantage to monitor remotely; giving in real-time, help and instruction in the care of a loved one. It is important to understand the camera ON/OFF command function is through an improved host lighting-danger detection lamp/fixture 10 host, that is paired with the remote satellite specific-purpose 4000 unit (disclosed in FIG. 1*j*). The video camera can produce both 'still-frame' or 'streaming video', that uses its RF communications as is appropriate. The system can optionally select intervals between still-frames and also choose network Wi-Fi; particularly good for a high-resolution streaming format to any supporting display (cellphone, tablet, computer, or TV) for viewing. If the network further has a base-station BS, such viewing can be displayed as well, and to include requests from out-of-network sites, FIG. 9*b* shows the inclusion of other smart home/internet/assistant devices and/or other user's existing smart home devices, interacting with an improved lighting-danger detection lamp/fixture 10, and the lighting-danger detection host lamp further communicates with its paired remote satellite sensor unit(s) and existing 'smart home' devices 320. The existing 'smart home' devices 320 can be any of the smart-home Internet assistant devices or other user's existing smart home devices currently on the market; such as Amazon Alexa, the Google Home Assistant, and the Apple Home-Pod/Siri, to name a few, or, Ring, Blink, Wyze, Philips Hue, Ecobee, etc. The global RF communication 140 is used if compatible, or if non-compatible, an adaptive 'interoperability' communications 141 can be selectively paired during the setup routine as described in earlier sections of this disclosure via cellphone 210 (see FIGS. 4*a*, 7*a* & 7*b*, 8*a* through 8*d*). Of course, some or all these existing 'smart home' devices 320 may need to have an upload application (APP) to the lighting-danger detection lamp/fixture 10 (making the adaptive 'interoperability' communications) compatible and suitable to run such devices.

Global RF communications 140 and/or the adaptive 'interoperability' communications 141 would then be similar to that disclosed in FIG. 9*a*; to the extent that it can give meaningful interactions if the chosen device does not have a display. Nonetheless, these devices certainly can inform when danger and hazards are detected, by any of a network of lighting-danger detection lamp/fixture 10 host and their remote satellite sensor 100 units or remote satellite universal sensor 600 units give signal. Or to give a command to operate any of the remote satellite general-utility 1000 units, remote satellite specific-purpose 2000, 3000, 4000, or 5000 as the case may be. Further, one goal of the adaptive 'interoperability' communications 141, is to not obsolete any of a user's smart home devices when adding the present invention to the mix of smart home devices in any given network of such devices.

Again, as was disclosed in FIG. 9*a*, commands are executed via the improved lighting-danger detection lamp/fixture 10 host to any of the above-listed OUTPUT 'types' of satellites. Where there is video produced, as in the case of a remote satellite specific-purpose 4000 (configured as a general structure, video camera module 4002), or a remote satellite specific-purpose 5000 (configured as a doorbell unit general structure, doorbell module 5002), the video itself can optionally be selected via the network Wi-Fi; using the appropriate protocol(s). From there, the video is available to a number of display means; including cellphone, tablet, computer, TV, or out-of-network through a base-station BS with access permission for example. The optional selections for still-frame or streaming-video and the use of a network Wi-Fi were disclosed earlier in FIGS. 3 and 9*a*.

Figure 10A:
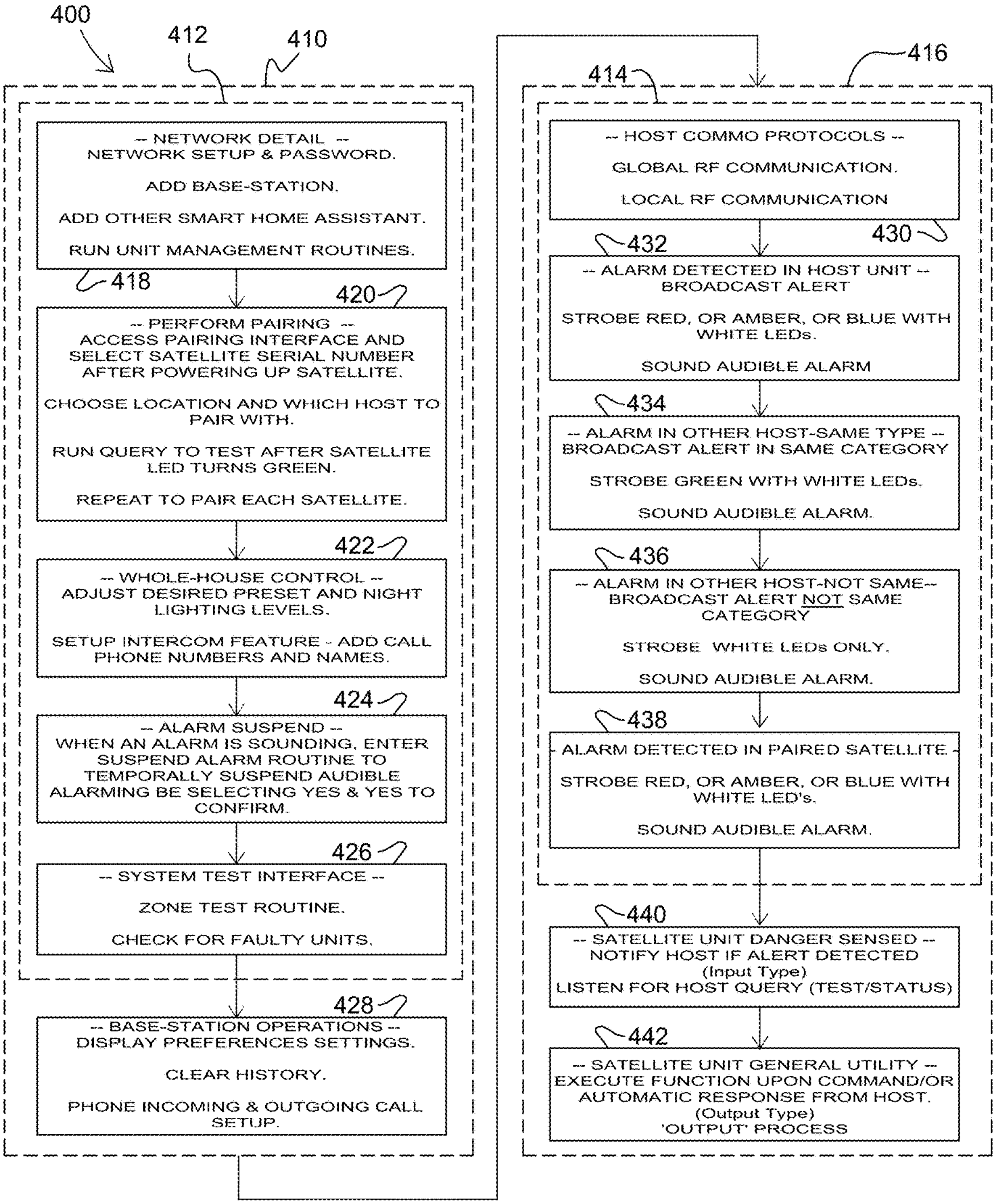
FIG. 10*a* is a block diagram, illustrating the various routines of operation, demonstrating procedures and processes to effect the danger detection, general utility functions, and communications between the various entities comprising the present invention; concerning cellphone pairing, data transfer, and interactions of the network, in accordance with an embodiment of the present disclosure.

FIG. 10*a* is a block diagram illustrating examples of various program routines 400 of operation, demonstrating procedures and processes to effect the danger detection and communications between the entities comprising the present invention; interactions of the network, cellphone pairing, data transfer, detection alerting, and general utility, to have the ability to activate, control or perform a function operations. A base-station+cellphone procedure grouping 410 routines shows a series of routines that set and operate the system interactions. There is also a cellphone procedure grouping 412 routines. Note that the base-station (BS) (as shown in FIG. 9*a*) and the cellphone groupings (410 & 412 routines) share similar 'looking' and functioning procedures to make the whole-house system more uniform (providing a 'whole-house' blanket of coverage 142).

A network detail 418, a perform pairing 420, a whole-house control 422, an alarm suspend 424, and a system test interface 426 routines relate to the cellphone procedure grouping 412 routines, while the base-station+cellphone procedure grouping 410 includes additionally, a base-station operations 428 routine. Again, both the cellphone procedure grouping 412 and the base-station+cellphone procedure grouping 410 look and function similarly on their respective devices, to make control and operation of the whole-house system and network of devices in the present disclosure easy to understand and manage.

The block diagram of various routines 400 further illustrates a host apparatus grouping 414, of improved lighting-danger detection lamp/fixture 10 devices, and a host+satellite grouping 416, of remote satellite sensor 100 units and host devices included additionally. The host apparatus grouping 414 includes a host communication protocols 430, an alarm detected in host unit 432, an alarm in other host-same type 434, an alarm in other host NOT-same type 436, and an alarm detected in paired satellite 438 routines, all relate to the host apparatus grouping 414 routines, while a host+satellite grouping 416 includes additionally a satellite unit danger sensed 440 routine and a satellite unit general utility 442 routines.

All these routines and procedures illustrated in the block diagram of various program routines 400 are preferred but still are just examples. Other such routines and procedures could also be suited to accomplish the teachings of the disclosure of the current disclosure.

Figure 10B:
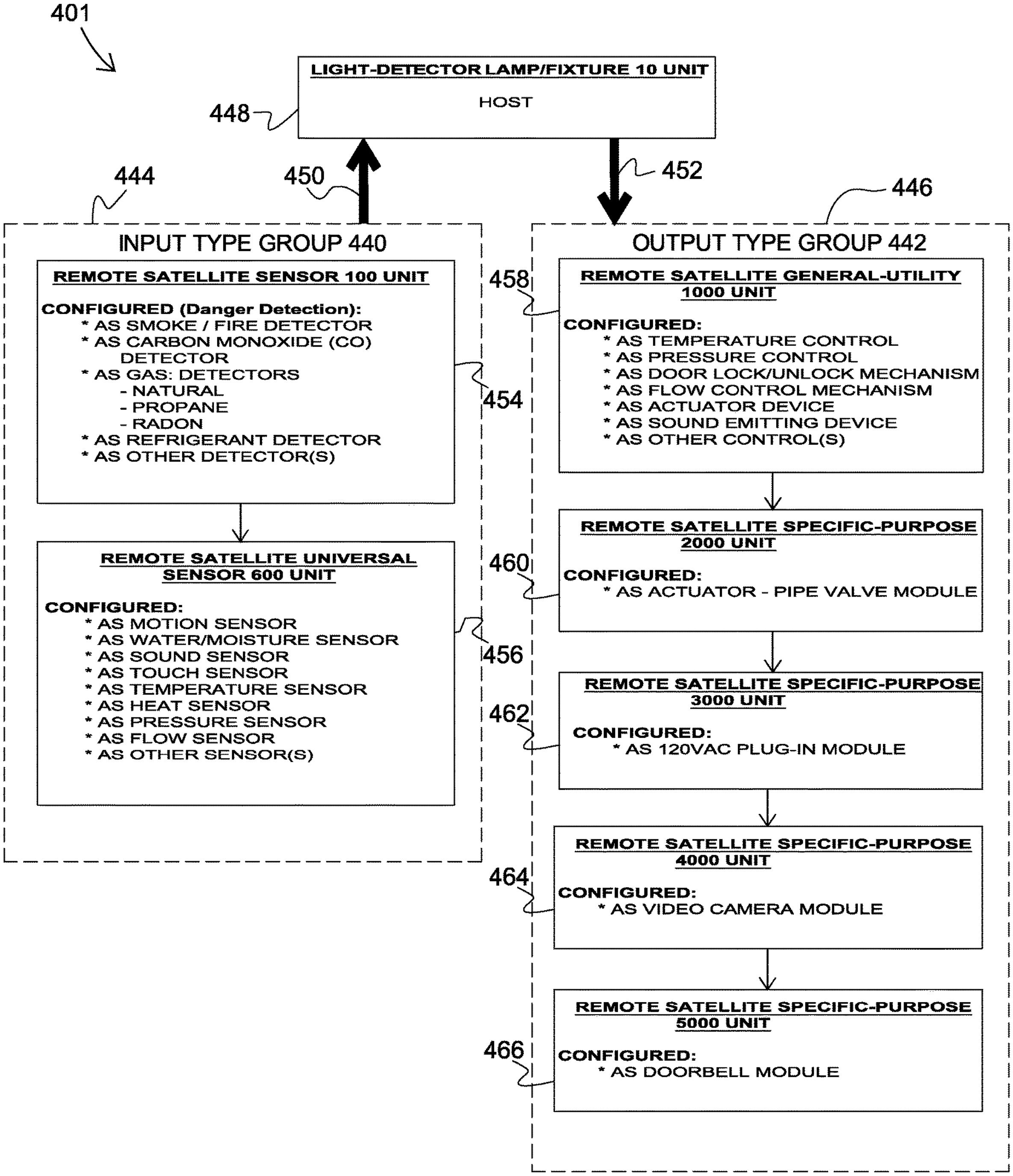
FIG. 10*b*, is another block diagram, that illustrates further, a remote satellite configuration grouping detail, whereby there are the principal states of remote satellite functions, showing 'INPUT' and 'OUTPUT' signal types, of FIG. 10*a*, routines are processed.

FIG. 10*b*, is a block diagram that illustrates a remote satellite configuration grouping 401 details. In this illustration, there are the principal states of remote satellite function, a block detail 444 (of 440 'INPUT' signal type), see FIG. 10*a*, and a block detail 446 (of 442 'OUTPUT' process signal type). Both these input and output types reference FIG. 10*a*, the satellite unit general utility routines 442, where input and output (command/or automatic) signals are processed.

A block 448, representing the improved lighting-danger detection lamp/fixture 10 hosts, has an arrow INPUT signals 450, and an arrow OUTPUT signals 452, from and to the block detail 444 (of 440 'INPUT' signal type), and a block detail 446 (of 442 'OUTPUT' process signal type) respectively. These blocks show the configuration, listing, and grouping of the types of remote satellites as they relate to their sensing or utility functions.

Within the block detail 444 (of 440 'INPUT' signal type) grouping is a block 454 representing the remote satellite sensor 100 unit grouping, and a block 456 representing the remote satellite universal sensor 600 unit grouping. The block 454 shows the configuration (shown in Table-1) of the embodiments of the remote satellite sensor 100 unit types that relate to danger detection.

TABLE-1

| CONFIGURED (Danger Detection-Remote Satellite Sensor 100 Units): |
|---|
| AS SMOKE/FIRE DETECTOR |
| AS A CARBON MONOXIDE (CO) DETECTOR |
| AS GAS: DETECTOR(S) |
| NATURAL |
| PROPANE |
| RADON |
| AS REFRIGERANT DETECTOR |
| AS OTHER DETECTOR(S) |

While the block 456 lists the configuration (shown in Table-2) of the remote satellite universal sensor 600 types of remote satellites that do monitor sensing functions.

TABLE-2

| CONFIGURED (Remote Satellite Universal Sensor 600 Units): |
|---|
| AS MOTION SENSOR |
| AS WATER/MOISTURE SENSOR |
| AS SOUND SENSOR |

TABLE-2-continued

| CONFIGURED (Remote Satellite Universal Sensor 600 Units): |
|---|
| AS TOUCH SENSOR |
| AS TEMPERATURE SENSOR |
| AS HEAT SENSOR |
| AS PRESSURE SENSOR |
| AS FLOW SENSOR |
| AS OTHER SENSOR(S) |

In the block detail 446 (of 442 'OUTPUT' process signal type), is a block 458 representing the remote satellite general utility 1000 unit grouping. The block 458 shows the configuration (shown in Table-3) of the embodiments of the remote satellite general-utility 1000 unit types, that relate to control functions.

TABLE-3

| CONFIGURED (Remote Satellite General-Utility 1000 Units): |
|---|
| AS TEMPERATURE CONTROL |
| AS PRESSURE CONTROL |
| AS DOOR LOCK/UNLOCK MECHANISM |
| AS FLOW CONTROL MECHANISM |
| AS ACTUATOR DEVICE |
| AS SOUND EMITTING DEVICE |
| AS OTHER CONTROL(S) |

Similarly, block 460 represents the remote satellite specific-purpose 2000 unit, which is configured as an actuator-pipe valve module. Likewise, a block 462, represents the remote satellite specific-purpose 3000 unit, which is configured as a 120 VAC plug-in module. A block 464, represents the remote satellite specific-purpose 4000 unit, which is configured as a video camera module. And a block 466 represents the remote satellite specific-purpose 5000 unit, which is configured as a doorbell module. All these are listed in Table-4.

TABLE-4

| CONFIGURED (Remote Satellite Specific-Purpose Units): |
|---|
| AS ACTUATOR-PIPE VALVE MODULE (2000 Unit) |
| AS 120VAC PLUG-IN MODULE (3000 Unit) |
| AS VIDEO CAMERA MODULE (4000 Unit) |
| AS DOORBELL MODULE (5000 Unit) |

In process, any of the configured remote satellites in the block 454 and block 456 can provide a signal to input to the host in block 448 (lighting-danger detection lamp/fixture 10 unit). These INPUTS are signals that relate to the type of detector or sensor as identified in said blocks to the host. Whereby, the host then can respond, and according to the particular function of any given unit, provide an OUTPUT to alert, perform a task, control a process, or a service, etc., either in response to a command or as would be, automatically executed (as selected during the device setup routine, see FIGS. 7*a* & 7*b*, and 8*a* through 8*d*).

All these input signals and output processes are detailed in FIGS. 1*a* through 1*k* as specific examples and include their various functions program routines 400 of operation, demonstrating procedures and processes, and their remote satellite configuration groupings 401. Further, their pairing, as detailed in FIGS. 3 and 4*a* show a practical means to manage a whole house network of lighting-danger detection lamp/fixtures 10 host with any of the remote satellite units as listed in Tables 1, 2, 3, and 4.

Figure 11:
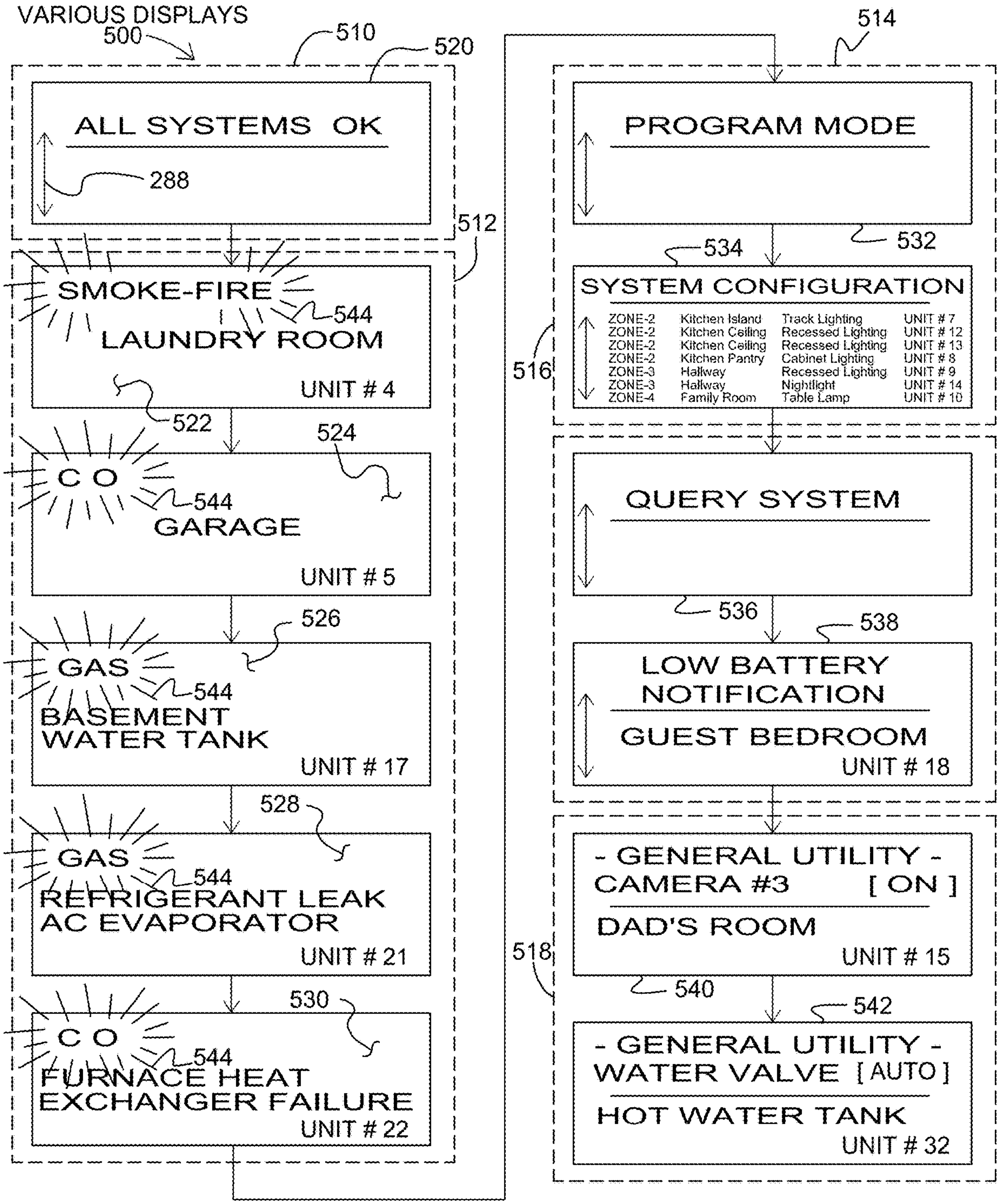
FIG. 11 is another illustration, using a block diagram showing a sampling of various displays of screens, that are possible on the base-station and cellphone; the display screens reflect several situations and events of operations, in accordance with an embodiment of the present disclosure.

FIG. 11 is a block diagram showing examples of various displays 500, of the screens possible on the (optional) base-station BS and cellphone 210; the display screens reflect several situations and events of operations, of the present invention. A quiescent state grouping 510, is showing an 'All Systems OK' 520 displayed. An alarm display block 512 grouping, shows a smoke/fire alarm 522 in the laundry room displayed, a carbon monoxide (C O) alarm 524 in the garage displayed, a gas leak alarm 526 in the basement water tank of a specific natural gas type displayed, a gas leak alarm 528 in the air conditioning (AC) evaporator, specific gas type displayed, and a C O alarm 530 in the furnace heat-exchange failure, specific alarm type. All of these displays show a signaling alert 544 being flashed, in the appropriate color for the category of danger alerting, on the base-station BS (as shown in FIG. 9) display screen and/or cellphone 210 (referenced in FIGS. 7*a* & 7*b*, and 8*a*, 8*b*, 8*c*, & 8*d*) display screen application menu 212.

Further illustrated in the examples of various displays 500, is a program mode grouping 514, where a program mode 532 routine, and a system configuration 534 routine are displayed. Here the various setups and controls can be accessed; as was discussed earlier in this disclosure of the present disclosure.

Also, a query & notification grouping 516, shows a query system 536 and a notification display 538, allowing inquiries into the network of devices; for pairing configurations, testing, and the status of issues and problems (if any). One final grouping shown in the various displays 500 is a general utility grouping 518. Whereby displays of the 'danger detecting type' and 'utility type' remote satellite sensor 100 units and remote satellite universal sensor 600 unit types of the alternate embodiments are indicated. And, the remote satellite general-utility 1000 unit, remote satellite specific-purpose 2000 unit, 3000 unit, 4000 unit, and 5000 unit types are displayed in detail via blocks general utility window 540 and general utility window 542.

An example of such displays in the general utility grouping 518, is the general utility window 540 and general utility window 542, whereby general utility window 540 are units having the ability to activate, control, or perform a function, such as showing a camera-#3 being [ON] in a user-identified DAD'S ROOM, and representing UNIT #15 within the network of devices. And general utility window 542 is displayed a remote satellite specific-purpose 2000 unit, configured as a water pipe valve actuator module, being displayed. The device is indicated as being user-assigned to the hot water tank as network UNIT #32 and also being selected to function [AUTO] automatically (when water or moisture is sensed via another 'input' type remote satellite device not shown in this window—see FIG. 6*b* for example).

As with the earlier discussed section of displays, the representation of the program mode grouping 514, the query & notification grouping 516, and the general utility grouping 518 are all exemplary and those skilled in programming electronic devices can certainly devise other configurations of display screens/windows, and forms, and detail additions, to achieve the teaching of the present disclosure.

It should not be necessary to elaborate on the importance of each of the examples indicated in either the various program routines 400 in FIGS. 10*a* and 10*b*, or the various displays 500 in FIG. 11, as well as those displays indicated in FIGS. 7*a* & 7*b*, and FIGS. 8*a*, 8*b*, 8*c*, & 8*d* for their stated 'labels' indicated, should be representative of the functionality intended. Therefore, a minimum has been set forth to convey each possibility. However, no limitation should be considered due to the attempt to keep the discussion clear of unnecessary details. Also, the improved lighting-danger detection lamp/fixture 10 as a host, combined with a remote satellite sensor 100 apparatus alarming of a danger, represents a clear advancement to any prior art and will provide great danger/hazard protection, alerting both audibly (via horn, siren, or speaker, with tone or voice notification) and visually in specific color strobing light (as to the specific type of danger), and a GREEN safe-way-out signaling technique via the green LED strobe array 25 (disclosed in FIG. 2).

Alternative embodiments introduce remote satellite universal sensor 600 units with general utility to input signals into an improved lighting-danger detection lamp/fixture 10 host. These units enable the host to output signals to suitable remote satellite general-utility 1000 units or remote satellite specific-purpose units such as 2000, 3000, 4000, or 5000, to activate, control, or execute specific functions.

The ability to pair a lighting lamp device—which can be easily installed into a conventional lighting socket or hard-wired fixture—with a remote satellite system allows tasks to be performed seamlessly. Whether it's visually observing, audibly responding, or issuing voice commands for execution, the system excels in delivering unparalleled functionality. It creates a comprehensive 'whole-house' coverage 142, offering security against dangers and hazards as well as versatile convenience utilities.

Emphasizing the significance of the water valve example in the disclosure, the valve could serve as a 'shut-off' mechanism for the entire house, not limited to the hot water tank 278. When the water sensing remote satellite sensor 276 unit is activated due to a water tank failure (as illustrated in FIG. 6*b*), the valve can close to prevent further damage. Similarly, such a valve might control the whole house gas supply, not just the supply-line 286 feeding the furnace or hot water tank. If a ceiling-mounted remote satellite sensor 270 unit detects a gas leak, the valve could shut off the gas to avert potential explosions and extensive life and property damage. This underscores the critical role such mechanisms play in ensuring safety and minimizing hazards.

The layouts depicted in FIG. 2 demonstrate a simplified version of the improved lighting-danger detection lamp/fixture 10 host apparatus. For instance, the lighting-danger detection lamp/fixture 10 host possesses the capability to process verbal lighting commands such as ON, OFF, DIM, BRIGHT, PRESET, NIGHT, and EMERGENCY. Additionally, it serves multiple functions, including acting as an intercom, recording and playing back a 10-second message, facilitating incoming and outgoing hands-free phone calls using the base-station as the conduit, and providing emergency lighting at 20% brightness during power outages. This streamlined design highlights its versatility and efficiency.

The system significantly benefits from the integration of satellite unit(s) 700, encompassing a variety of remote sensing satellite types 101 and remote utility/purpose satellite types 1001. Each configured unit—whether a remote satellite sensor 100, a remote satellite universal sensor 600, or alternative embodiments such as remote satellite general-utility 1000 units or remote satellite specific-purpose units 2000, 3000, 4000, or 5000—enhances functionality through the ability to activate, control, or perform specific tasks. Together, they support the host, an improved lighting-danger detection lamp/fixture 10 apparatus, creating a comprehensive 'whole-house' blanket of coverage 142.

This advanced system excels in its dual offerings: convenience and utility combined with hazard and danger detection capabilities. It identifies, notifies, and provides guidance for safe evacuation far earlier than other devices. The innovation of the present invention is unmatched in its ability to unify protection and functionality seamlessly into one efficient network.

IN OPERATION, an improved combination of danger detection, LED lighting lamp/fixture, with optional other general utility features, serves as a host to a paired remote satellite unit apparatus as a supporting element. The host is a lamp housing consistent in shape and form with conventional lighting lamps/fixtures. The host LED light, combined with sensing danger or hazards and giving alarms, also can receive a sensing signal from a remote satellite supporting element with the same or other danger or hazard sensing characteristic to expand the field of detection coverage effectively creating a distributed network. The housing for the remote satellite is small and unintrusive and easily affixed to surfaces anywhere (wall high, wall low, ceiling, floor, shelf, table, etc.) within the vicinity of the lighting lamp/fixture. The housing can be fixed to or be placed on any surface, or location, or object, either battery-operated or connected to commercial power via low-voltage cord and wall 120 VAC transformer. An alarming host, produced as the result of a sensed signal either from within the host or from a paired remote satellite, has audible and visual pulsations and can transmit such alarming to a network; alerting other such devices that a danger or hazard was detected. The network may further have optionally a cellphone and/or a base-station therein to effectively notify that a danger is nearby and immediate action must be taken.

The general utility feature further includes optional service functions; supported by a remote satellite having a variety of designed aspects to perform a function useful to a whole house scheme of convenience and security within the distributed network.

In the pairing of devices, one can select preferences, manage settings, and control operations via an application (APP) running on a cellphone and/or base-station, to the user's ideal liking. Wherein, the select preferences, manage settings, control operations, and other adjustment features are paired as to a location, a zone, or a group of devices that are identified, preferences of light color temperature, light-level presets, and night-level presets are set, 'calling' names and phone numbers are added, and intercom settings selections are made.

The alarms, when communicating in the network, give warnings that are displayed on the cellphone and base-station, and for purposes of alerting other similar apparatuses, in a network, to repeat the alarm state. The host apparatus or remote satellite apparatus can be queried to 'test' via the network; thus, allowing not having to physically handle each unit (getting on step ladders, etc.) but giving its status electronically and displayed on the cellphone and/or base-station. The general utility units have the ability to activate, control, or perform a function/execution (such as operating a valve, a video camera, locking or unlocking a door, etc.).

The sensing for a danger is at least one of a smoke/fire detector, carbon monoxide detector, or a gas detector. The pairing devices (host) lighting lamp/fixture and (supporting element) remote satellite element are paired exclusively with one another. The danger/hazard detection affording alarm and alerting is having visual white strobing LEDs, alternating with colored LEDs; where the color red would indicate smoke/fire, amber indicates carbon monoxide and blue indicate gas (natural, propane, radon, refrigerant, etc.), and, for green strobing LEDs for the case of a neighboring apparatus alarming a danger nearby, and further indicating a safe-way-out from the danger. The host and satellites can be queried to 'test' their operation status via the whole-house network.

An improved combination of danger detection, LED lighting-danger detection lamp/fixture 10 serves as a host, to other general utility functions via a remote satellite universal sensor 600 unit apparatus as a supporting element and a remote satellite general-utility 1000, or any of the remote satellite specific-purpose 2000, 3000, 4000, or 5000 units. The housing for the remote satellite is small and unintrusive and easily affixed to surfaces anywhere within the vicinity of the said lighting-danger detection lamp/fixture 10, where the housing can be fixed to or be placed on any surface, or location, or object. For example, to be placed in, on, or around a heat ventilation and air conditioning (HVAC) system vent; either at a discharge or return location.

The alarms of a host are audible (via horn, siren, speaker, whereby the speaker can notify in voice or pulsating tones, etc.) and visual (via pulsating LED strobing of colored and alternating white light), and are transmitted to a network in a home or commercial building. The network optionally has a cellphone and/or a base-station to display the current status and alarm warnings. In pairing devices, there can be preference selections, manage settings, and control operations via an application (APP) running on said cellphone and/or base-station, which allows an overview of operations and functional status. The alarms, when communicating in the network, give warnings that are displayed on the cellphone and base-station, and for purposes of alerting other similar apparatuses, in a network, to repeat the alarm state, giving notice of a danger nearby, alerting and indicating a safe-way-out. Further, the alarms can be queried to 'test' via network-paired cellphone or base-station.

The general utility ability to activate, control, or perform a function, by the host, and remote satellite can execute a task. The system, process, and apparatuses of the host lighting-danger detection lamp/fixture 10 can be paired with one or more supporting elements representing the remote satellite sensor 100 units. Each danger-type remote satellite has one of the same 'type' sensing detectors that is found in the host or can be of a different type of sensing depending on the configuration and purpose of the signal input desired for use by the host. The danger or hazard or utility detection sensing devices are not limited to, but is at least one of a smoke/fire detector, a carbon monoxide detector, a gas detector, a water/moisture detector, a sound detector, a pressure detector, a temperature detector, a flow detector, a motion detector, or a light detector. The paired devices of the improved lighting-danger detection lamp/fixture 10 host and representing the remote satellite sensor 100 units, and remote satellite universal sensor 600 units are exclusive to one another and communicate in their local network; only a host device can communicate with other host devices and to a base-station or cellphone on a global network for virtual interactions and interface.

The global network base-station reference could additionally be any of the conventionally available 'convenience-assistance' devices such as Amazon's Alexa, Google-HOME, Apple, HomePod/Siri, or the alike, running an appropriate application (APP), for spoken interaction and not-visual functions to further augment the network of devices. The system, process and apparatus (in the first embodiment) is a danger/hazard detection system affording means to alarm and alerting, is having visual white strobing LEDs, alternating with colored LEDs; where the color red would indicate smoke/fire, amber indicates carbon monoxide and blue indicate gas (natural, propane, radon, refrigerant, etc.), and, for green strobing LEDs for the case of a neighboring apparatus alarming a danger nearby, indicating a safe-way-out from the danger.

In other embodiments, the system and apparatus are designed to perform tasks and execute functions or services such as activating, controlling, or operating electrically powered devices. These may include valves, video cameras, doorbells, door locking/unlocking mechanisms, and plug-in 120 VAC modules. One embodiment combines danger detection capabilities with a LED lighting lamp/fixture as the host, while an alternative embodiment focuses on providing general utility services through a LED lighting lamp/fixture acting as the host.

The remote satellite unit apparatus serves as a supporting element and features a lamp housing for host lighting-danger detection lamps/fixtures 10. This housing is engineered to replace prior art seamlessly. It incorporates a conventional Edison E-26 screw base, conventional recessed fixture, or other lighting fixture styles with screw bases or alternative connection methods, ensuring compatibility and ease of installation.

The general utility means the ability to activate, control, or perform a function, whereby the host and a remote satellite can execute a task, such as maneuver an electrically operated valve (the valve could be a water type, a gas type, or any control type to activate or de-activate, for example, a supply line), turn ON/OFF a video camera, respond to a pressure, or a temperature, or a motion, or a hazard, or operating as an intercom, or providing a sound, or listening for a sound. Whereby the process and apparatuses in of the host lighting-detector lamp/fixture can be paired with one or more supporting remote satellite units, each danger 'type' remote satellite is of the first embodiment configuration, and, a general utility type serves configuration of a second embodiment; is found in the host. Whereby the danger or hazard detection sensing device, has at least one of a smoke/fire detector, a carbon monoxide detector, a gas detector, a water/moisture detector, a sound detector or emitter, a pressure detector, a temperature detector, a motion detector, and a light detector sensing means in the host.

Whereby the means to pair devices in said lighting-detector lamp/fixture host apparatus and said remote satellite element as a supporting apparatus to provide sensing or services (as the case may be), are paired exclusively to one another and communicate in their local network; only the host can communicate to a base-station or cellphone on a global network for visual interactions ~,~. Whereby an LED light, combined with a means for sensing smoke/fire, carbon monoxide, gas danger or water/moisture, sound, pressure, temperature, motion, giving alarm by audible and visual alerting, the lighting responds to control commands ("ON", "OFF", "DIM", "BRIGHT", "NIGHT", "PRESET" and "EMERGENCY"), and, also function as an intercom between lighting-danger detection lamps/fixture 10 and any networked base-stations. Notably, the system and process of the present invention will provide a convenience and utility along with the security that will identify (a type of sensed detection), notify (an exact location of the alerting), and show the way out (from the presence of danger or hazard), way before any other device can, is without equivalency. It is not just an alarm detection device as is all prior art.

One embodiment of an improved combination of danger detection and LED lighting lamp/fixture apparatus serves as a host when paired with a satellite unit(s) 700 device;

resulting in a host apparatus and a satellite device, system, and process. The host is an improved lighting-danger detection lamp/fixture 10. The satellite unit(s) 700 are a field of remote sensing satellite type 101 or a remote utility/purpose satellite type 1001; creating a distributed system of networked devices. An RF communication 138 means, gives the pairing ability for the satellite unit(s) 700 to communicate with the host lighting-danger detection lamp/fixture 10, and an RF communication 140 means, gives the pairing ability for host lighting-danger detection lamp/fixture 10 to a network.

The communication with the host is for receiving signals from a remote sensing satellite type 101, and may also, command (issue) signals to a remote utility/purpose satellite type 1001. The receiving signals from a remote sensing satellite type 101, expand and add monitoring range to the host apparatus, effectively creating a distributed network, resulting in greater coverage of a danger or hazard detection. The alarms and alerting means of the host having audible and visual pulsations, and a means to transmit such alerting to an RF communication 140 network of other lighting-danger detection lamp/fixture 10 devices. The network means having a cellphone 210 and/or a base-station BS therein, and the pairing is a process to allow the 'field' of satellite unit(s) 700 devices to manage settings, and control operations and options, via an application (APP) routine process. The satellite unit(s) 700 can be queried to 'test' via network means. The remote satellite utility/purpose type 1001 means the ability to activate or perform a function.

Wherein the system and process of the satellite unit(s) 700 are designed to expand the ability of the host unit to give a more complete 'whole-house' blanket of coverage 142 of danger detection and utility convenience functionality in a home or structure. The danger or hazard detection sensing is at least one or more of a plurality of danger sensing detector remote satellite sensor 100 units, whereby the sensing is at least one of a smoke detector, a fire detector, a carbon monoxide detector, or a gas detector.

The network means having a cellphone 210 and/or a base-station BS to pair devices, select preferences, manage settings, and control operations via an application (APP) routine process 220, wherein pairing as to a location, a zone, or a group of devices are identified, user adjustments, preferences of light level presets, night level presets are set, calling names and phone numbers are stored, and intercom selections are made. The system, and process, wherein the field of remote sensing satellite type 101 or a remote utility/purpose satellite type 1001 gives INPUT signals to and/or accepts OUTPUT signals from the host lighting-danger detection lamp/fixture 10, having signals that result in a full complement of functionality throughout the network comprising a system. Notably, the system and process of the improved present invention will identify, notify, and show the way out (of danger), and provide a convenience, a service (by operating a function), and/or a utility.

Another embodiment is an improved combination of danger detection and LED lighting lamp/fixture apparatus, which serves as a host, when paired with a satellite unit(s) 700 device comprising a host apparatus and a satellite device, system, and process. The host is a lighting-danger detection lamp/fixture 10 and the satellite unit(s) 700 can be one or more of the many conceivable remote sensing satellite type 101 and/or one or more of the many conceivable remote utility/purpose satellite type 1001. A local RF communication 138 means, gives the ability for the satellite unit(s) 700 to communicate between the host lighting-danger detection lamp/fixture 10 via a pairing process. The lamp housing for the host is consistent in form and shape with conventional lighting lamps/fixtures. The host is capable of receiving at least one INPUT type signal from a remote sensing satellite type 101, and may also, (issue) command at least one OUTPUT type signal to a remote utility/purpose satellite type 1001. The lighting-danger detection lamp/fixture 10, is combined with a means for sensing danger or hazards to give alarms and alerting. The remote sensing satellite type 101 supporting elements comprise the same danger or hazard sensing characteristic as the host, or can support other types of sensing characteristics, whereby it will signal to its paired host of sensed processes. The housing for said satellite unit(s) 700 are small and unintrusive and easily affixed near, in, or around surfaces or objects anywhere within the vicinity of the said lighting lamp/fixture host 10.

The alarms and alerting means of the host having audible and visual pulsations, and a means to transmit such alerting to a global RF communication 140 network of other lighting-danger detection lamp/fixture 10 devices (and/or facilitate adaptive 'interoperability' communications 141 to make non-compatible devices compatible). The network means having a cellphone 210 and/or a base-station BS therein. The pairing process allows the satellite unit(s) 700 devices to select preferences, manage settings, and control operations and options, via an application (APP) routine process 220 running on said cellphone 210 and/or base-station BS. The alerting, when communicating in the said network are giving warnings that are displayed on the cellphone 210 and optionally on base-station BS are of at least one of those in alarm display block 512 grouping, and for purposes of alerting other similar host apparatuses in a network, to repeat the danger or hazard alarm state and give a safe-way-out indication when appropriate via the green LED strobe array 25. The satellite unit(s) 700 can be queried to 'test' via network means. The remote satellite utility/purpose type 1001 means the ability to activate, actuate, control, or perform a function consistent with whole-house control routines (as in block detail 422 or in block detail 446), and the ability to activate, actuate, control, or perform a function is a manual command or automatically executed (as indicated in general utility grouping 518) settings.

The system, and process, of the lighting-danger detection lamp/fixture 10 host housing can be formed to directly replace existing prior art lighting housings styles, types, and shapes. And the satellite unit(s) 700 are designed to expand the ability of the host unit to give a more complete 'whole-house' blanket of coverage 142 of danger detection and utility convenience functionality in a home or structure.

The danger or hazard detection sensing is at least one or more of a plurality of danger sensing detector remote satellite sensor 100 units, and is at least one of a smoke detector, a fire detector, a carbon monoxide detector, or a gas detector. The paring process of the lighting-danger detection lamp/fixture 10 and said satellite unit(s) 700 are paired exclusively to one another. And the network means is having a cellphone 210 and/or a base-station BS to pair devices, select preferences, manage settings, and control operations via an application (APP) routine process 220, wherein pairing as to a location, a zone, or a group of devices are identified, user adjustments, preferences of light level presets, night level presets are set, calling names and phone numbers are stored, and intercom selections are made. The danger/hazard detection either from the host lighting-danger detection lamp/fixture 10, or the input signaling from remote satellite sensor 100 unit, affording means to alarm and alert both audibly (by a horn, or a siren, or a speaker) and visually, where the visual is white strobing LEDs, alternating with colored strobing LEDs; where a color of strobing light would indicate the type of danger or hazard, and, green strobing LEDs indicating a danger nearby and a safe-way-out from the danger. Notably, the system and process of the improved present invention will identify, notify, and show the way out (of danger by alarm and alerting both audibly and visually), and provide a convenience, a service (by operating a function), and/or a utility.

Another embodiment of the improved combination lighting-danger detection apparatus and system consists of a combination of danger detection and LED lighting lamp/fixture apparatus, serves as a host, when paired with a satellite unit(s) 700 device comprising a host apparatus and a satellite device, system, and process. Wherein the host, is a lighting-danger detection lamp/fixture 10 and a sensing type or utility type said satellite unit(s) 700 being at least one of a remote sensing satellite type 101 having danger detection type remote satellite sensor 100 unit, or a utility remote satellite universal sensor 600 unit, and/or, a remote utility/purpose satellite type 1001 having a remote satellite general-utility 1000 unit, or remote satellite specific-purpose units (2000, 3000, 4000 or 5000).

A local RF communication 138 means ~,~ gives the ability for the satellite unit(s) 700 to communicate between the host lighting-danger detection lamp/fixture 10 via a pairing process. A lamp housing for the lighting-danger detection lamp/fixture 10 host is consistent with conventional lighting lamps/fixtures in style, form, shape, and appearance characteristics. The host is capable of receiving and processing at least one INPUT type signal from a remote sensing satellite type 101, and may also, command (issue) and process at least one OUTPUT type signal to a remote utility/purpose satellite type 1001. The lighting-danger detection lamp/fixture 10, is combined with a means for sensing danger or hazards to give alarms and alerting both audibly and visually. The remote sensing satellite type 101 supporting elements comprise the same danger or hazard sensing characteristic as the host, or can support other types of sensing characteristics, which will signal its paired host of sensed processes of a danger or hazard or utility as the case may be.

The housing for said satellite unit(s) 700 are small and unintrusive and easily affixed near, in, or around surfaces or objects anywhere within the vicinity range of the said lighting lamp/fixture host 10. The alarms and alerting means of the lighting-danger detection lamp/fixture 10 host having audible and visual pulsations, and a means to transmit such alerting to ~,~ a global RF communication 140 network of other lighting-danger detection lamp/fixture 10 devices (and/or to include and facilitate adaptive 'interoperability' communications 141 to make non-compatible devices compatible as the case may be). The network means having a cellphone 210 and/or a base-station BS therein, and the pairing process to allow the satellite unit(s) 700 devices to, select preferences, manage settings, and control operations and options, via an application (APP) routine process 220 running on said cellphone 210 and/or base-station BS. The alerting, when communicating in the said network are giving warnings that are displayed on the cellphone 210 and/or optionally on base-station BS are of at least one of those in alarm display block 512 grouping, and for purposes of alerting other similar host light-detector lamp/fixture 10 apparatuses in a network, to repeat the danger or hazard alarm state and give a safe-way-out indication when appropriate via the green LED strobe array 25. The satellite unit(s) 700 can be queried to 'test' operational status via network means. The remote satellite utility/purpose type 1001 means the ability to activate, actuate, control, or perform a function consistent with whole-house control routines (as are shown in block detail 422 or in block detail 446). And finally, the ability to execute, activate, actuate, control, or perform a function is a manual command or automatically executed like those shown in general utility grouping 518 settings.

The system, and process, of the lighting-danger detection lamp/fixture 10 host housing can be formed to directly replace existing prior art lighting housings styles, types, forms, and shapes, and the satellite unit(s) 700 are designed to expand the ability of the lighting-danger detection lamp/fixture 10 host unit to give a more complete 'whole-house' blanket of coverage 142 of danger or hazard detection, and the utility of convenience, functionality, true multi-functional attributes, in a home or structure. The danger or hazard detection sensing device is one or more of a plurality of danger sensing detector types of remote satellite sensor 100 units. The sensing means is at least one of a smoke detector, a fire detector, a carbon monoxide detector, or a gas detector device, whereby such detectors may be optionally adjusted to user preferences.

The pairing process of the lighting-danger detection lamp/fixture 10 host and the satellite unit(s) 700 are paired exclusively to one another. The network means having a cellphone 210 and/or a base-station BS to pair devices, select preferences, manage settings, and control operations via an application (APP) routine process 220, wherein pairing as to a location, a zone, or a group of devices are identified, user adjustments, preferences of light level presets and light color temperature, night level presets are set, calling names and phone numbers are stored, and intercom selections are made. The danger/hazard detection either from the host lighting-danger detection lamp/fixture 10, or the input signaling from remote satellite sensor 100 unit, affording means to alarm and alert both audibly (by a horn, or a siren, or a speaker) and visually, where the visual is white strobing LEDs, alternating with colored strobing LEDs; where a color of strobing light would indicate the type of danger or hazard, and, for green strobing LEDs for the case of a neighboring apparatus alarming a danger nearby, and further indicating a safe-way-out from the danger. Whereby the sending and receiving of signals result in a full complement of functionality and multi-operating attributes that are network-wide.

Another embodiment of the improved combination lighting-danger detection apparatus and system consists of a combination danger detection and LED lighting lamp/fixture apparatus serves as a host, when paired with a satellite unit(s) 700 device comprising, a host apparatus and a satellite device, system, and process; where the host, is a lighting-danger detection lamp/fixture 10 and a sensing type and/or utility type said satellite unit(s) 700 being at least one of a remote sensing satellite type 101 and/or a remote utility/purpose satellite type 1001. Wherein, the danger detection type has a remote satellite sensor 100 unit configured as at least one of a smoke detector, a fire detector, and/or as a carbon monoxide (CO) detector, or as a gas detector, where the gas detection is natural, or propane, or radon gas. Wherein the utility purposed type is a remote satellite universal sensor 600 unit configured as a motion sensor, or as a water/moisture sensor, or as a touch sensor, or as a temperature sensor, or as a heat sensor, or as a pressure sensor, or as a flow sensor. Wherein the utility type has a remote satellite general-utility 1000 unit, configured as a temperature control, or as a pressure control, or a door lock/unlock mechanism, or a flow control mechanism, or an actuator device, or a sound emitting device. Wherein said utility type, further has a remote satellite specific-purpose 2000 configured as an actuator with pipe valve module 2001 unit, or a remote satellite specific-purpose 3000 configured as a 120 VAC plug-in module 3001 unit, or a remote satellite specific-purpose 4000 configured as a video camera module 4001 unit, or a remote satellite specific-purpose 5000 configured as a doorbell module 5001 unit.

A local RF communication 138 allows satellite unit(s) 700 to interact with the host lighting-danger detection lamp/fixture 10 through a pairing process, enabling any practical number of satellite units to connect with a single host. The lighting-danger detection lamp/fixture 10 host features a lamp housing designed to match conventional lighting fixtures in style, form, shape, and appearance. This design ensures easier upgrades, making the system more retrofittable and economical to install The host is capable of receiving and processing at least one INPUT signal from a remote sensing satellite type 101 and can also issue and process at least one OUTPUT signal to a remote utility/purpose satellite type 1001. Additionally, the host integrates a mechanism for detecting dangers or hazards, providing alarms and alerts through both audible and visual means. Remote sensing satellite type 101 units may either share the same danger or hazard sensing characteristics as the host or support different sensing functions. These units send signals to their paired host to report detected hazards, dangers, or utilities, providing INPUT to the lighting-danger detection lamp/fixture 10 host for further processing.

The satellite unit(s) 700 feature small, unobtrusive housings, designed for easy installation on, near, or around surfaces or objects within the RF communication range of the host lighting lamp/fixture 10.

The lighting-danger detection lamp/fixture 10 host provides both audible and visual alerting mechanisms. Audible alerts can be delivered through a horn, siren, or speaker, with the speaker capable of producing voice notifications or pulsating tones. Visual alerts are conveyed via strobing LED pulsations. These alerts can also be transmitted to a global RF communication 140 network, which includes other lighting-danger detection lamp/fixture 10 devices. Additionally, adaptive 'interoperability' communications 141 facilitate compatibility with non-compatible devices by employing uploadable routines.

The network connectivity relies on a cellphone 210 and/or a base-station BS. Through the pairing process, satellite unit(s) 700 can be configured to user preferences using an application (APP) routine process 220 running on the cellphone 210 or base-station BS. This allows users to select preferences, manage settings, and control operations or options, including updating routines by uploading new ones. Warnings within the network are displayed on the cellphone 210 and, optionally, on the base-station BS. Alarm displays, such as those in block 512 groupings, can alert other host apparatuses in the network to repeat the danger or hazard alarm state. When appropriate, these devices also provide a safe-way-out indication via the green LED strobe array 25.

Satellite unit(s) 700 can be queried for operational status checks through the network, with results displayed on the cellphone 210 or base-station BS. The remote utility/purpose satellite type 1001 enables the activation, actuation, control, or execution of functions consistent with whole-house control routines (as illustrated in block details 422 and 446). These features enhance security, hazard warning, danger protection, and utility operations, delivering convenience and functionality. Additionally, functions can be performed via manual commands or automatically, as detailed in general utility grouping 518 settings, which allow users to configure the system installation according to their preferences.

The lighting-danger detection lamp/fixture 10 host housing is designed to directly replace existing lighting housings of various styles, types, forms, and shapes, making system upgrades easier, more retrofittable, and cost-effective to install. Satellite unit(s) 700 are developed to enhance the capabilities of the lighting-danger detection lamp/fixture 10 host, providing greater area coverage and support. This results in a more comprehensive 'whole-house' blanket of coverage 142 for danger or hazard detection, while also offering convenience, functionality, and true multi-functional features within a home or structure.

The danger or hazard detection sensing device may include one or more remote satellite sensor 100 units for danger sensing, or a utility-type remote satellite universal sensor 600 unit. Danger detection capabilities are not limited to, but may include, smoke/fire detectors, carbon monoxide detectors, gas detectors (covering natural gas, propane, or radon), or refrigerant detectors. Utility sensors may include motion sensors, water/moisture sensors, sound sensors, touch sensors, temperature sensors, heat sensors, pressure sensors, or flow sensor devices. These detectors and sensors can be optionally adjusted to suit user preferences, ensuring versatility and adaptability for varying needs.

The pairing process of the lighting-danger detection lamp/fixture 10 host and the satellite unit(s) 700 are paired exclusively to one another, whereby said pairing of a host to a satellite, gives greater coverage of danger detection and/or utility to a space by the addition of the satellite. The exclusive pairing of a satellite to a single host is not a limitation but is considered a benefit to limited network communication chatter. The network means having a cellphone 210 and/or a base-station BS to pair devices for setup or for viewing, select preferences, manage settings, and control operations via an application (APP) routine process 220, wherein pairing as to at least one of a location, a zone, or a group of devices are user identified, user adjustments can be made, preferences of light level presets and light color temperature, night level presets are set, calling names and phone numbers are stored, and intercom selections are made, afford greater user ease to set up and greater system functionality.

The improved combination lighting-danger detection apparatus and system offers capabilities to alarm and alert through both audible and visual means. Audible alerts can be delivered via a horn, siren, or speaker, with the speaker providing notifications in either voice or pulsating tones. Visual alerts utilize white strobing LEDs alternated with colored strobing LEDs. Specific colors correspond to particular hazards: red for smoke or fire, amber for carbon monoxide, blue for gas, and green for nearby danger along with a safe-way-out indication. Additionally, in the case of a 'neighboring' network apparatus alarming a nearby threat, these alerts are extended.

The alarming and alerting, along with utility control functions, occur almost instantaneously across the entire network of lighting-danger detection lamp/fixture 10 units, any connected base-station BS units, and cellphones 210 operating the application APP routine process 220. The green strobing LEDs not only signal a nearby danger or safe exit route but also indicate the specific hazard type by flashing its corresponding color (red, amber, or blue) for half a second within every three seconds of the green and white strobing pattern. This precise sequence provides a clear warning of the hazard type.

The improved combination lighting-danger detection apparatus and system bring unparalleled capabilities by identifying dangers, notifying users, and guiding them to safety both audibly and visually. It also serves as a utility, offering convenience and functionality with true multi—functional attributes. The detection-whether from the improved host lighting-danger detection lamp/fixture 10 or input signals from the remote satellite sensor 100 unit—is designed for both alarming and alerting. Furthermore, the utility-type remote satellite universal sensor 600 unit provides inputs that allow outputs to be sent to remote utility/purpose satellite type 1001 devices to execute functions or provide services.

It is to be understood that the drawings and descriptive matter are in all cases to be interpreted as merely illustrative of the principles of the disclosure, rather than as limiting the same in any way, since it is contemplated that various changes may be made in various elements to achieve like results without departing from the spirit of the disclosure or the scope of the appended claims.

Because many modifications, variations, and changes in detail can be made to the described preferred embodiments of the disclosure, it is intended that all matters in the foregoing description and shown in the accompanying drawings be interpreted as illustrative and not in a limiting sense. Thus, the scope of the disclosure should be determined by the appended claims and their legal equivalence.

All documents cited in the Detailed Description of the disclosure are, in relevant part, incorporated herein by reference; the citation of any document is not to be construed as an admission that it is prior art with respect to the present disclosure. To the extent that any meaning or definition of a term in this written document conflicts with any meaning or definition of the term in a document incorporated by reference, the meaning or definition assigned to the term in this written document shall govern.

REFERENCES (PRESENT INVENTION)

10 LIGHTING-DANGER DETECTION LAMP/FIXTURE (apparatus)
11 BLOCK DIAGRAM (of host electronics 10)
12 ELECTRICAL CONNECTION MEANS
14 CONDITIONING CIRCUIT
16 DCV POWER REGULATOR CIRCUIT
18 RECHARGE CIRCUIT
20 RECHARGEABLE BATTERY
22 WHITE LED MAIN ARRAY
24 WHITE LED STROBE ARRAY
25 GREEN LED STROBE ARRAY (safe-way-out indication)
26 RED LED STROBE ARRAY
27 AMBER OR BLUE LED STROBE ARRAY
28 CONTROL MICROPROCESSOR
30 SMOKE/CARBON MONOXIDE/GAS DETECTOR (S)
**30*b*** CARBON MONOXIDE DETECTOR(S)
32 AUDIBLE/VISUAL ALARM CIRCUIT
34 SILENCE CIRCUIT
36 RF COMMUNICATIONS CKT.
BS BASE-STATION
**37*a*** BASE-STATION (electronics)
**37*b*** BASE-STATION (power ckt)
**37*c*** BASE-STATION (display & controls)

38 120 VAC POWER CONNECTION LINE (interconnecting)
40 120 VAC POWER CONNECTION LINE (interconnecting)
78 SPEAKER & VENT HOLES (sound, smoke, and gases to enter and exit)
VENT (area)
100 REMOTE SATELLITE SENSOR UNIT
101 REMOTE SENSING SATELLITE TYPE—(both 100 & 600 input types)
102 MOUNTING MEANS
104 HOUSING
106 BATTERY COMPARTMENT
108 WALL STRUCTURE
110 VENT MESHING
112 FUNCTION BUTTON
114 INDICTING LED
116 SNAP-ON CLIP STRUCTURE
118 BACKPLATE
120 OPTIONAL MOUNTING SCREWS
122 OPTIONAL MOUNTING DOUBLE-SIDED TAPE
124 BATTERY ACTIVATION PULL-TAB
126 ELECTRONIC DIAGRAM
128 BATTERY
130 SENSOR (could be any one of several types)
132 MICROPROCESSOR
134 MEMORY
136 DRIVE CIRCUITRY
138 LOCAL RF COMMUNICATION
140 GLOBAL RF COMMUNICATIONS
141 ADAPTIVE ‘INTEROPERABILITY’ COMMUNICATIONS
142 BLANKET OF COVERAGE (danger detection & utility convenience)
200 INSTALLATION EXAMPLE-A
202 INSTALLATION EXAMPLE-B
210 CELLPHONE (with application APP routine)
212 APPLICATION MENU
214 PAIRING INTERFACE (routine)
216 TASKBAR SELECTION
218 SELECTION KEY
220 APP ROUTINE PROCESS
222 CEILING LAMP FIXTURE
224 FLOOR LAMP
226 TABLE LAMP
228 WALL-MOUNTED UNIT (mounted high)
230 CEILING-MOUNTED UNIT
232 WALL-MOUNTED UNIT (mounted low)
234 FLOOR-MOUNTED UNIT
236 SURFACE-PLACED UNIT
238 FLOOR VENT
240 WALL VENT
242 SHELF
244 CEILING FIXTURE
246 CEILING FIXTURE
248 WALL-MOUNTED UNIT
250 FLOOR-MOUNTED UNIT
252 HOUSE CHIMNEY
254 CEILING FIXTURE
256 CEILING FIXTURE
258 CEILING FIXTURE
270 CEILING-MOUNTED UNIT
272 WALL-MOUNTED UNIT (mounted high)
274 WALL-MOUNTED UNIT (mounted low)
276 FLOOR-MOUNTED UNIT
278 WATER TANK
280 HOME HVAC FURNACE-SECTION

282 HOME HVAC EVAPORATOR-SECTION (air conditioning)
284 GAS PIPE FITTINGS
286 APPLIANCE GAS CONNECTION
288 APPLIANCE EXHAUST PIPING
290 WHOLE HOUSE CONTROL (routine)
292 SUSPEND ALARM YES/NO
294 SELECTION KEY
296 VERIFY ALARM SUSPENSION? YES/NO
298 SYSTEM TEST INTERFACE (routine)
300 NETWORK DETAIL MENU (routine)
302 SELECTION KEY
304 ZONE FUNCTIONS (metering)
305 SCROLL CONTROL
306 SELECTION KEY
308 UNIT MANAGEMENT OVERVIEW
310 NETWORK SETUP & PASSWORD
312 HARDWARE RELEASE
314 FIRMWARE REVISION
BS BASE-STATION
100-1 SPECIFIC 1-SATELLITE
1000-2 SPECIFIC 2-SATELLITE
n SPECIFIC n-SATELLITE
138-1 RF EXCLUSIVE 1-CODE
138-2 EXCLUSIVE 2-CODE
**138-*n*** RD EXCLUSIVE n-CODE
316 DISPLAY SCREEN
318 AUDIO (speech recognition & voice)
320 EXISTING 'SMART HOME' DEVICES (Amazon ALEXA, Google—HOME, Apple HomePOD, or other user devices)
322 UNIT OVERVIEW MENU (general utility satellite)
324 UNIT SETUP MENU (general utility satellite)
326 OPERATIONAL FEATURE
328 HOST LOCATION
330 SATELLITE LOCATION
400 VARIOUS PROGRAM ROUTINES
401 REMOTE SATELLITE CONFIGURATION GROUPINGS
410 BASE-STATION+CELLPHONE PROCEDURE GROUPING
412 CELLPHONE PROCEDURE GROUPING
414 HOST APPARATUS GROUPING (lighting-danger detection lamp/fixture 10 device)
416 HOST+SATELLITE GROUPING (remote satellite sensor 100 unit & host)
418 NETWORK DETAIL ROUTINES
420 PERFORM PAIRING ROUTINE
422 WHOLE-HOUSE CONTROL ROUTINES
424 ALARM SUSPEND ROUTINES
426 SYSTEM TEST INTERFACE ROUTINES
428 BASE-STATION OPERATIONS ROUTINES
430 HOST COMMUNICATION PROTOCOLS ROUTINES
432 ALARM DETECTED IN HOST UNIT ROUTINES
434 ALARM IN OTHER HOST-SAME TYPE ROUTINES
436 ALARM IN OTHER HOST-NOT SAME ROUTINES
438 ALARM DETECTED IN PAIRED SATELLITE ROUTINES
440 SATELLITE UNIT DANGER SENSED ROUTINES
442 SATELLITE UNIT GENERAL UTILITY ROUTINES
444 BLOCK DETAIL (of 440 'input' signal)
446 BLOCK DETAIL (of 422 'output' process signal)
448 BLOCK (lighting-danger detection lamp/fixture 10 host)
450 ARROW (INPUT signals) <<<<<<<<<<<<<<<<<<<<<<<<<<<<
452 ARROW (OUTPUT signals)
454 BLOCK (remote satellite sensor 100 unit)
456 BLOCK (remote satellite universal sensor 600 unit)
458 BLOCK (remote satellite general-utility 1000 unit)
460 BLOCK (remote satellite specific-utility 2000 unit)
462 BLOCK (remote satellite specific-utility 3000 unit)
464 BLOCK (remote satellite specific-utility 4000 unit)
466 BLOCK (remote satellite specific-utility 5000 unit)
500 VARIOUS DISPLAYS (base-station and/or cellphone)
510 QUIESCENT STATE GROUPING (All Systems OK)
512 ALARM DISPLAY BLOCK (danger/hazard alerting grouping)
514 PROGRAM MODE GROUPING (system configurations)
516 QUERY & NOTIFICATION GROUPING
518 GENERAL UTILITY GROUPING
520 ALL SYSTEMS OK
522 SMOKE/FIRE ALARM
524 CARBON MONOXIDE (CO) ALARM
526 GAS LEAK ALARM (water tank natural gas specific)
528 GAS LEAK ALARM (AC evaporator refrigerant gas specific)
530 CARBON MONOXIDE (CO) ALARM (furnace heat-exchanger specific)
532 PROGRAM MODE DISPLAY
534 SYSTEM CONFIGURATION ROUTINES
536 QUERY ROUTINES
538 NOTIFICATION DISPLAYS
540 GENERAL UTILITY (camera-#3 unit specific)
542 GENERAL UTILITY (water valve unit specific)
544 SIGNALING ALERT (in appropriate category color RED, AMBER or BLUE strobing sight)
600 REMOTE SATELLITE UNIVERSAL SENSOR UNIT
602 MOUNTING MEANS (optional)
604 HOUSING
606 BATTERY COMPARTMENT
608 WALL STRUCTURE
610 SENSING AREA
612 FUNCTION BUTTON
614 INDICTING LED
616 SNAP-ON CLIP STRUCTURE
618 BACKPLATE
620 OPTIONAL MOUNTING SCREWS
622 OPTIONAL MOUNTING DOUBLE-SIDED TAPE
624 BATTERY ACTIVATION PULL-TAB
626 ELECTRONIC DIAGRAM
628 BATTERY
630 SENSOR (could be any one of several types)
632 MICROPROCESSOR
634 MEMORY
636 DRIVE CIRCUITRY
638 LOCAL RF COMMUNICATION
640 MOTION SENSOR (configured remote satellite universal sensor 600 unit)
642 WATER SENSING (configured remoter satellite universal sensor 600 uni)
700 SATELLITE UNIT(S)
701 DASHED-LINE BOX (showing 'field' of satellites in FIG. 2)

702 DASHED-LINE BOX (showing illustration of satellites and host)
1000 REMOTE SATELLITE GENERAL-UTILITY
1001 REMOTE UTILITY/PURPOSE SATELLITE TYPE—(OUTPUT)
1002 GENERAL STRUCTURE
1003 DOOR LOCK/UNLOCK MECHANISM (configure remote satellite 1000)
1004 HOUSING
1006 BATTERY COMPARTMENT
1012 FUNCTION BUTTON
1014 INDICATING LED
1024 BATTERY ACTIVATION PULL-TAB
1026 ELECTRONIC DIAGRAM
1028 BATTERY
1030 MANEUVER/CONTROL MECHANISM
1032 MICROPROCESSOR
1034 MEMORY
1036 DRIVE CIRCUIT
1038 LOCAL RF COMMUNICATION
2000 REMOTE SATELLITE SPECIFIC-PURPOSE 2000
2001 PIPE VALVE MODULE
2002 GENERAL STRUCTURE, ACTUATOR—PIPE VALVE MODULE
2004 HOUSING
2006 BATTERY COMPARTMENT
2008 ELECTRIC MOTOR/ROTATION KNOB
2010 PIPE VALVE MECHANISM
2012 FUNCTION BUTTON
2014 INDICATING LED
2016 COUPLING STRUCTURE
2018 VALVE ROTATION GRIP (stem and handle)
2020 SUPPLY-SIDE CONNECTION
2022 ISOLATION-SIDE CONNECTION
2024 BATTERY ACTIVATION PULL-TAB
3000 REMOTE SATELLITE SPECIFIC-PURPOSE 3000
3001 PLUG-IN MODULE
3002 GENERAL STRUCTURE, 120 VAC PLUG-IN MODULE
3004 HOUSING
3006 BATTERY COMPARTMENT
3008 CONTROL OUTPUT PLUG (120 VAC)
3010 CONVENTIONAL WALL RECEPTACLE
3012 FUNCTION BUTTON
3014 INDICATING LED
3016 3-PRONG COUPLING STRUCTURE
3018 120 VAC SOURCE
3020 not used
3022 not used
3024 BATTERY ACTIVATION PULL-TAB
4000 REMOTE SATELLITE SPECIFIC-PURPOSE 4000
4001 VIDEO CAMERA MODULE
4002 GENERAL STRUCTURE, VIDEO CAMERA MODULE
4004 HOUSING
4006 BATTERY COMPARTMENT
4008 VIDEO CAMERA LENS
4010 CONVENTIONAL WALL RECEPTACLE
4012 FUNCTION BUTTON
4014 INDICATING LED
4016 3-PRONG COUPLING STRUCTURE
4018 120 VAC SOURCE
4020 not used
4022 not used
4024 BATTERY ACTIVATION PULL-TAB
5000 REMOTE SATELLITE SPECIFIC-PURPOSE 5000
5001 DOORBELL MODULE
5002 GENERAL STRUCTURE, DOORBELL MODULE
5004 HOUSING
5006 BATTERY COMPARTMENT
5008 VIDEO CAMERA SECTION
5010 RING SECTION
5012 FUNCTION BUTTON
5014 INDICATING LED
5016 MOUNTING STRUCTURE (not shown)
5018 not used
5020 not used
5022 not used
5024 BATTERY ACTIVATION PULL-TAB

What is claimed is:

1. An improved combination lighting-danger detection apparatus and system, comprising:

a host paired by a wireless communication to a series of remote sensing satellites and to a series of remote utility/purpose satellites, wherein the host receives signals from the series of remote sensing satellites and issues commands throughout the series of remote utility/purpose satellites, so that the signals from the remote sensing satellites adds monitoring range to the host, creating a distributed network, and wherein the host has an audible and visual alarms and the capability to transmit alerts to throughout the distributed network; and a base-station used to select preferences, to manage settings and to control operations and options via an application.

2. The apparatus and system of claim 1, wherein the host is a lighting-danger detection lamp/fixture and the base-station is a computing device such as a mobile device, a tablet or a personal computer that can identify a location, a zone, or a group of devices, enable user adjustments, set preferences for light level presets and night level presets, store calling names and phone numbers, and make intercom selections.

3. The apparatus and system of claim 2, wherein the series of remote sensing satellites includes at least one of the following: a smoke detector, a fire detector, a carbon monoxide detector, or a gas detector.

4. The apparatus and system of claim 3, wherein the series of remote sensing satellites can be queried to 'test' via a network means; and the remote satellite utility/purpose satellites have the ability to activate or perform functions.

5. The apparatus and system of claim 4, wherein the series of remote sensing satellites and remote utility/purpose satellites provides input signals to and/or accepts output signals from the lighting-danger detection lamp/fixture, to identify, notify, and show a way out of danger via a green LED strobe array either through manual commands or automatically configured settings.

6. The apparatus and system of claim 5, wherein the wireless communication is a local Radio Frequency communication that establishes pairing ability for the host to communicate with a network of devices.

7. The apparatus and system of claim 5, wherein the host is integrated with a mechanism for detecting dangers or hazards and to issue alarms and alerts with audible and visual pulsations and to transmit alerts to a global Radio Frequency communication network of other lighting-danger detection lamp/fixture devices and facilitate adaptive 'interoperability' communications for compatibility with conventional non-compatible devices.

8. The apparatus and system of claim 5, wherein the host and at least one of the series of remote sensing satellites and the series of remote utility/purpose satellites are paired exclusively with one another.

9. An improved combination lighting-danger detection apparatus and system, comprising:

a group of hosts paired by a wireless communication to a series of remote sensing satellites and to a series of remote utility/purpose satellites, wherein the hosts receive and process signals from the series of remote sensing satellites and issues commands throughout the series of remote utility/purpose satellites, so that the signals from the remote sensing satellites adds monitoring range to the group of hosts, creating a distributed network, and wherein the hosts have a sensor for sensing danger and an audible and visual alarm and the capability to transmit alerts to throughout the distributed network and give a safe-way-out indication using a green LED strobe array; and a base-station with a display for monitoring and system testing, used to receive warnings, select preferences, to manage settings and to control operations and adaptive interoperability communications via a routine to make non-compatible devices compatible via an application.

10. The apparatus and system of claim 9, wherein the group of hosts are lighting-danger detection lamp/fixtures and the base-station is a computing device such as mobile device, a tablet or a personal computer that can identify a location, a zone, or a group of devices, enables user adjustments, sets preferences for light level presets and night level presets, stores calling names and phone numbers, and makes intercom selections.

11. The apparatus and system of claim 10, wherein the series of remote sensing satellites includes at least one of the following: a smoke detector, a fire detector, a carbon monoxide detector, or a gas detector.

12. The apparatus and system of claim 11, wherein the lighting-danger detection lamp/fixtures and at least one remote sensing satellite are exclusively paired and can be mounted or placed on any surface, location, or object, with power options including battery operation or connection to commercial power through a low-voltage cord and a 120/230 VAC wall transformer.

13. The apparatus and system of claim 9 wherein the base-station is a computing device such as mobile device, tablet or personal computer that is configured to identify a location, a zone, identifies a zone of a group of devices, enables user adjustments, sets preferences for light level presets and night level presets, stores calling names and phone numbers, and makes intercom selections.

14. The apparatus and system of 9 wherein the visual alarm is a combination of white flashing lights, alternating with colored flashing lights, to direct a safe-way-out from a danger indication.

15. An improved combination lighting-danger detection apparatus and system, comprising:

a group of hosts paired by a wireless communication to a series of remote general-purpose satellites, wherein the hosts receive and process signals from the series of remote general-purpose satellites and issues commands throughout the series of remote general-purpose satellites that receive input signals and transmit output signals, so that the signals from the general-purpose satellites adds monitoring range to the group of hosts, creating a distributed network, and wherein the hosts have a sensor for sensing danger and an audible and visual alarm and the capability to transmit alerts to throughout the network and give a safe-way-out indication using a green LED strobe array, wherein the host's audible and visual alarm system provides auditory alerts via a horn, siren, or speaker, visual alerts through light pulsations, and transmits these alerts to the distributed network while supporting adaptive interoperability to ensure compatibility with non-compatible devices via an uploadable routine;

a base station, for monitoring and system testing, with a display is used to receive warnings, manage settings, select preferences, control operations, enable adaptive interoperability for non-compatible devices via a routine or application, and execute functions, manually or automatically, allowing users to configure installations to their desired preferences; and a housing for the general-purpose satellites that contains a remote satellite sensor unit, which comprises at least one of the following sensors: smoke, fire, carbon monoxide (CO), natural gas, propane, radon, motion, water/moisture, touch, temperature, heat, pressure, or flow sensors, and wherein the general-purpose satellites have at least one of the following: a temperature control, a pressure control, a door lock/unlock mechanism, a flow control mechanism, an actuator device, a sound emitting device, an actuator with pipe valve module unit, or video camera module unit, or a doorbell module unit.

16. The apparatus and system of claim 15 wherein the group of hosts is a group of lighting-danger detection lamp/fixtures.

17. The apparatus and system of claim 16 wherein the lighting-danger detection lamp/fixtures and general-purpose satellites are paired exclusively to one another to limit network communication chatter.

18. The apparatus and system of claim 16 wherein the base-station is a computing device for monitoring and system testing, such as a mobile device, a tablet or a personal computer that is configured to identify a location, a zone, identifies a zone of a group of devices, enables user adjustments, sets preferences for light level presets and night level presets, stores calling names and phone numbers, and makes intercom selections.

19. The apparatus and system of claim 18 wherein the distributed network is paired with a neighboring distributed network to communicate nearby dangers, enabling near-instant alarming, alerting, or utility control functions across each of the connected hosts, the remote general-purpose satellites, and the base stations running the application.

20. The apparatus and system of claim 19 wherein the light pulsations indicate nearby danger or a safe way out using specific colors corresponding to the type of hazard, flashing these colors in a sequence to provide clear warnings, while also employing audible and visual alerts to identify, notify, and guide users to safety, as well as offering utility functions by receiving input signals from hazard detection units or remote sensors and issuing corresponding outputs to perform services or execute functions.

* * * * *